(12) United States Patent
Takahashi

(10) Patent No.: US 8,810,824 B2
(45) Date of Patent: Aug. 19, 2014

(54) PRINTING SYSTEM, CONTROL METHOD, STORAGE MEDIUM, PROGRAM, AND PRINTING DEVICE

(75) Inventor: Hiroyuki Takahashi, Yokohama (JP)

(73) Assignee: Canon Kabushiki Kaisha (JP)

( * ) Notice: Subject to any disclaimer, the term of this patent is extended or adjusted under 35 U.S.C. 154(b) by 828 days.

(21) Appl. No.: 11/743,830

(22) Filed: May 3, 2007

(65) Prior Publication Data

US 2007/0263242 A1 Nov. 15, 2007

(30) Foreign Application Priority Data

May 12, 2006 (JP) .................................. 2006-134450

(51) Int. Cl.
*G06K 15/00* (2006.01)
*G06F 3/12* (2006.01)

(52) U.S. Cl.
USPC ........ 358/1.14; 358/1.15; 358/1.12; 358/1.18

(58) Field of Classification Search
USPC ........................................................ 358/1.15
See application file for complete search history.

(56) References Cited

U.S. PATENT DOCUMENTS

| | | | |
|---|---|---|---|
| 6,765,686 B2* | 7/2004 | Maruoka ........................ | 358/1.15 |
| 2002/0116399 A1* | 8/2002 | Camps et al. ................... | 707/200 |
| 2003/0053104 A1* | 3/2003 | Morisaki et al. ............... | 358/1.13 |
| 2003/0053129 A1* | 3/2003 | Morooka et al. ............... | 358/1.15 |
| 2003/0137680 A1* | 7/2003 | Maruoka ........................ | 358/1.13 |
| 2004/0113963 A1* | 6/2004 | Tsujimoto ...................... | 347/14 |
| 2004/0184058 A1* | 9/2004 | Miyajima ....................... | 358/1.12 |
| 2004/0257601 A1* | 12/2004 | Tomiyasu et al. ............... | 358/1.9 |
| 2005/0183141 A1* | 8/2005 | Sawada ........................... | 726/16 |
| 2005/0219607 A1* | 10/2005 | Yamaguchi et al. ........... | 358/1.15 |
| 2005/0270563 A1* | 12/2005 | Kamata et al. ................. | 358/1.15 |
| 2006/0092450 A1* | 5/2006 | Kanazawa et al. ............. | 358/1.13 |
| 2007/0031162 A1* | 2/2007 | Dombrowski .................. | 399/81 |

FOREIGN PATENT DOCUMENTS

| | | | |
|---|---|---|---|
| JP | 2000-047845 A | | 2/2000 |
| JP | 2001-100966 A | | 4/2001 |
| JP | 2002-029120 A | | 1/2002 |
| JP | 2002-073291 A | | 3/2002 |

(Continued)

OTHER PUBLICATIONS

Japanese Office Action for counterpart 2006-134450, dated Jun. 3, 2011.

(Continued)

*Primary Examiner* — Huo Long Chen
(74) *Attorney, Agent, or Firm* — Rossi, Kimms & McDowell LLP

(57) ABSTRACT

In a printing system including an MFP, a memory unit pre-stores attribute information of paper sheets. In the MFP, a control panel allows the user to copy or change attribute information of a paper sheet via a key input unit or touch panel unit. An MFP controller included in the MFP controls a print unit to execute print processing using a paper sheet corresponding to attribute information stored in the memory unit under the conditions based on the attribute information. When the user inputs a print instruction designated with a paper sheet, the MFP controller checks if attribute information of the designated paper sheet is stored in the memory unit, and controls the print unit to execute printing using the stored attribute information. The control panel allows the user to select paper sheets whose attribute information has been copied or changed when the user selects print sheets.

10 Claims, 64 Drawing Sheets

(56) References Cited

FOREIGN PATENT DOCUMENTS

| JP | 2003-270872 A | 9/2003 |
| JP | 2005115676 A | 4/2005 |
| JP | 2005-165722 A | 6/2005 |
| JP | 2005-178115 A | 7/2005 |

OTHER PUBLICATIONS

Japanese Office Action for corresponding JP 2006-134450, mailing date Jan. 16, 2012.
Japanese Office Action issued in counterpart application No. JP2006-134450, dated Apr. 2, 2012.

* cited by examiner

F I G. 13
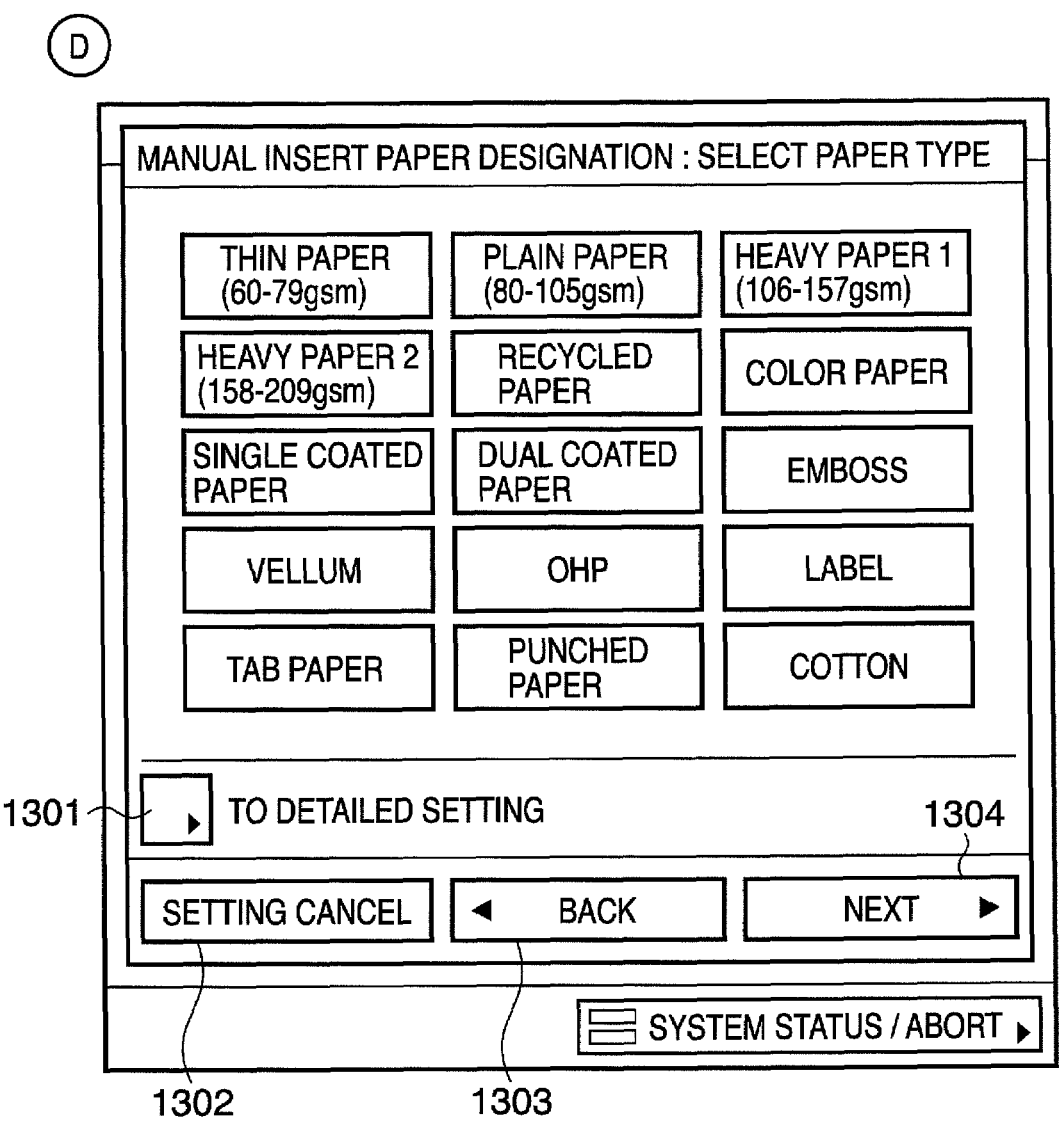

FIG. 15

◈ DETAILED INFORMATION

- PAPER NAME △ PLAIN PAPER
- TYPE △ Type 1
- BASIS WEIGHT △ 80gsm
- SURFACE NATURE △ HIGH-QUALITY PAPER
- SHAPE △ NORMAL
- COLOR △ WHITE
- ADJUSTMENT OF FIXING TEMPERATURE △ 0
- ADJUSTMENT OF SECONDARY TRANSFER VOLTAGE △ 0
- ADJUSTMENT OF CREEP CORRECTION AMOUNT △ 0.00mm

CLOSE ↵

SYSTEM STATUS / ABORT ▲

(F)

F I G. 16

● ITEMS IN PULL-DOWN BUTTON

| ● ALL ▶ | |
|---|---|
| ● ALL | |
| ☐ | DISPLAY ONLY Type 1 |
| ✎ | DISPLAY OTHER THAN Type 1 |

● PAPER TYPE

| ☐ | Type 1 |
|---|---|
| ✎ | Type 2 (Type 1 EDITED)<br>(Type 3 EDITED) |
| ✎ | Type 2 (COPIED INTACT FROM Type 3) |

1602 —
1603 —

— 1601

MANUAL INSERT PAPER DESIGNATION : SELECT PAPER TYPE

● ALL ▶    ■ SORT LIST    REGISTRATION ORDER ▶

| TYPE | MEDIA NAME | BASIS WEIGHT | |
|---|---|---|---|
| ☐ | PLAIN PAPER | 80gsm | ◀ |
| ☐ | DUAL COATED PAPER | 200gsm | ◀ |
| ✎ | COPY OF PLAIN PAPER | 80gsm | 12345 |
| ✎ | CHOICEST PAPER Private use | 157gsm | ▶ |
| ✎ | COPY OF ABC Paper Coated High Grade 200 gsm | 200gsm | ▶ |
| ✎ | ATTRIBUTE CHANGE OF ABC Paper Coated High Grade 200 gsm | 209gsm | |

[ ▲ TO SIMPLE SETTING ]   [ ▼ ]   [ BACK ]   [ DETAILED INFORMATION ▲ ]   [ OK ]   [ ⏎ ]

≡ SYSTEM STATUS / ABORT ▲

● SORT LIST

| REGISTRATION ORDER | ▶ |
|---|---|
| REGISTRATION ORDER | |
| NAME ORDER | |
| BASIS WEIGHT ORDER | |

● TEXT DISPLAY AREA IN LIST

| TYPE | MEDIA NAME | BASIS WEIGHT | |
|---|---|---|---|
| ☐ | PLAIN PAPER | 80gsm | ◀ |
| ✎ | COPY OF PLAIN PAPER | 80gsm | ◀ |
| ✎ | ATTRIBUTE CHANGE OF PLAIN PAPER | 90gsm | 12345 |

PAPER SOURCE INFORMATION

| PAPER SOURCE | SIZE | ID# | PAPER NAME | PARAMETER |
|---|---|---|---|---|
| PAPER SOURCE 1 | A4 | ID#0001-0000 | PLAIN PAPER | PARAMETER#0001-0000 |
| PAPER SOURCE 2 | A3 | ID#0003-0000 | HEAVY PAPER 1 | PARAMETER#0003-0000 |
| PAPER SOURCE 3 | A3 | ID#0001-0002 | ATTRIBUTE CHANGE OF PLAIN PAPER | PARAMETER#0001-0002 |
| PAPER SOURCE 4 | 11×17 | ID#0004-0000 | RECYCLED PAPER | PARAMETER#0004-0000 |
| PAPER SOURCE 5 | LTR | ID#0006-0000 | DUAL COATED PAPER | PARAMETER#0006-0000 |
| MANUAL INSERT | A4 | ID#0001-0001 | COPY OF PLAIN PAPER | PARAMETER#0001-0001 |

F I G. 20
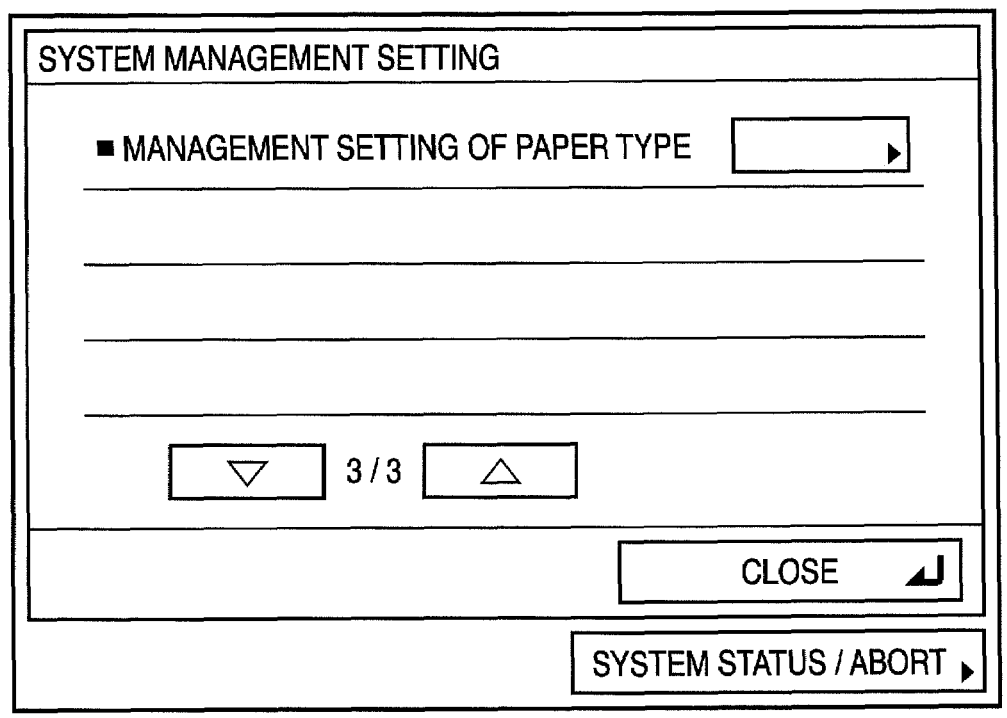

FIG. 21

MEDIA REGISTRATION / EDIT

● ALL ▼          ■SORT LIST   REGISTRATION ORDER ▼

| TYPE | MEDIA NAME | BASIS WEIGHT |
|---|---|---|
| 📄 | PLAIN PAPER | 80gsm |
| 📄 | DUAL COATED PAPER | 200gsm |
| 📝 | COPY OF PLAIN PAPER | 80gsm |
| 📝 | CHOICEST PAPER Private use | 157gsm |
| 📝 | COPY OF ABC Paper Coated High Grade 200 gsm | 200gsm |
| 📝 | ATTRIBUTE CHANGE OF ABC Paper Coated High Grade 200 gsm | 209gsm |

|◀  ◀  12345  ▶  ▶|

| DETAILS / EDIT ▲ | COPY ▲ | ERASE ▲ | PAPER INFORMATION DB | CLOSE ↵ |

2101

▤ SYSTEM STATUS / ABORT ▲

FIG. 24

MEDIA REGISTRATION / EDIT

● ALL ▼     ■ SORT LIST    REGISTRATION ORDER ▼

| TYPE | MEDIA NAME | BASIS WEIGHT |
|------|------------|--------------|
| 📄 | PLAIN PAPER | 80gsm |
| 📄 | HEAVY PAPER 2 | 200gsm |
| ✏️ | COPY OF PLAIN PAPER | 80gsm |
| ✏️ | CHOICEST PAPER Private use | 157gsm |
| ✏️ | COPY OF ABC Paper Coated High Grade 200 gsm | 200gsm |
| ✏️ | COPY OF ABC Paper Coated High Grade 200 gsm | 209gsm |
| ✏️ | ATTRIBUTE CHANGE OF PLAIN PAPER | 80gsm |

◄◄ ◄ 12345 ► ►►

DETAILS / EDIT ▲   COPY ▲   ERASE ▲   PAPER INFORMATION DB   CLOSE ↵

— 2403 (PAPER INFORMATION DB)
— 2401 (ERASE)
— 2402 (DETAILS / EDIT)

▢ SYSTEM STATUS / ABORT ▲

MEDIA SETTING

| FINE ADJUSTMENT | | |
|---|---|---|
| ■ PAPER NAME | ▷ ATTRIBUTE CHANGE OF PLAIN PAPER | REGISTER ▲ — 2501 |
| ■ TYPE | ▷ Type 2 | |
| ■ BASIS WEIGHT | ▷ 90gsm | |
| ■ SURFACE NATURE | ▷ HIGH-QUALITY PAPER | CHANGE ▲ |
| ■ SHAPE | ▷ NORMAL | CHANGE ▲ |
| ■ COLOR | ▷ WHITE | CHANGE ▲ |
| ■ ADJUSTMENT OF FIXING TEMPERATURE | ▷ −1 | CHANGE ▲ |
| ■ ADJUSTMENT OF SECONDARY TRANSFER VOLTAGE | ▷ −5 | CHANGE ▲ |
| ■ ADJUSTMENT OF CREEP CORRECTION AMOUNT | ▷ −0.01mm | CHANGE ▲ |
| | | OK ⏎ |

(bracket 2502 spans the CHANGE rows)

SYSTEM STATUS / ABORT ▲

| MEDIA SETTING | | | |
|---|---|---|---|
| ■ PAPER INFORMATION DATABASE | | | |
| PAPER ID | PAPER NAME | BASIS WEIGHT | |
| 0234 | ABC Paper Coated High Grade 100gsm | 100g / m² | |
| 0235 | ABC Paper Coated High Grade 150gsm | 150g / m² | |
| 0236 | ABC Paper Coated High Grade 200gsm | 200g / m² | 12345 |
| 0237 | ABC Paper Coated High Grade 250gsm | 250g / m² | |
| 0238 | ABC Paper Label 170gsm | 170g / m² | |
| 0239 | DEF Company Recycled Paper 80gsm | 80g / m² | |
| 0240 | DEF Company Recycled Paper 105gsm | 105g / m² | |

| INPUT PAPER ID | DETAILED INFORMATION ▸ |
|---|---|

| CANCEL | REGISTER ⏎ |
|---|---|

SYSTEM STATUS / ABORT ▸

FIG. 30

MANUAL INSERT PAPER DESIGNATION : SELECT PAPER TYPE

● ALL ▶         ■ SORT LIST         REGISTRATION ORDER ▶

| TYPE | MEDIA NAME | BASIS WEIGHT |
|---|---|---|
| 📄 | PLAIN PAPER | 80gsm |
| 📄 | DUAL COATED PAPER | 200gsm |
| 📝 | COPY OF PLAIN PAPER | 80gsm |
| 📝 | CHOICEST PAPER Private use | 157gsm |
| 📝 | COPY OF ABC Paper Coated High Grade 200 gsm | 200gsm |
| 📝 | ATTRIBUTE CHANGE OF ABC Paper Coated High Grade 200 gsm | 209gsm |
| 📝 | ATTRIBUTE CHANGE OF PLAIN PAPER | 90gsm |

◀◀ ◀ 12345 ▶ ▶▶

TO SIMPLE SETTING ▲     DETAILED INFORMATION ▲     ▼     BACK

CANCEL SETTING          OK ⏎

☐ SYSTEM STATUS / ABORT ▲

| SHAPE | SURFACE NATURE | BASIS WEIGHT | | | | | |
|---|---|---|---|---|---|---|---|
| | | 60~79 | 80~105 | 106~157 | 158~209 | 210~256 | 257~300 |
| NORMAL | HIGH-QUALITY PAPER | THIN PAPER | PLAIN PAPER | HEAVY PAPER 1 | HEAVY PAPER 2 | HEAVY PAPER 3 | HEAVY PAPER 4 |
| | RECYCLED PAPER | RECYCLED PAPER 1 | RECYCLED PAPER 2 | RECYCLED PAPER 3 | RECYCLED PAPER 4 | RECYCLED PAPER 5 | RECYCLED PAPER 6 |
| | COLOR PAPER | COLOR PAPER 1 | COLOR PAPER 2 | COLOR PAPER 3 | COLOR PAPER 4 | COLOR PAPER 5 | COLOR PAPER 6 |
| | SINGLE COATED | SINGLE COATED 1 | SINGLE COATED 2 | SINGLE COATED 3 | SINGLE COATED 4 | SINGLE COATED 5 | SINGLE COATED 6 |
| | DUAL COATED | DUAL COATED 1 | DUAL COATED 2 | DUAL COATED 3 | DUAL COATED 4 | DUAL COATED 5 | DUAL COATED 6 |
| | EMBOSS | EMBOSS 1 | EMBOSS 2 | EMBOSS 3 | EMBOSS 4 | EMBOSS 5 | EMBOSS 6 |
| | VELLUM | VELLUM 1 | VELLUM 2 | VELLUM 3 | VELLUM 4 | VELLUM 5 | VELLUM 6 |
| | FILM | OHP 1 | OHP 2 | OHP 3 | OHP 4 | OHP 5 | OHP 6 |
| | LABEL | LABEL PAPER 1 | LABEL PAPER 2 | LABEL PAPER 3 | LABEL PAPER 4 | LABEL PAPER 5 | LABEL PAPER 6 |
| TAB PAPER | HIGH-QUALITY PAPER | INDEX PAPER 1 | INDEX PAPER 2 | INDEX PAPER 3 | INDEX PAPER 4 | INDEX PAPER 5 | INDEX PAPER 6 |
| PUNCHED PAPER | HIGH-QUALITY PAPER | PUNCHED PAPER 1 | PUNCHED PAPER 2 | PUNCHED PAPER 3 | PUNCHED PAPER 4 | PUNCHED PAPER 5 | PUNCHED PAPER 6 |

▨ TYPE 1 PAPER

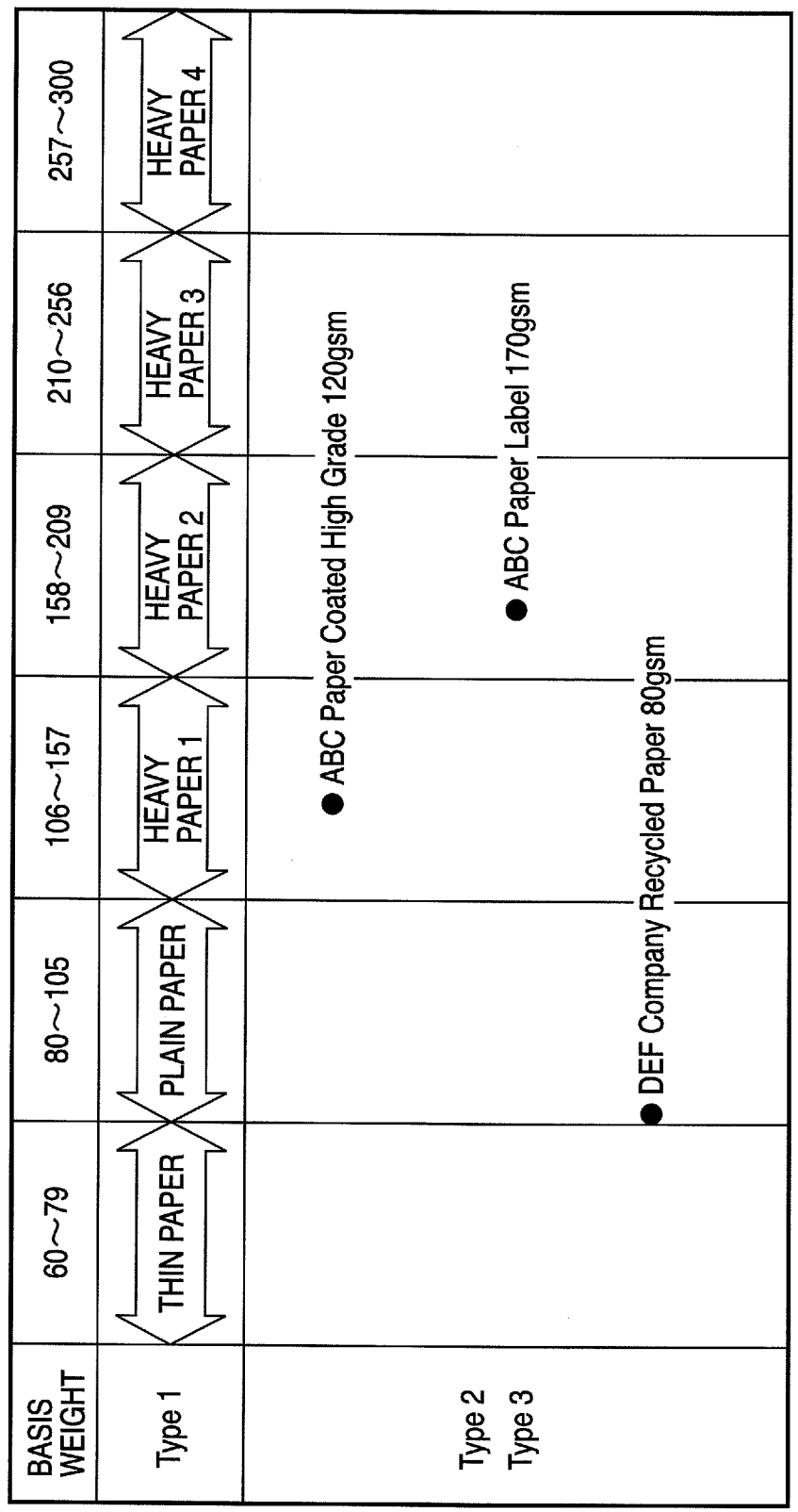

FIG. 34

Printer Driver

PRINTER
PRINTER NAME : MFP 101 — 3401
STATUS : IDLE — 3402
TYPE : XXXX YYYY — 3403
LOCATION : ZZZZ — 3404
COMMENT : — 3405

PROPERTIES — 3414
☐ PRINT TO FILE — 3406

PRINT RANGE — 3407
⦿ ALL
◯ CURRENT PAGE  ◯ SELECTION
◯ PAGES
ENTER PAGE NUMBERS AND / OR
PAGE RANGES SEPARATED BY
COMMAS. FOR EXAMPLE, 1,3,6, 4-8

COPIES
NUMBER OF COPIES : 1 — 3410
☑ COLLATE

ZOOM
PAGES PER SHEET : 1 PAGE — 3411
SCALE TO PAPER SIZE : NO SCALING

PRINT WHAT : DOCUMENT — 3408
PRINT : ALL PAGES — 3409

OK — 3412
CANCEL — 3413

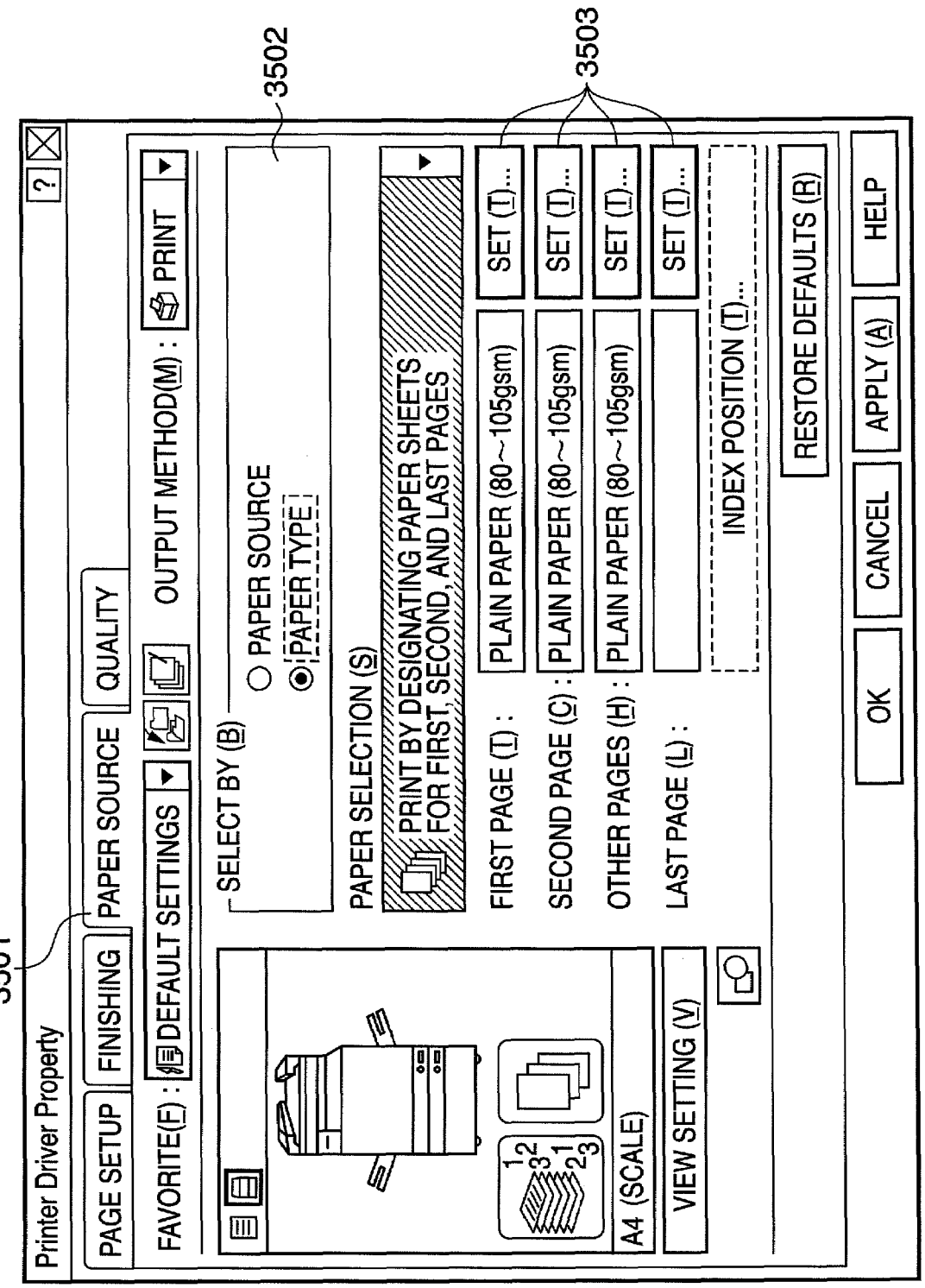

FIG. 36

PAPER SETTING

PAPER TYPE (T):

| NAME | Type | BASIS WEIGHT | PAPER COLOR | SURFACE NATURE | SHAPE |
|---|---|---|---|---|---|
| ☐ PLAIN PAPER | Type 1 | 80gsm | WHITE | HIGH-QUALITY PAPER | NORMAL |
| ☐ DUAL COATED PAPER | Type 1 | 200gsm | WHITE | DUAL COATED | NORMAL |
| ☑ COPY OF PLAIN PAPER | Type 2 | 80gsm | WHITE | HIGH-QUALITY PAPER | NORMAL |
| ☑ CHOICEST PAPER Priv | Type 2 | 157gsm | YELLOW | HIGH-QUALITY PAPER | TAB PAPER |
| ☑ ABC Paper Coated High | Type 2 | 200gsm | WHITE | DUAL COATED | NORMAL |
| ☑ ATTRIBUTE CHANGE OF PLAIN PAPER | Type 2 | 90gsm | WHITE | HIGH-QUALITY PAPER | NORMAL |

3601

[ GET PAPER INFORMATION (G) ]

[ OK ] [ CANCEL ] [ HELP (H) ]

FIG. 37

Printer Property

| GENERAL | SHARED | PORT | DETAILED SETTING | COLOR MANAGEMENT | SECURITY | DEVICE SETTING | FAVORITE |

GET DEVICE INFORMATION : MANUAL

PAPER SOURCE OPTION : ☑ 2-CASSETTE PEDESTAL (C)
☑ SIDE PAPER DECK (K)

OUTPUT OPTION (O) : [NONE ▽]

☑ DOUBLE-SIDED MODEL (U) :

INTERNAL SPOOL PROCESSING (P) : [AUTO ▽]

☐ USE DEPARTMENT MANAGEMENT FUNCTION (J)   [SETTING (I)...]
☐ ALLOW PASSWORD SETTING (L)

[FONT SETTING (F)]  [PAPER SOURCE AND PAPER ASSIGNMENT (I)]

[GET RESOURCE INFORMATION (N)...] [GET DEVICE INFORMATION (G)] [VERSION INFORMATION (B)]

[OK] [CANCEL] [APPLY (A)] [HELP]

| PAPER SOURCE AND PAPER ASSIGNMENT | ? ✕ |
|---|---|

PAPER SOURCE INFORMATION (P):

| PAPER SOURCE | PAPER SIZE |
|---|---|
| MANUAL INSERT TRAY | A4 |
| CASSETTE 1 | A4 |
| CASSETTE 2 | A4 |
| CASSETTE 3 | A4 |
| CASSETTE 4 | A4 |
| SIDE PAPER DECK | A4 |

PAPER SOURCE:  PAPER SIZE (S):

MANUAL INSERT TRAY → A4 ▽

☐ LONGITUDINAL FEED (E)

PAPER TYPE (T):

PLAIN PAPER (64~105g / m²)
RECYCLED PAPER
COLOR PAPER
PUNCHED PAPER
HEAVY PAPER 1 (106~209g / m²)
HEAVY PAPER 2 (210~253g / m²)

— 3801

[ OK ]  [ CANCEL ]  [ HELP (H) ]

F I G. 42
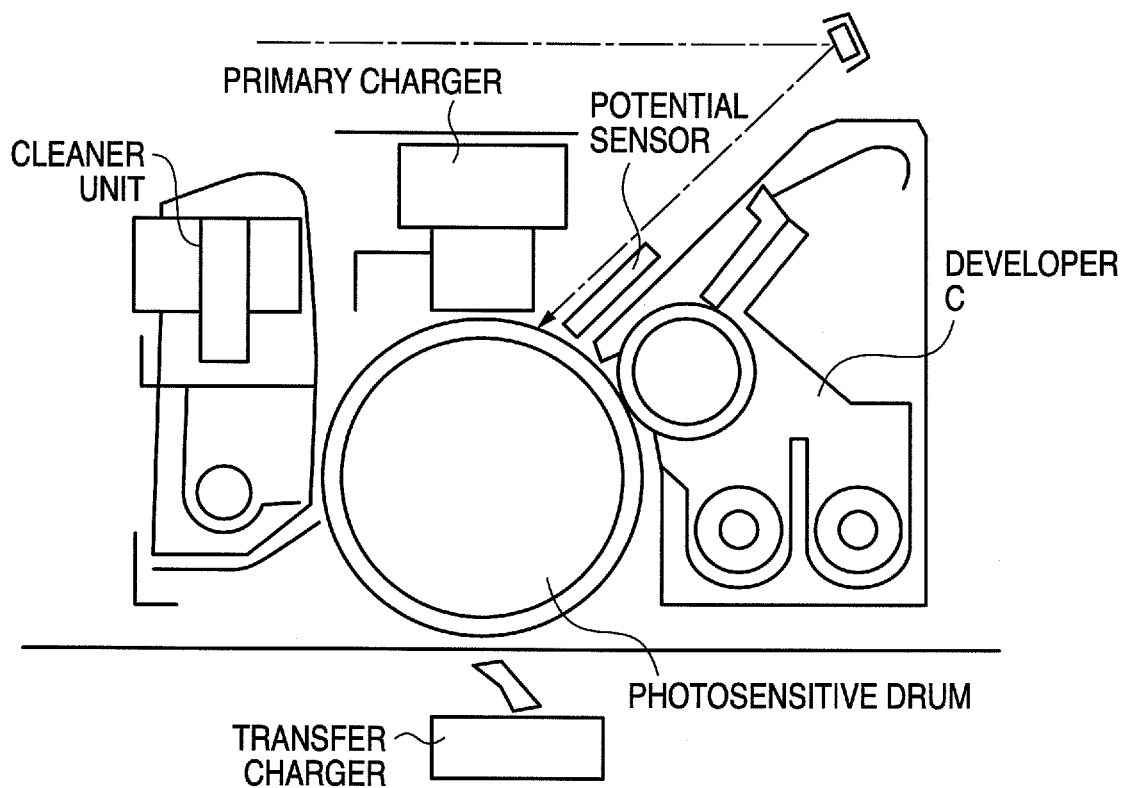

F I G. 49

| PAPER TYPE (GROUP) | AUTO CASSETTE SELECT : OFF | AUTO CASSETTE SELECT : ON | |
|---|---|---|---|
| | | CONSIDER PAPER TYPE : ON | CONSIDER PAPER TYPE : OFF |
| PLAIN PAPER / RECYCLED PAPER | × | ○ | ○ |
| COLOR PAPER | × | × | ○ |
| HEAVY PAPER | × | × | × |
| OHP | × | × | × |
| Type 2 (PLAIN PAPER / RECYCLED PAPER OR EQUIVALENT) | × | ○ | ○ |
| Type 2 (COLOR PAPER OR EQUIVALENT) | × | × | ○ |
| Type 2 (HEAVY PAPER OR EQUIVALENT) | × | × | × |
| Type 2 (OHP OR EQUIVALENT) | × | × | × |

FIG. 50

● EXAMPLE OF Type 1 TABLE

| REGIS-TRA-TION ORDER | ID | NAME | PAPER TYPE | PAPER BASIS WEIGHT (gsm) | SURFACE NATURE | SHAPE | COLOR | ADJUST-MENT OF FIXING TEM-PERA-TURE (°C) | ADJUST-MENT OF FIXING SPEED (mm/sec) | ADJUST-MENT OF SECOND-ARY TRANSFER VOLTAGE (KV) | ADJUST-MENT OF CREEP AMOUNT (mm) |
|---|---|---|---|---|---|---|---|---|---|---|---|
| 1 | 0001-0000 | PLAIN PAPER | 1 | 80~105 | HIGH-QUALITY PAPER | NORMAL | WHITE | 180 | 240 | 1.0 | 0.10 |
| 2 | 0002-0000 | THIN PAPER | 1 | 60~79 | HIGH-QUALITY PAPER | NORMAL | WHITE | 177 | 240 | 0.9 | 0.06 |
| 3 | 0003-0000 | HEAVY PAPER 1 | 1 | 106~157 | HIGH-QUALITY PAPER | NORMAL | WHITE | 182 | 200 | 1.1 | 0.20 |
| 3 | 0003-0000 | HEAVY PAPER 2 | 1 | 158~209 | HIGH-QUALITY PAPER | NORMAL | WHITE | 184 | 180 | 1.2 | 0.30 |
| 4 | 0004-0000 | RECYCLED PAPER | 1 | 80~105 | RECYCLED PAPER | NORMAL | WHITE | 180 | 240 | 1.0 | 0.10 |
| 5 | 0005-0000 | SINGLE COATED | 1 | 158~209 | SINGLE COATED | NORMAL | WHITE | 184 | 190 | 1.2 | 0.30 |
| 6 | 0006-0000 | DUAL COATED | 1 | 158~209 | DUAL COATED | NORMAL | WHITE | 187 | 180 | 1.2 | 0.30 |
| 7 | 0007-0000 | OHP | 1 | 158~209 | OHP | NORMAL | TRANS-PARENT | 160 | 120 | 1.6 | 0.00 |
|  |  |  |  |  |  |  |  |  |  |  |  |

FIG. 51

● EXAMPLE OF Type 2 TABLE

| REGIS-TRATION ORDER | ID | NAME | PAPER TYPE | BASIS WEIGHT (gsm) | SURFACE NATURE | SHAPE | COLOR | ADJUSTMENT OF FIXING TEMPERATURE (°C) | ADJUSTMENT OF FIXING SPEED (mm/sec) | ADJUSTMENT OF SECONDARY TRANSFER VOLTAGE (KV) | ADJUSTMENT OF CREEP AMOUNT (mm) |
|---|---|---|---|---|---|---|---|---|---|---|---|
| 1 | 0001-0001 | COPY OF PLAIN PAPER | 2 | 80 | HIGH-QUALITY PAPER | NORMAL | WHITE | 180 | 240 | 1.00 | 0.10 |
| 2 | 0123-0001 | CHOICEST PAPER Private use | 2 | 157 | HIGH-QUALITY PAPER | TAB PAPER | YELLOW | 180 | 200 | 1.10 | 0.11 |
| 3 | 0236-0001 | COPY OF ABC Paper Coated High Grade 200 gsm | 2 | 200 | DUAL COATED | NORMAL | WHITE | 180 | 180 | 1.20 | 0.30 |
| 4 | 0236-0002 | ATTRIBUTE CHANGE OF ABC Paper Coated High Grade 200 gsm | 2 | 209 | SINGLE COATED | NORMAL | WHITE | 180 | 180 | 1.20 | 0.30 |
| 5 | 0001-0002 | ATTRIBUTE CHANGE OF PLAIN PAPER | 2 | 90 | HIGH-QUALITY PAPER | NORMAL | WHITE | 179 | 235 | 0.95 | 0.09 |

F I G. 52

● EXAMPLE OF Type 3 TABLE

| REGIS-TRA-TION ORDER | ID | NAME | PA-PER TYPE | BASIS WEIGHT (gsm) | SURFACE NATURE | SHAPE | COLOR | ADJUST-MENT OF FIXING TEM-PERA-TURE (°C) | ADJUST-MENT OF FIXING SPEED (mm/sec) | ADJUST-MENT OF SECOND-ARY TRANSFER VOLTAGE (KV) | ADJUST-MENT OF CREEP AMOUNT (mm) |
|---|---|---|---|---|---|---|---|---|---|---|---|
| 1 | 0234-0000 | ABC Paper Coated High Grade 100gsm | 3 | 100 | DUAL COATED | NORMAL | WHITE | 187 | 180 | 1.00 | 0.10 |
| 2 | 0235-0000 | ABC Paper Coated High Grade 150gsm | 3 | 150 | DUAL COATED | NORMAL | WHITE | 189 | 180 | 1.10 | 0.20 |
| 3 | 0236-0000 | ABC Paper Coated High Grade 200gsm | 3 | 200 | DUAL COATED | NORMAL | WHITE | 191 | 160 | 1.20 | 0.30 |
| 4 | 0237-0000 | ABC Paper Coated High Grade 250gsm | 3 | 250 | DUAL COATED | NORMAL | WHITE | 192 | 140 | 1.20 | 0.50 |
| 5 | 0238-0000 | ABC Paper Lebel 170gsm | 3 | 170 | LABEL PAPER | NORMAL | WHITE | 186 | 180 | 1.10 | 0.24 |
| 6 | 0239-0000 | DEF Company Recycled Paper 80gsm | 3 | 80 | RECYCLED PAPER | NORMAL | WHITE | 180 | 240 | 1.00 | 0.10 |
| 7 | 0240-0000 | DEF Company Recycled Paper 105gsm | 3 | 105 | RECYCLED PAPER | NORMAL | WHITE | 180 | 240 | 1.00 | 0.10 |

FIG. 53

● EXAMPLE OF Type 1 AND Type 2 PAPER SHEETS DISPLAYED ON CONTROL PANEL

| REGIS-TRATION ORDER | ID | NAME | PA-PER TYPE | BASIS WEIGHT (gsm) | SURFACE NATURE | SHAPE | COLOR | ADJUST-MENT OF FIXING TEM-PERA-TURE (°C) | ADJUST-MENT OF FIXING SPEED (mm/sec) | ADJUST-MENT OF SECOND-ARY TRANSFER VOLTAGE (KV) | ADJUST-MENT OF CREEP AMOUNT (mm) |
|---|---|---|---|---|---|---|---|---|---|---|---|
| 1 | 0001-0000 | PLAIN PAPER | 1 | 80~105 | HIGH-QUALITY PAPER | NOR-MAL | WHITE | 180 | 240 | 1.00 | 0.10 |
| 2 | 0006-0000 | DUAL COATED | 1 | 101~200 | DUAL COATED | NOR-MAL | WHITE | 187 | 180 | 1.20 | 0.30 |
| 3 | 0001-0001 | COPY OF PLAIN PAPER | 2 | 80 | HIGH-QUALITY PAPER | NOR-MAL | WHITE | 180 | 240 | 1.00 | 0.10 |
| 4 | 0123-0001 | CHOICEST PAPER Private use | 2 | 157 | HIGH-QUALITY PAPER | TAB PAPER | YEL-LOW | 180 | 200 | 1.10 | 0.11 |
| 5 | 0236-0001 | COPY OF ABC Paper Coated High Grade 200gsm | 2 | 200 | DUAL COATED | NOR-MAL | WHITE | 180 | 180 | 1.20 | 0.30 |
| 6 | 0236-0002 | ATTRIBUTE CHANGE OF ABC Paper Coated High Grade 200 gsm | 2 | 209 | SINGLE COATED | NOR-MAL | WHITE | 180 | 180 | 1.20 | 0.30 |
| 7 | 0001-0002 | ATTRIBUTE CHANGE OF PLAIN PAPER | 2 | 90 | HIGH-QUALITY PAPER | NOR-MAL | WHITE | 179 | 235 | 0.95 | 0.09 |

FIG. 55
- PAPER TYPE
| | |
|---|---|
| 🗋 | Type 1 |
| 📝 | Type 2 (COPY OR ATTRIBUTE CHANGE FROM Type 1, 2, 3) |
| 🗍 | Type 3 |
→
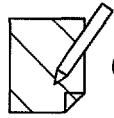 COPY FROM Type 1
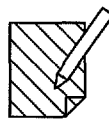 ATTRIBUTE CHANGE FROM Type 1
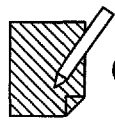 COPY FROM Type 2
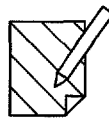 ATTRIBUTE CHANGE FROM Type 2
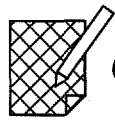 COPY FROM Type 3
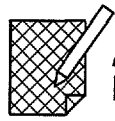 ATTRIBUTE CHANGE FROM Type 3

FIG. 56

● EXAMPLE OF Type 2 TABLE

| REGIS-TRATION ORDER | ID | NAME | COPY SOURCE | PAPER TYPE | BASIS WEIGHT (gsm) | SURFACE NATURE | SHAPE | COLOR | ADJUSTMENT OF FIXING TEMPERATURE (°C) | ADJUSTMENT OF FIXING SPEED (mm/sec) | ADJUSTMENT OF SECONDARY TRANSFER VOLTAGE (KV) | ADJUSTMENT OF CREEP AMOUNT (mm) |
|---|---|---|---|---|---|---|---|---|---|---|---|---|
| 1 | 0001-0001 | COPY OF PLAIN PAPER | 1 | 2 | 80 | HIGH-QUALITY PAPER | NORMAL | WHITE | 180 | 240 | 1.00 | 0.10 |
| 2 | 0123-0001 | CHOICEST PAPER Private use | 2 | 2 | 157 | HIGH-QUALITY PAPER | TAB PAPER | YELLOW | 180 | 200 | 1.10 | 0.11 |
| 3 | 0236-0001 | COPY OF ABC Paper Coated High Grade 200 gsm | 3 | 2 | 200 | DUAL COATED | NORMAL | WHITE | 180 | 180 | 1.20 | 0.30 |
| 4 | 0236-0002 | ATTRIBUTE CHANGE OF ABC Paper Coated High Grade 200 gsm | 3 | 2 | 209 | SINGLE COATED | NORMAL | WHITE | 180 | 180 | 1.20 | 0.30 |
| 5 | 0001-0002 | ATTRIBUTE CHANGE OF PLAIN PAPER | 1 | 2 | 90 | HIGH-QUALITY PAPER | NORMAL | WHITE | 179 | 235 | 0.95 | 0.09 |

F I G. 57
- PAPER TYPE
| | |
|---|---|
| 🗋 | Type 1 |
| 🗒 | Type 2 (COPY OR ATTRIBUTE CHANGE FROM Type 1, 2, 3) |
| 🗐 | Type 3 |
 CREATED BY A
 CREATED BY B
 CREATED BY C
 CREATED BY D
 CREATED BY E
 CREATED BY F

F I G. 58

● EXAMPLE OF Type 2 TABLE

| REGIS-TRATION ORDER | ID | NAME | COPY USER | PAPER TYPE | BASIS WEIGHT (gsm) | SUR-FACE NATURE | SHAPE | COLOR | ADJUST-MENT OF FIXING TEM-PERA-TURE (°C) | ADJUST-MENT OF FIXING SPEED (mm/sec) | ADJUST-MENT OF SECOND-ARY TRANSFER VOLTAGE (KV) | ADJUST-MENT OF CREEP AMOUNT (mm) |
|---|---|---|---|---|---|---|---|---|---|---|---|---|
| 1 | 0001-0001 | COPY OF PLAIN PAPER | A | 2 | 80 | HIGH-QUALITY PAPER | NORMAL | WHITE | 180 | 240 | 1.00 | 0.10 |
| 2 | 0123-0001 | CHOICEST PAPER Private use | B | 2 | 157 | HIGH-QUALITY PAPER | TAB PAPER | YEL-LOW | 180 | 200 | 1.10 | 0.11 |
| 3 | 0236-0001 | COPY OF ABC Paper Coated High Grade 200 gsm | C | 2 | 200 | DUAL COATED | NORMAL | WHITE | 180 | 180 | 1.20 | 0.30 |
| 4 | 0236-0002 | ATTRIBUTE CHANGE OF ABC Paper Coated High Grade 200 gsm | D | 2 | 209 | SINGLE COATED | NORMAL | WHITE | 180 | 180 | 1.20 | 0.30 |
| 5 | 0001-0002 | ATTRIBUTE CHANGE OF PLAIN PAPER | E | 2 | 90 | HIGH-QUALITY PAPER | NORMAL | WHITE | 179 | 235 | 0.95 | 0.09 |

FIG. 63

PAPER SETTING

PAPER TYPE (T):

| NAME | Type | BASIS WEIGHT | PAPER COLOR | SURFACE NATURE | SHAPE |
|---|---|---|---|---|---|
| ☐ PLAIN PAPER | Type 1 | 80gsm | WHITE | HIGH-QUALITY PAPER | NORMAL |
| ☐ DUAL COATED PAPER | Type 1 | 200gsm | WHITE | DUAL COATED | NORMAL |
| ✎ COPY OF PLAIN PAPER | Type 2 | 80gsm | WHITE | HIGH-QUALITY PAPER | NORMAL |
| ✎ CHOICEST PAPER Priv | Type 2 | 157gsm | YELLOW | HIGH-QUALITY PAPER | TAB PAPER |
| ✎ ABC Paper Coated High | Type 2 | 200gsm | WHITE | DUAL COATED | NORMAL |

[ GET PAPER INFORMATION (G) ]

[ OK ]  [ CANCEL ]  [ HELP (H) ]

PRINTING SYSTEM, CONTROL METHOD, STORAGE MEDIUM, PROGRAM, AND PRINTING DEVICE

BACKGROUND OF THE INVENTION

1. Field of the Invention

The present invention relates to a printing system having a printing device for executing print processing on a paper sheet, a control method, a storage medium, a program, and a printing device.

2. Description of the Related Art

Conventionally, commercial printing businesses issue publications via various processes. These processes include, for example, manuscript reception, assignment of design to the manuscript, layout & edit, comprehensive layout (presentation by means of printer output), proofing (layout correction & color correction), proof print, artwork preparation, print, post-process, shipping, and the like.

In particular, artwork preparation is mandatory in commercial printing business since the print process prevalently uses an offset prepress. However, once an artwork is prepared, it is difficult and disadvantageous in terms of cost to correct it. Artwork preparation inevitably requires careful proofing (i.e., careful layout check and color confirmation jobs). For this reason, it is a common practice to require a certain term until issuance of publications is complete.

Such commercial printing businesses require large-scale devices in respective processes, and also high cost. In addition, these operations require expert knowledge, that is, know-how of experts called craftsmen.

Against such circumstances, in recent years, along with the advent of high-speed, high image quality electrophotographic printing devices and ink-jet printing devices, a so-called Print On Demand (to be abbreviated as POD hereinafter) market prevails as competition with the aforementioned commercial printing business.

The POD has appeared aiming at handling jobs of relatively smaller lots within short delivery periods without using any large-scale device or system in place of the large-scale printing press and printing scheme.

The POD market implements digital prints using digital data by fully utilizing a printing device such as a digital copying machine, digital multi-function peripheral, and the like, and can provide print services and the like.

Such POD market merges digitalization compared to the conventional commercial printing business, effectively utilizes computerized management and control, can actually issue printed materials within a short delivery period, and has a merit to obviate the need for know-how of operators. Furthermore, the image quality of printed matters is approaching the commercial printing business level.

In consideration of such situation, office equipment manufacturers and the like have examined entry into a new field, that is, the POD market (see Japanese Patent Laid-Open No. 2005-165722). These manufacturers have made detailed examinations while assessing the market trends, and have explored printing devices and printing systems exploitable in POD environments in which cases of use and needs different from office environments are assumed. Note that one image of the POD environment is a company which does the following business. That is, a company that purchased printing devices from the office equipment manufacturer receives a print order from a given customer, and creates printed materials according to the request from the customer as final deliverables using the printing devices. The company delivers the created print matters to the customer to receive payment.

Under the assumption of a printing environment in such POD market, methods for improving productivity using the printing system are expected to be emphasized in the future. In addition, methods for allowing the operators of the printing system to easily use the printing system while maintaining high productivity are expected to be emphasized in the future.

In order to allow the office equipment manufacturers and the like to fully participate in the new field, that is, the POD market, as described above, it is desirable to assume the circumstances of the POD market, as described above, and to cope with those which occur less frequently in the office environment. In other words, examination of the practical use of the product of a digital printing system suited to the POD environment needs to be fully made as in the above reference. However, assuming a drive for the practical use of the product of the printing system also suited to the POD environment, items yet to be examined and issues that cannot be covered by only the arrangement disclosed in the above reference still remain.

For example, in the office environment, the selection candidates of paper sheets used in printing by the printing device are at most about 10 to 30 types. On the other hand, for example, the POD environment assumes situations in which 100 or more types of paper sheets must line up. This is because the POD environment must create printed materials that meet delicate requests from the customers as deliverables. Put differently, as a practical example, in a given situation, the customers may designate various conditions about paper sheets to be used in printing such as the manufacturers, qualities (surface nature, glossiness), sizes, types, weights (basis weights), and the like of paper sheets. In another situation, even when a customer may not directly designate a detailed request about paper sheets, the operator who works on the POD environment may determine paper sheets suited to deliverables that the customer wants. To cope with such situations, a very large number of types of paper sheets may be prepared in the POD environment. In consideration of such situations, it is desirable to configure the printing device (or printing system) to cope with a large number of types of paper sheets. Or preferably, it is desirable to configure not only to selectively use a larger number of types of paper sheets but also to execute appropriate print processes suited to the natures of paper sheets required in printing. For example, a configuration is desired to flexibly execute control about print processes such as temperature control, conveyance control, and the like of the printing device in accordance with the natures of paper sheets used in printing.

For example, in the conventional printing device, control parameters associated with the print processes are handled as control information inside the device, which is managed inside the device in advance, and cannot be arbitrarily registered and changed by the operator who uses the printing device, as exemplified above. This is because the selection candidates of paper sheets used in printing by the printing device are at most about 10 to 30 types in the office environment and the like, as exemplified above. Therefore, the aforementioned parameter handling results from the printing device which has already been configured to cope with such number of selection candidates of paper sheets in the manufacture of it.

However, as exemplified above, the POD environment may cope with several hundred types of paper sheets in the future. Hence, in order to allow creation of printed matters with quality that meets the requirements of the customer, it is desirable to allow the operator who works on the POD environment to set the control parameters associated with the print processes in correspondence with paper sheets used in the POD environment, as exemplified above. As described above, upon configuring the printing device to cope with a very large number of types of paper sheets, it is desirable to allow the operator of the printing device to set and register the control parameters, as exemplified above.

Also, in such configuration, it is desirable not to force the operator of the printing device in the POD environment to make troublesome operations for selecting a paper sheet from a very large number of types of selection candidates of paper sheets upon making the printing device execute printing according to a print request from the customer. As described above, use of the configuration as exemplified above may impair the operability of the operator. It is desirable to minimize occurrence of such a problem.

As described above, in order to aim at the practical use of the product of the printing system which is also suited to the POD environment, it is desirable to cope with various cases of use and user needs, as exemplified above.

SUMMARY OF THE INVENTION

According to one aspect of the present invention, the foregoing problem is solved by providing a printing system which comprises a printing device, comprising an operation control unit configured to allow a user to copy or change attribute information of paper sheets pre-stored in a storage unit, via a user interface unit and a control unit configured to control the printing device to operate under a print processing condition based on attribute information of a given paper sheet upon causing the printing device to execute print processing using the given paper sheet whose attribute information is pre-stored in the storage unit, the operation control unit inhibiting the user from selecting a paper sheet whose attribute information is not copied or changed by the user and allows the user to select a paper sheet whose attribute information has been copied or changed by the user in case where the user selects a paper sheet required in printing by the printing device via the user interface unit.

According to another aspect of the present invention, the foregoing problem is solved by proving a method of controlling a printing system which comprises a printing device, comprising the steps of allowing a user to copy or change attribute information of paper sheets pre-stored in a storage unit, via a user interface unit, controlling the printing device to operate under a print processing condition based on attribute information of a given paper sheet upon causing the printing device to execute print processing using the given paper sheet whose attribute information is pre-stored in the storage unit and inhibiting the user from selecting a paper sheet whose attribute information is not copied or changed by the user and allowing the user to select a paper sheet whose attribute information has been copied or changed by the user in case where the user selects a paper sheet required in printing by the printing device via the user interface unit.

Further features of the present invention will become apparent from the following description of exemplary embodiments with reference to the attached drawings.

BRIEF DESCRIPTION OF THE DRAWINGS

FIG. 13 is a view showing an example upon setting paper information from the touch panel unit in the control panel;

FIG. 15 is a view showing an example upon setting paper information from the touch panel unit in the control panel;

FIG. 16 is a view for explaining the contents displayed on the touch panel unit in the control panel;

FIG. 20 is a view showing an example upon registering paper information from the touch panel unit in the control panel;

FIG. 21 is a view showing an example upon registering paper information from the touch panel unit in the control panel;

FIG. 24 is a view showing an example upon registering paper information from the touch panel unit in the control panel;

FIG. 25 is a view showing an example upon registering paper information from the touch panel unit in the control panel;

FIG. 29 is a view showing an example upon registering paper information from the touch panel unit in the control panel;

FIG. 30 is a view showing an example upon registering paper information from the touch panel unit in the control panel;

FIG. 31 shows categories based on basic parameters of paper information;

FIG. 32 shows the difference between Type 1 and Types 2 and 3;

FIG. 34 is a view showing an example upon setting paper information from the printer driver;

FIG. 35 is a view showing an example upon setting paper information from the printer driver;

FIG. 36 is a view showing an example upon setting paper information from the printer driver;

FIG. 37 is a view showing an example upon setting paper information from the printer driver;

FIG. 38 is a view showing an example upon setting paper information from the printer driver;

FIG. 42 is a sectional view of an image forming unit in the printer;

FIG. 49 is a table showing an example of paper handling in case of the automatic paper source settings;

FIG. 50 shows an example of the contents of a paper information database for Type 1 paper sheets;

FIG. 51 shows an example of the contents of a paper information database for Type 2 paper sheets;

FIG. 52 shows an example of the contents of a paper information database for Type 3 paper sheets;

FIG. 53 shows an example of the contents of the paper information database for Type 1 and Type 2 paper sheets, displayed on the control panel;

FIG. 55 is a view for explaining the contents displayed on the touch panel unit in the control panel;

FIG. 56 shows an example of the contents of the paper information database for Type 2 paper sheets;

FIG. 57 is a view for explaining the contents displayed on the touch panel unit in the control panel;

FIG. 58 shows an example of the contents of the paper information database for Type 2 paper sheets;

FIG. 63 is a view showing an example upon setting paper information from the printer driver.

DESCRIPTION OF THE EMBODIMENTS

Figure 1:
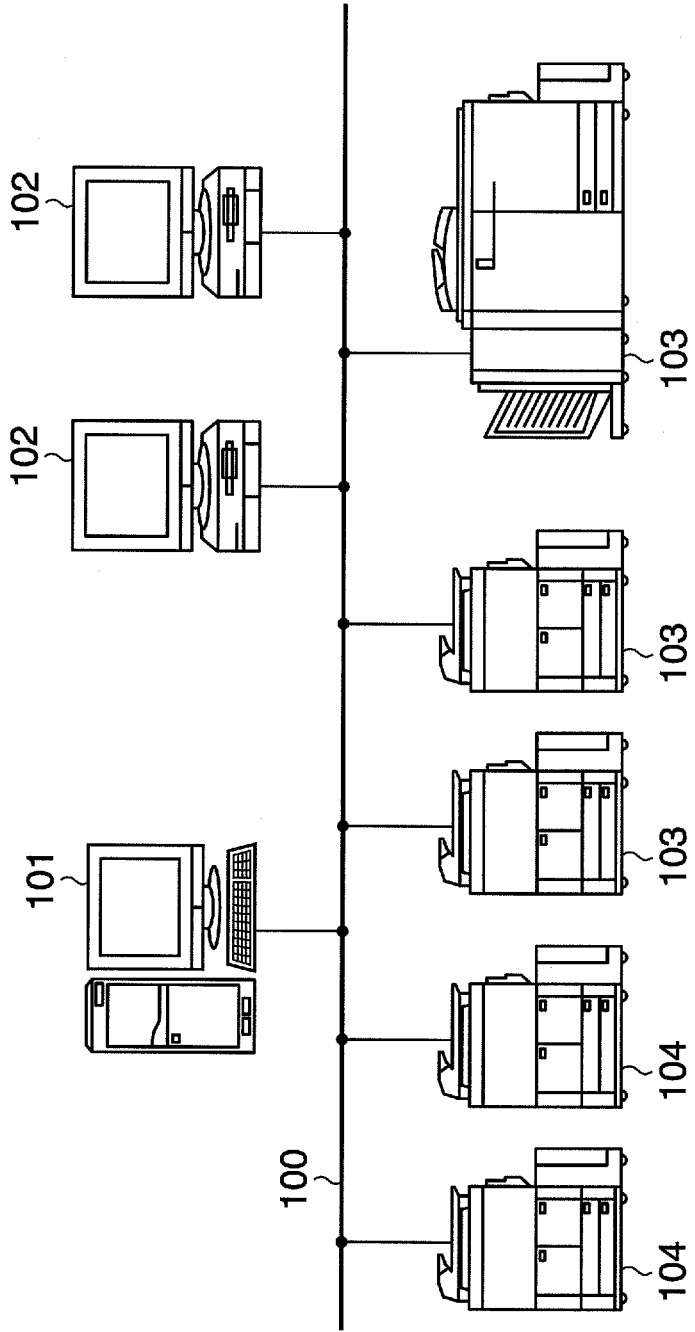
FIG. 1 is a block diagram showing an example of the arrangement of a digital printing system.

Preferred embodiments of the present invention will now be described in detail with reference to the drawings. It should be noted that the relative arrangement of the components, the numeral expressions and numerical values set forth in these embodiments do not limit the scope of the present invention unless it is specifically stated otherwise.

Points, cases of use, and user needs on which one embodiment of the present invention focuses particular attention, the concept proposed by a printing system comprising printing devices (MFPs), the background associated with the concept, and so forth will be exemplified below.

In a general office environment, the user uses a printer driver or the like when he or she issues a print instruction from a client computer to a printing device. That is, setting information (also called a job ticket) is appended to one document to generate one PDL (Page Description Language) data, which is sent to the printing device. Based on this data, the printing device executes a print operation. At this time, in many cases, the user in the office environment performs printing while giving consideration to the paper size and the like but not to the paper type.

However, in the POD (Print On Demand) environment, the customer pays for a print shop or the like to request a job. In such environment, the paper size, paper type, and the like are to be charged. Hence, both the print shop and customer inevitably care about them. Of course, the customer issues detailed instructions not only about image quality but also about the paper size and type or the finished state of binding and the like in association with the output result of the job. Such cases of use may be assumed.

In particular, as for the paper type, such innovative changes in attitudes are considered an indication of greater expectations compared to the office market. In the POD market, the customer himself or herself may request a print job while designating the brand (type) of paper sheets or while bringing paper sheets with him or her. In this manner, the customers may begin to carry concern for the print media used in their jobs in the future.

Next, in the printing device, upon pursuing higher image quality, the basis weight (the weight of paper), surface nature (texture of paper), shape (punched paper sheets, tab sheets, and the like), color, and the like of paper sheets are determined in advance. After that, engine process control (print process control) is optimized to fit the paper sheets to cope with them. Such an arrangement is assumed.

That is, if print characteristics remain the same, the outcomes of output products vary if the types of paper are different. In order to obtain optimal output products, adjusting the print characteristics for each paper sheet to print a job with optimal print characteristics is expected to increase in significance more than ever. In other words, an optimal output can be obtained if a job is printed by preparing the print characteristics suited to the given paper sheet.

Hence, this embodiment calls a database obtained by collecting print characteristics for respective paper sheets as a paper information database. This embodiment holds the paper information which forms the database in an internal hard disk of the printing device of this printing system. Note that in this embodiment, the HD stores and holds print data themselves of a plurality of print jobs.

In the printing system of this embodiment, paper information (also called a paper type) is distinguished and defined by three categories: Type 1, Type 2, and Type 3.

"Type 1" in this embodiment is a class which can also cope with print environments such as an office environment and the like with high affinity. Put differently using a practical example, Type 1 is a category which includes, for example, "plain paper", "heavy paper 1", "recycled paper", "punched paper", "OHP", "tab sheet", "OHP sheet", and the like, and is rougher than "Type 3" to be exemplified below. The significance of the existence of Type 1 is to provide a scheme that allows for following the designation method of paper types supported as, for example, an office environment-oriented printing device. Note that each piece of paper information relevant to Type 1 is stored in this printing device as a default. In addition, even in an initial state (a state that remains the same after the printing device is set at the delivery destination), the operator can display and select a user interface unit (to be also referred to as a UI unit hereinafter) of the printing device without any special settings.

"Type 3" of this embodiment provides a scheme that allows this printing system to handle paper sheets by distinguishing them more circumstantially and strictly than Type 1. This is also a specification suited to the POD environment. For example, this paper type defines individual paper brands (also called paper names) such as "XXX paper-manufacturing company, white recycled paper AA-500", "YYY paper-manufacturing company, color print paper", and so forth. Type 3 can meet needs required in the POD environment such that proper names such as "A company B paper 105 gsm", "C company D paper 241 lb", and so forth of paper sheets themselves, which are named by the paper-manufacturing companies or OA equipment manufacturers are used and managed intact in the POD environment.

"Type 2" in this embodiment is a paper type which is categorized based on, for example, the concept "favorite". The significance of the existence of Type 2 is as follows. There is a very large number of paper types of Type 3 (e.g., 100 types or more). If the user is allowed to use such a large number of types of paper sheets from the UI unit of this embodiment intact, the high operability may be impaired. Hence, the user is allowed to designate a paper type from a small number of choices including only required paper types. Type 3 also provides a scheme for that purpose. Using Type 2, the user can register and manage paper information corresponding to a copy of paper information of Type 1 or Type 3 as that of Type 2. Also, the user can register and manage paper information corresponding to information obtained by changing the paper information of Type 1 or Type 3 as that of Type 2. In this way, this embodiment allows the operator of the printing system (or system administrator) to arbitrarily register names. The operator or administrator can reset attribute information of that paper sheet on the paper information database. The operator or administrator can rename and reregister a copy of another piece of paper information. Paper information generated by such processing corresponds to that of Type 2.

In this embodiment, these pieces of paper information are registered in advance in the HD of the printing device of this embodiment so as to control the process conditions of the printing device itself in correspondence with attribute information of a given paper sheet itself.

The reason why such configurations are adopted will be exemplified below.

For example, upon using a printing device in a general office environment, at most ten odd "Type 1" paper types such as "plain paper", "heavy paper 1", "recycled paper", "punched paper", "OHP", and the like suffice. The user can select a desired paper type from them and can issue a print instruction.

However, Type 3 paper sheets assumed as those to be used in the POD environments or print-related industries include several hundred to several thousand types. Even a small print shop always has several dozen paper types ready. In this way, in such an environment, the number of paper types may increase incomparably.

Therefore, even when the printing device side prepares such several hundred paper types as a database and provides that database to the user, the user side cannot select a desired paper sheet since there are too many paper types, and cannot efficiently use the printing device. A common problem may be posed to a copy, print, or box print function.

For example, the cases of the copy operation and box print operation will be examined first. Even when a small control panel on the printing device displays a window used to select a paper type using buttons or a window used to select a paper type from a list, paper types on the database cannot be displayed at once, and the user must select a desired paper while scrolling the window several times.

On the other hand, in case of the print operation, the user opens a printer driver from a client PC and selects a desired paper sheet. If all Type 3 paper sheets are displayed, either the display screen of the client PC is entirely filled with only paper types, or the user selects a desired paper type by scrolling the contents of a small paper type window of several lines.

In either case, the user may spend considerable time on selection. Furthermore, in the POD environment, one job may use a plurality of paper types for, for example, a front cover, back cover, book body, insert sheet, tab sheet, and so forth.

Hence, the printing system of this embodiment adopts the arrangement that can prevent the aforementioned problems from occurring.

For example, a printing device which can be satisfactorily used in both the office and POD environment will be examined below.

In a general office environment, the user may use at most ten or less types of Type 1 paper sheets. At this time, the user may select a target paper type from ten or less Type 1 paper types.

Next, in the POD environment, at most one hundred or less paper types may be popularly used upon combining those of Type 1 and Type 3. Selecting these paper types from a Type 3 list including several hundreds to several thousands of paper types may result in poor efficiency and poor productivity in terms of display and selection.

Upon displaying such list on the UI unit, problems of performance failures in case of sorting or filtering need be solved. Furthermore, in order to distinguish several hundreds to several thousands of paper types from each other, long names are inevitably used, and their display is required. A description method must be devised not only on the control panel but also on the driver and application software, and limitations on the number of characters to be displayed on each UI must be taken into consideration. As a result, upon selecting a desired paper type, the user needs to spend considerable time and is subjected to a considerable workload, and falls into further confusion. This embodiment provides a scheme that prevents such a situation from occurring.

If the user selects a paper type regardless of print function settings and a paper type that can implement such functions, not only printing itself may not be correctly done, but also deterioration of durability, damage, and the like of the device may occur. This embodiment provides a configuration that can cope with such a situation.

To put various situations exemplified above differently, it is time-consuming and imposes heavily loaded operations on the user to select a target paper type from hundreds of paper types in the printing device.

Furthermore, for example, in some cases, a specific user may specify several paper types to be selected for every print operation. In such case, that user must select these specific paper types from hundreds of paper types for every print operation. In this way, there are points of concern in terms of operation efficiency.

Upon examination of a configuration that displays names or icons of paper types and allows the user to select paper types using the displayed names or icons upon selection of paper types, there are points of concern. For example, a feature of each paper sheet may hardly be discriminated. Upon examining a configuration that displays details of each paper type, as one plan for solving this problem, points of concern still remain. For example, in this configuration, an independent window must normally be displayed in addition to a selection window, resulting in poor browsability and time-consuming selection. It is difficult for a general user to properly select paper types that can implement the print function settings, unless he or she has thorough knowledge of the relationship between the functions and paper types. Hence, it is difficult for such general user to determine paper types based only on their names or feature information. In this way, there still remain points of concern in terms of operation efficiency in the configuration that allows the user to select paper sheets required in printing.

The printing system in this embodiment can solve these problems. In other words, by configuring the printing system as in this embodiment, the points of concern and problems exemplified above can be coped with. That is, for example, a controller of this system controls the system so as to allow the system to implement a configuration to be exemplified below.

For example, the controller controls the system so that the user can register paper types that he or she wants to use in Type 2 as "favorite". In this way, the user can designate paper brands from necessary and sufficient choices.

For example, a case will be examined wherein Type 1, Type 2, and Type 3 are respectively stored in the printing device as paper information databases. In an initial state, the databases prepared in advance are stored for Type 1 and Type 3, and no paper types for Type 2 are registered in the database for Type 2. Alternatively, in an initial state, the databases prepared in advance are stored for Type 1 and Type 3, and only paper types of Type 1 are registered in the database for Type 2.

Then, the user can create the database for Type 2 by copying the data of the paper information database for Type 1 or Type 3 to that for Type 2. If the user wants to set process setting values different from those defined as Type 1 or Type 3, he or she can change them in the database for Type 2. Alternatively, the user may input names or process setting values as new registrations within given ranges. If there is at least one Type 2 paper sheet in the database, that data can be copied from Type 2 to Type 2. Upon copying from Type 3 to Type 2, the user may use the same paper name of Type 3 or may change it.

When the user displays and selects paper types, only those for Type 2 or Type 1 and Type 2 are displayed.

In this way, since the user need not display and select Type 3 including several hundreds to several thousands of paper types, he or she can select paper types from a simple display without any extra efforts and confusion.

The effect exemplified above exercises its power on the driver and application via the network in addition to the control panel of the printing device. That is, the driver downloads the database of Type 2 paper sheets registered in advance on the printing device side (to be referred to as paper information acquisition hereinafter), and makes display based on the downloaded information. In general, since the driver has Type 1 data in advance by itself or PPD, it can display these Type 1 data and the Type 2 data obtained by paper information acquisition together. As a result, the office user can select a paper type from the database for Type 1, and the POD operator can select it from the database for Type 2. Note that Type 1 data are necessary to maintain compatibility and consistency to the conventional device.

This paper information acquisition function is a software module for acquiring required information from a specific part of the paper information database via the network. If this function is installed, it can be used for application software and utility software in addition to the driver.

By making configurations like the printing system of this embodiment, the user can quickly select a target paper type from a very large number of paper types, thus improving the convenience to the user and operation efficiency.

More specifically, for example, the problems assumed in the background art can be solved, and a user-friendly, convenient print environment which can be applied not only to the office environment and but also to the POD environment can be built. Also, for example, a print environment which can cope with a larger number of types of paper sheet so as to meet various requirements about paper sheets required in printing in consideration of the POD environment and the like can be built. Furthermore, for example, the operator can set and register control parameters of the printing device associated with print processes, and can control the printing device in the print processes suited to the natures of paper sheets used in the printing device under the assumption of support of a very larger number of types of paper sheets. Moreover, a print environment that can bring about such effects and can suppress deterioration of the operability for the operator as much as possible can be built. In particular, for example, in a print environment of the POD environment or the like, the operator can quickly select paper sheets required for printing from a very large number of paper types, thus improving the convenience to the user and operation efficiency. As described above, a scheme that can flexibly meet various needs from various users as much as possible under the assumption of various situations and environments of use can be provided.

The above description given from the beginning, effects, configurations for them, and the like are common to all embodiments to be described in detail hereinafter. Also, various kinds of control connected to them are executed by a controller of the printing device itself of this embodiment as a main body. In the following description of this embodiment, an MFP (Multi Function Peripheral) which corresponds to a multi-function type printing device having a plurality of functions such as a copy function, print function, box function, and the like will be taken as an example of the printing apparatus, and will be described. In the following description, terms "MFP unit" and "MFP will appear, but they all mean the MFP, that is, the printing device. Furthermore, in the following description, a plurality of types of MFPs which include color MFPs that can print color images, and monochrome MFPs that cannot print color images but can print monochrome images will be exemplified. The present invention can be applied to all these types of MFPs. In the following description, the MFPs will be explained. In addition, the present invention can be applied to single-function type printing devices (SFP: single function peripheral) such as a printing device having only a print function, that having only a copy function, and the like.

[System Arrangement]

FIG. 1 is a block diagram showing an example of the system arrangement of a digital printing system.

This system includes a print server 101, client PCs 102, and one or a plurality of color MFPs 103 and monochrome MFPs 104, which are connected to a network 100.

The print server 101 has two roles. The first role is to exchange information with a device outside a digital print unit. Image information, setting information, and the like of a job to be received are input to the print server 101. The first role then notifies the external device of status information upon completion of that job. The second role is to execute management control inside the digital print unit. The print server 101 consolidates externally input jobs and those generated inside the digital print unit. In this way, the statuses of all devices and all jobs inside the digital print unit can be monitored, and control to pause, change settings of, and restart printing of jobs or copying, moving, deleting, and so forth of jobs can be executed.

Each client PC 102 has a role of inputting an edit/print instruction of an input application file or a print ready file, and a role of assisting monitoring and control of devices and jobs managed inside the print server. In this embodiment, although not described in detail, the client PC 102 comprises a CPU, RON, RAM, HD, display, and input device such as a keyboard, mouse, or the like as in a general computer. The display and input device serve as user interface means, and also as operation control means and control means when the CPU executes programs which are stored in the HD or ROM and are mapped on the RAM.

The color MFPs 103 and monochrome MFPs 104 are printing devices each having various functions such as a scan function, print function, copy function, and the like. The color MFPs 103 and monochrome MFPs 104 need to be selectively used depending on use applications since they have different speeds and costs.

[Block Arrangement of MFP]

Figure 2:
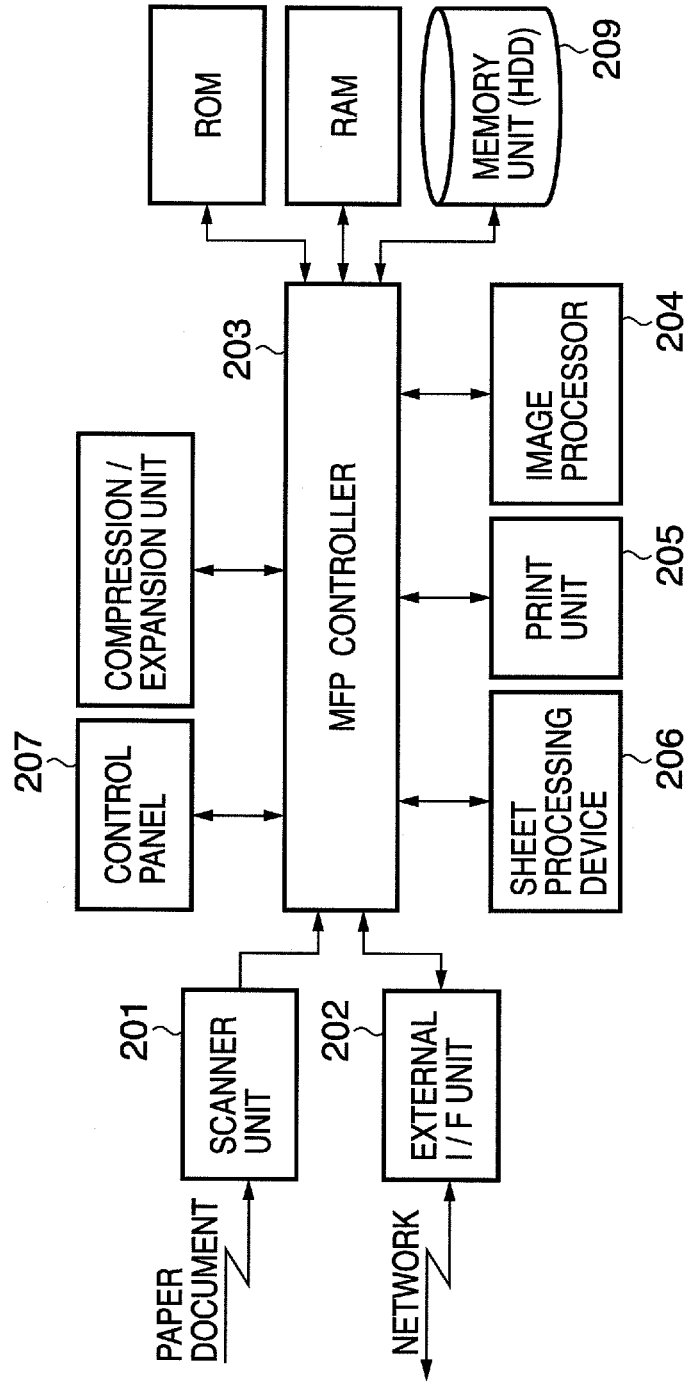
FIG. 2 is a block diagram showing the system arrangement of an MFP.

The arrangement and procedure of an MFP (Multi Function Peripheral) will be described using FIG. 2. The MFP can be either the color MFP 103 or monochrome MFP 104 of those shown in FIG. 1.

A scanner unit 201 scans paper documents and the like using an image scanning device such as a scanner or the like, and executes input processing of the scanned image data.

An external I/F unit 202 rasterizes image data (mainly, PDL data) input from the network by an RIP (Raster Image Processor), and outputs the rasterized data to an MFP controller 203. Also, the external I/F unit 202 externally transmits image data and device information inside the MFP via the network. The MFP controller 203 plays a role of traffic control for controlling input and output data.

The MFP controller 203 temporarily stores input image data in a memory unit 209. The stored image data is temporarily stored or read out as needed.

An image processor 204 reads out image data from the memory unit 209, applies image processing required to execute printing, and sends the processed image data to a print unit 205.

The print unit 205 feeds a print sheet, and sequentially prints the image data processed by the image processor 204 on that print sheet. The printed-out print sheet is fed into a sheet processing device 206, and undergoes sort processing of and finishing processing of print sheets.

Furthermore, a control panel 207 is used to select various procedures and functions and to input operation instructions. Along with an increase in resolution of a display device of the control panel 207, the control panel 207 can be used to preview image data stored in the memory unit 209 and to print it out if it is OK after confirmation.

In this manner, the MFP has various functions and use methods, and their examples are as follows. Copy function: scanner unit→print unit, network scan function: scanner unit→external I/F unit, network print function: external I/F unit→print unit, box scan function: scanner unit→memory unit, box print function: memory unit→print unit, box reception function: external I/F unit→memory unit, box send function: memory unit→external I/F unit, and preview function: memory unit→control panel

[System Configuration of Paper Information]

Figure 3:
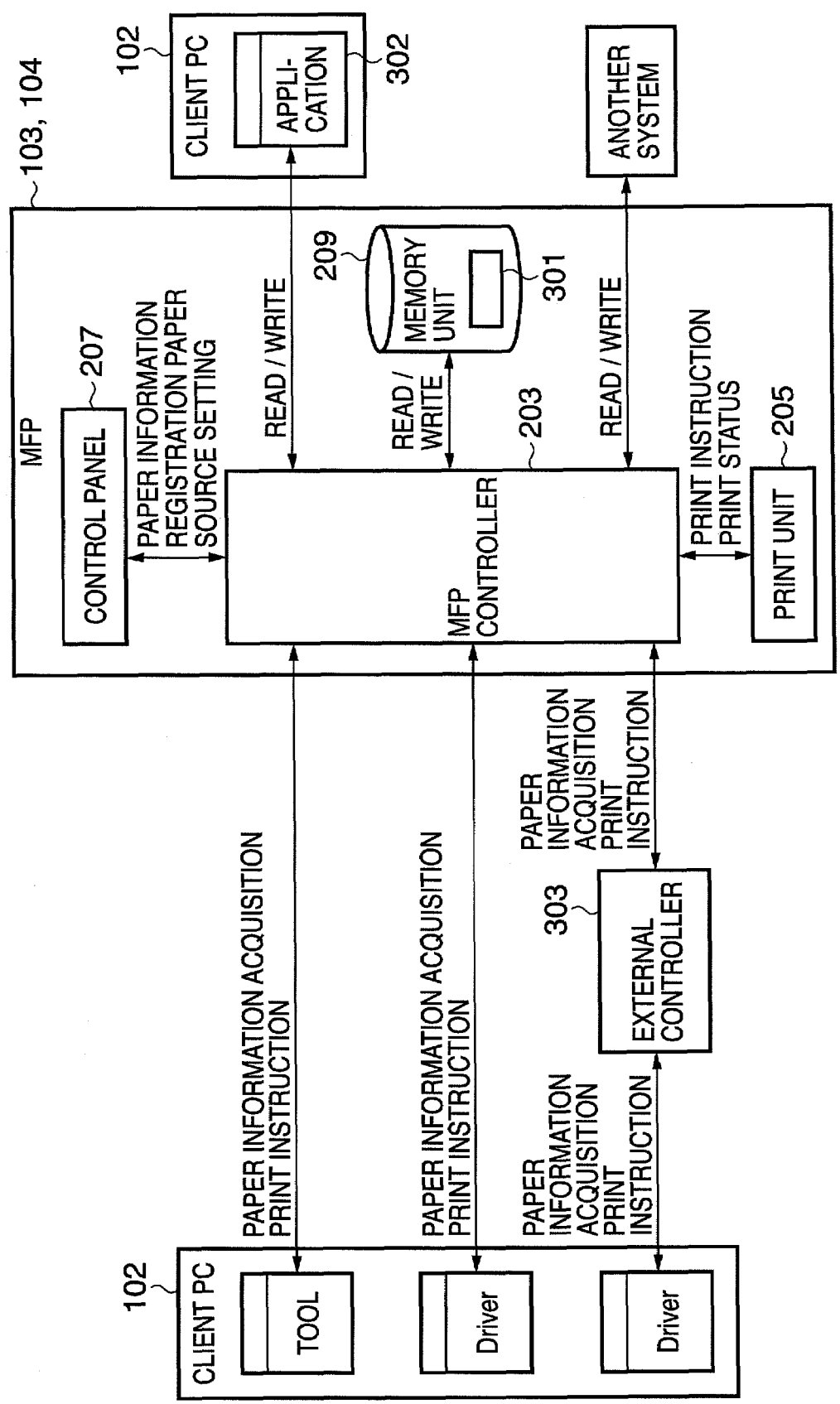
FIG. 3 is a block diagram showing the arrangement of a paper information system.

The system configuration viewed from transmission/reception of paper information will be described below using FIG. 3. In the MFPs 103 and 104, components related to paper information include the MFP controller 203, the control panel 207, the print unit 205, and a paper information database 301.

The paper information database 301 is assured in the aforementioned memory unit 209 and registers paper information as a database.

Next, upon printing, the user launches an application 302 on the client PC 102, and inputs a print startup instruction via a driver. In some cases, using a hot folder, job entry tool, or the like, the user may directly enter a job into the MFP 103 or 104. Upon inputting a job, the user acquires paper information stored in the MFP 103 or 104 on the client PC 102, selects desired paper information from the acquired information, and then issues a print instruction.

The user may sometimes input a print instruction via an external controller 303 which is prepared independently of the MFPs 103 and 104.

Furthermore, in order to rewrite, register, and read out information in the paper information database 301, the user uses a dedicated application which runs on the client PC 102. In particular, this application is used to exchange paper information with another system.

[Procedure Upon Handling Paper Information]

Figure 4:
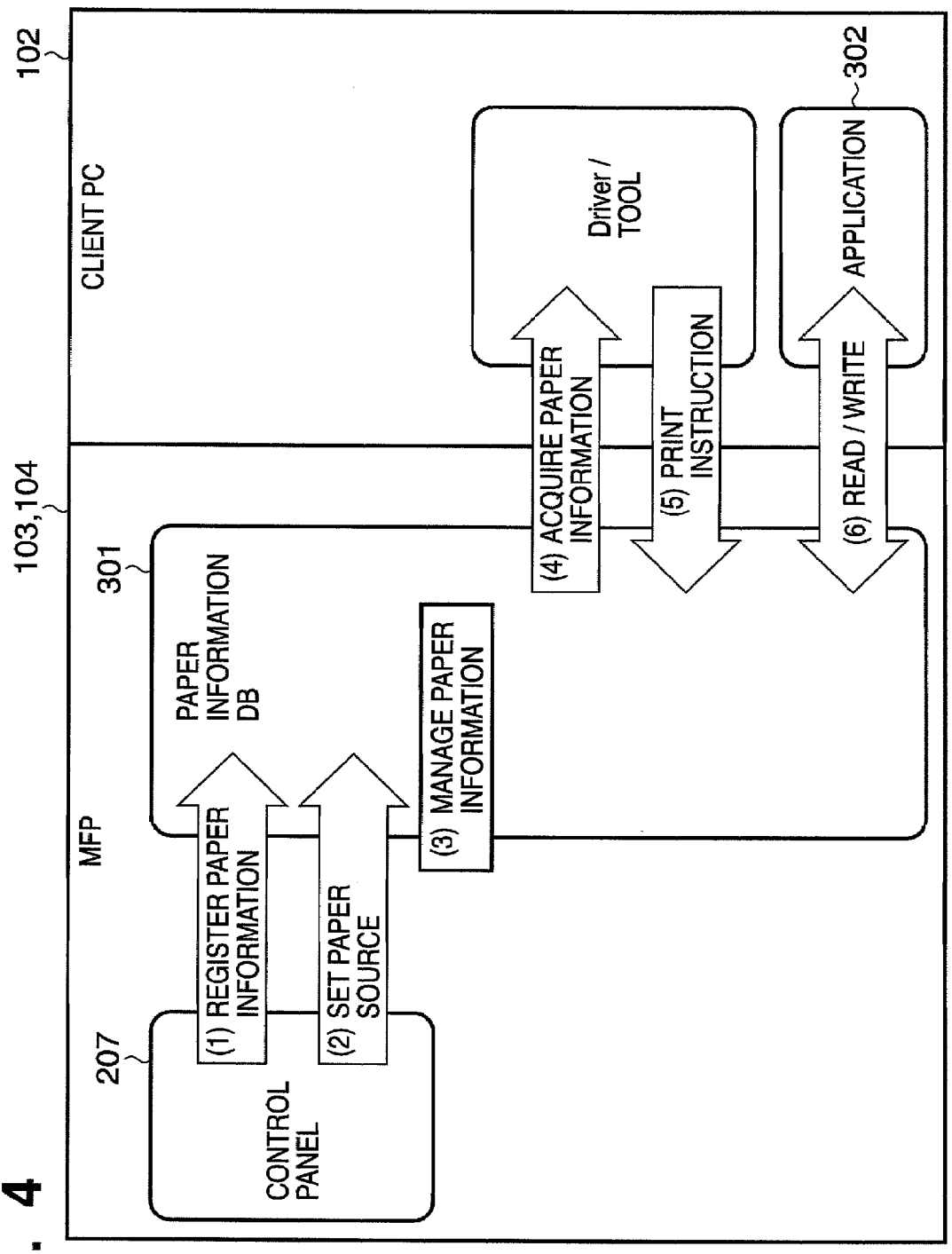
FIG. 4 is a chart showing the procedures of the paper information system.

FIG. 4 shows the principal procedures upon handling paper information.

The procedures upon handling paper information are roughly classified into the following six procedures. 1. Paper information registration: The paper information registration is a process for registering new paper information by the system administrator using the control panel of the device. 2. Paper source setting: The paper source setting is a process for assigning paper information to each of paper sources. The operator can make the paper deck setting for inactive paper sources. 3. Paper information management: The paper information management is a process for assigning unique paper IDs to paper sheets registered as defaults or new paper sheets registered by the system administrator, and managing paper names and paper parameters in a database. 4. Paper information acquisition: The paper information acquisition is a process for downloading paper information in the paper information database using a driver or the like by the client PC. 5. Print instruction: The print instruction is a process for designating paper information upon issuing a print startup instruction using the driver or the like by the client PC. 6. Read/write: The read/write is a process for importing or exporting data in the paper information database using a RUI or the like.

[Structure of Paper Information Database]

Figure 5:
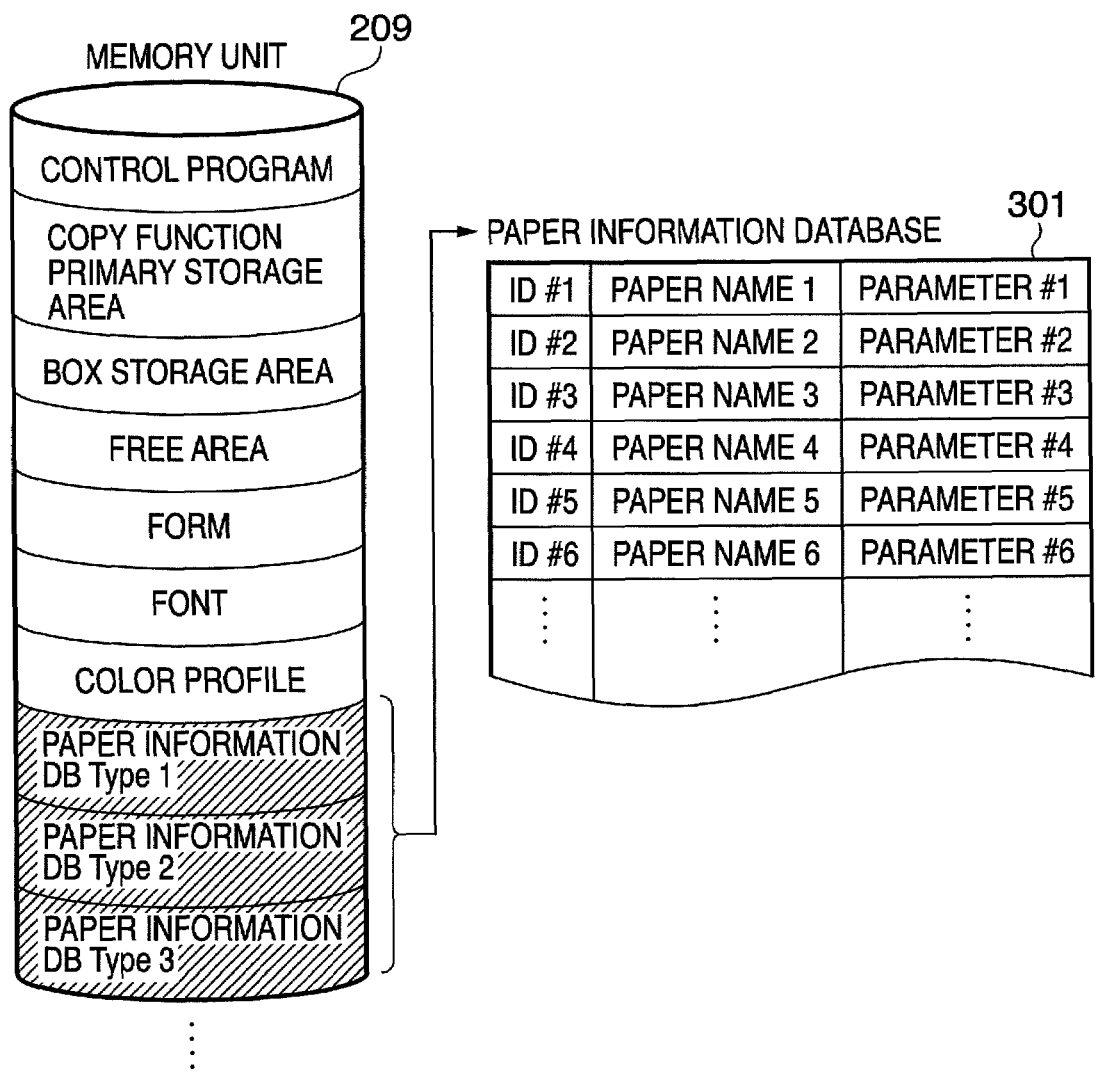
FIG. 5 shows the configuration of a paper information database.

The configuration of the paper information database 301 will be described below using FIGS. 5 and 6. The left side of FIG. 5 shows the configuration of the memory unit 209 included in the printing device (also called the MFP) itself of the printing system of this embodiment. The memory unit 209 generally comprises a hard disk, in which an area for a control program which activates the MFP itself, and image areas (for example, an image temporary save area upon using the copy function, an image save area upon using the box function, and the like) are assured. Also, resource areas (forms used in image composition, font data and color profiles used in PDL print), and the like are assured. Note that the resource areas store the paper information database 301 including those for Type 1, Type 2, and Type 3. The stored paper information database 301 includes paper IDs, paper names, paper parameters, and the like, as shown on the right side in FIG. 5.

Figure 6:
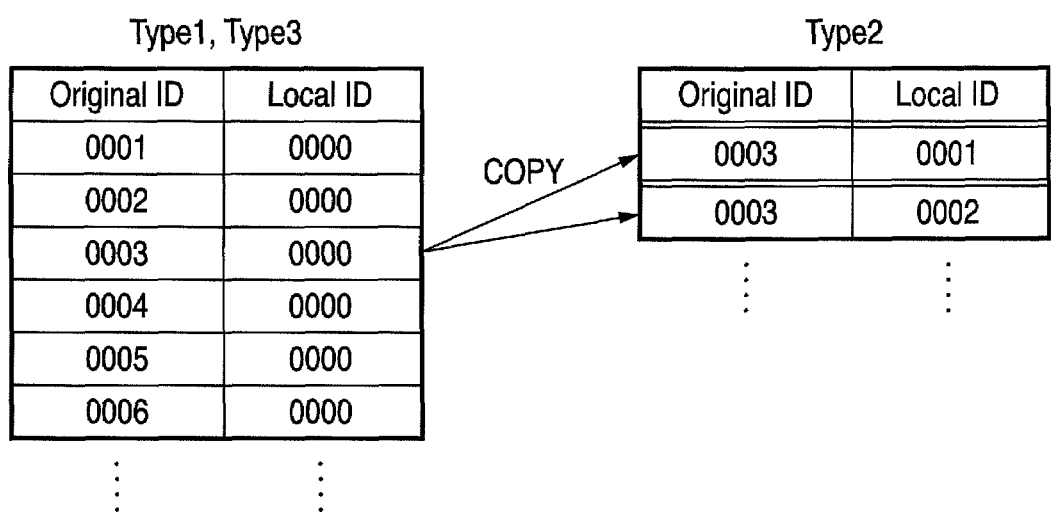
FIG. 6 shows the configuration of a paper information ID.

As shown in FIG. 6, each paper ID includes two IDs: an original ID and local ID. By managing ID numbers in combination of original IDs and local IDs, they can be managed using a unique ID code system in at least one MFP. If a common ID code system is used among a plurality of MFPs, IDs of a generic concept are prepared, or such system may be managed by operations. At this time, if the ID number of a given Type 2 paper sheet is known, an "original paper type" can be displayed based on its original ID.

The original IDs of Type 1 and Type 3 respectively have unique values, and all their local IDs are set to be zero as a default. As for distinction between Type 1 and Type 3, for example, management may be operatively made in such a manner that Type 1=0000H to 0FFFH and Type 3=1000H to FFFFH. Assume that Type 2 data is generated by copying Type 1 (or Type 3) data with a paper ID 0003H (original ID)-0000H (local ID). In this case, every time the original data is copied, the local ID is sequentially incremented like 0003H-0001H, 0003H-0002H, ... so that the local IDs do not overlap each other. Alternatively, the database is searched for Type 2 data of the same original ID, and the largest local ID of hit data is incremented by 1 to obtain a new local ID of Type 2 data. Even when Type 2 data with a given ID is erased, that number is set as an unused number or the like. Thus, even when the MFPs exchange paper information, its ID does not overlap. In this manner, operational rules are determined together.

As for the paper names, the paper names for Type 1 are those generally used in the office environment such as "plain paper", "heavy paper 1", "recycled paper", "punched paper", "OHP", and the like. The user can freely define the paper names for Type 2 within the range of the predetermined number of characters. As the description method for the paper names for Type 3, unique names like "company name+paper name÷basis weight" are defined in advance and are registered in the database. A limitation on the number of characters that defines the same length is prepared for all Type 1, Type 2, and Type 3, and the number of characters of each name is suppressed to be equal to or shorter than that length upon registration.

The paper parameters include basic parameters and detailed parameters. The basic parameters are paper information parameters of a paper sheet itself such as "basis weight (weight of paper)", "surface nature (texture of paper)", "shape (punched paper sheets, tab sheets, and the like)", "color", and the like. On the other hand, the detailed parameters are control parameters used to attain optimal control of the device to fit the characteristics of that paper information like "adjustment of fixing temperature", "adjustment of secondary transfer voltage", "adjustment of creep correction amount", and the like. By changing the values of the detailed parameters, the process conditions of the print unit can be changed, or an optimal image and proper finishing can be obtained. For example, by changing temperature adjustment of a fixing device, glossy (shiny) finish or matt (muted) finish can be attained in gloss adjustment of finishing. By adjusting the transfer voltage of a secondary transfer charger, the toner application amount can be controlled, thus suppressing crush in shadows, highlight saturation, or fog of colors, and toner scattering in accordance with the basis weights and surface natures of paper sheets.

Furthermore, upon saddle stitching, since inner and outer paper sheets have different gutter amounts on the edge side, images may be cut upon trimming. To prevent this, an operation for gradually shifting the positional relationship between paper sheets and images on the inner and outer paper sheets is called a gutter shift. In this gutter shift, an amount of deviation of each page is a creep amount. Since this creep amount has a strong correlation with the thicknesses (or basis weights) of paper sheets, it is convenient to set the creep amounts for respective types of paper sheets.

[Arrangement of Control Panel]

Figure 7:
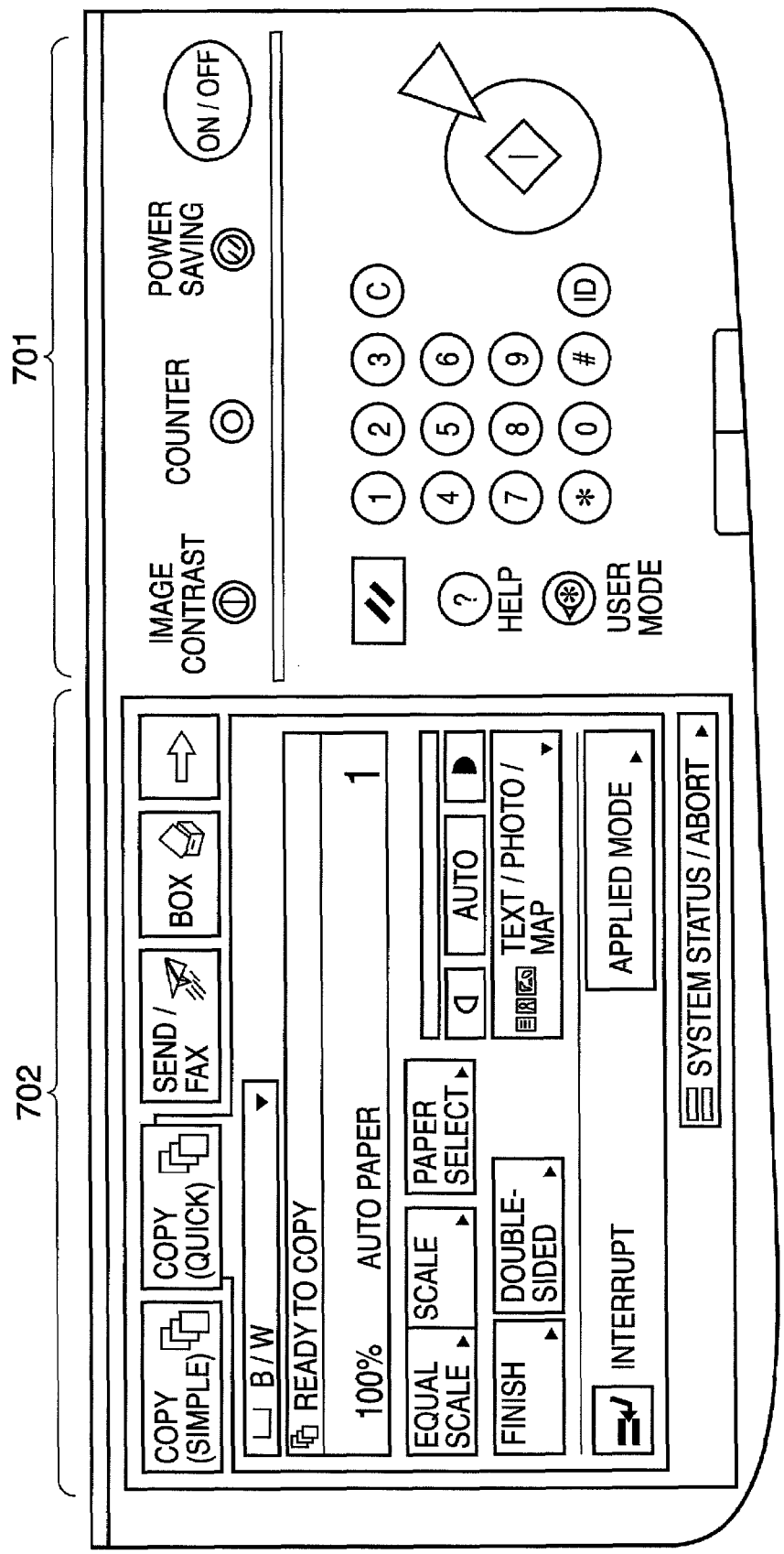
FIG. 7 is a view showing an example of the arrangement of a control panel.

The control panel will be described below using FIG. 7. FIG. 7 shows the control panel 207 of the MFP. The control panel 207 includes a key input unit 701 and touch panel unit 702. The touch panel unit 702 comprises a touch panel display including an LCD (Liquid Crystal Display) and transparent electrodes adhered to the LCD. The touch panel unit 702 is preprogrammed such that when the user touches a transparent electrode portion corresponding to a key displayed on the LCD, for example, another operation window is displayed upon detection of that touch. FIG. 7 shows an initial window in a standby mode. The touch panel unit 702 can display operation windows in response to setting operations.

Figure 8:
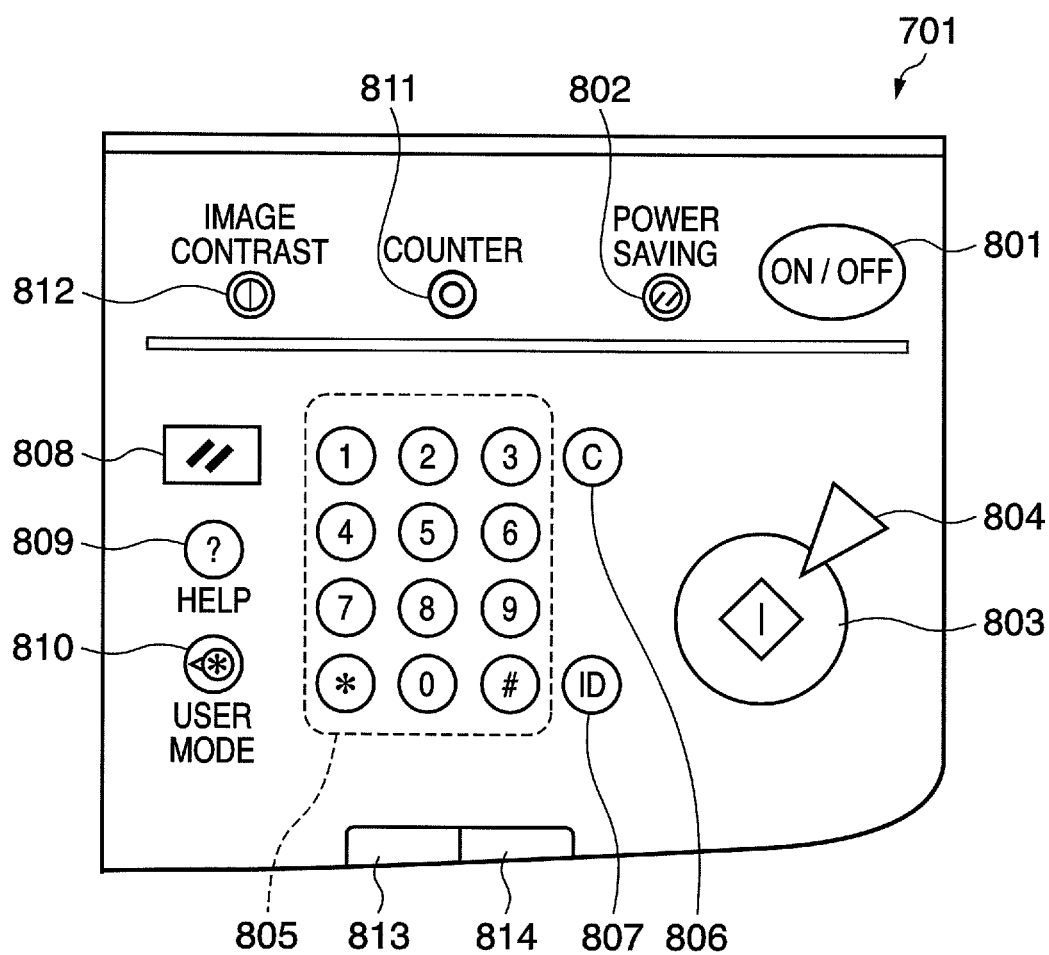
FIG. 8 is a view showing an example of the arrangement of a key input unit in the control panel.

FIG. 8 is an enlarged view of the key input unit 701 which allows the user to make routine operation settings.

A control panel power switch 801 is used to switch between a standby mode (normal operation state) and sleep mode. In the sleep mode, a main controller halts a program in an interrupt waiting state to prepare for network print or FAX, thus suppressing power consumption. This control panel power switch 801 can be controlled while a main power switch (not shown) that supplies electric power of the entire system is ON.

A power saving key 802 is used to lower the control temperature of a fixing device in the standby mode. When the user presses the power saving key 802 to start a power saving mode, a relatively long time is required to reach a printable state, but power consumption can be suppressed. The control temperature can also be lowered by setting a power saving ratio.

A start key 803 is used to give the instruction to start copy, sending, and the like, and a stop key 804 is used to stop these operations.

A numeric keypad 805 is used to input numeric values of various settings, and a clear key 806 is used to clear the numeric value. An ID key 807 is used to make the operator of the MFP input a predetermined personal identification number so as to authenticate that operator.

A reset key 808 is used to invalidate various settings and to revert to defaults. A help key 809 is used to display guidance and help. A user mode key 810 is used to make a transition to a system setting window for each user.

A counter confirmation key 811 is used to display the number of output sheets, which is stored in counter software in the MFP, which counts the number of printed sheets and the like. Upon pressing of the counter confirmation key 811, the numbers of output sheets can be displayed in correspondence with the operation modes such as the copy mode, print mode, scan mode, FAX mode, and the like, the color modes such as the color mode, monochrome mode, and the like, the paper sizes such as a large size, small size, and the like, and so forth.

An image contrast dial 812 is used to adjust the viewability of the screen by, for example, controlling a backlight of the LCD of the touch panel unit 802.

An execution/memory lamp 813 flickers in the in-execution state of a job and the in-access state of a memory to notify the user of them. An error lamp 814 flickers in the case of occurrence of errors such as a job execution error state, a serviceperson call, and the like or an operator call that notifies the user of paper jam, out of expendables, and the like, thus notifying the user of them.

[Procedure of Paper Selection]

Figure 9:
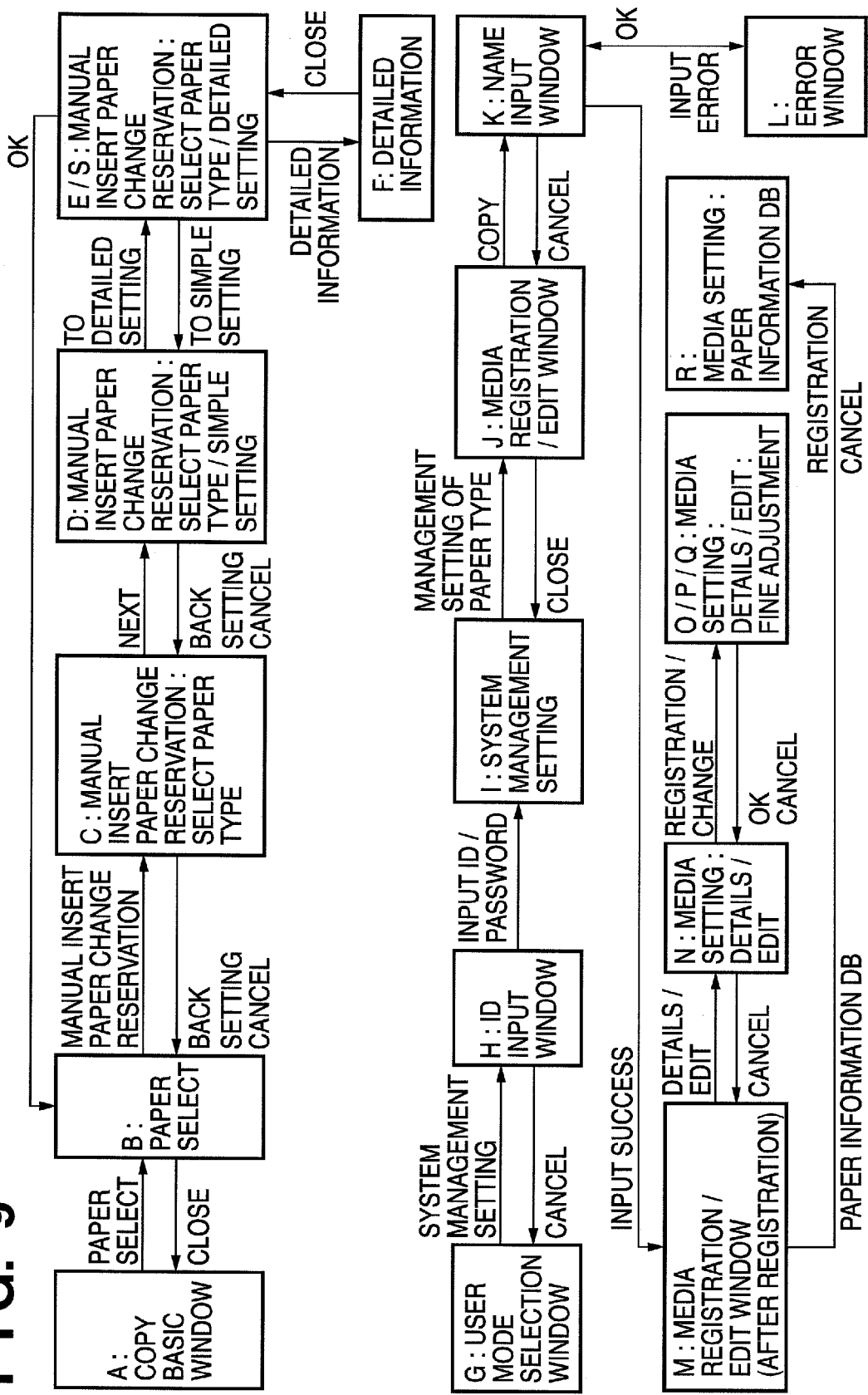
FIG. 9 is a transition chart of a touch panel unit in the control panel.

The control panel will be described below using FIG. 9. A to I respectively indicate display windows of the touch panel of the control panel, and state transitions are made upon pressing touch panel keys in respective windows. The respective windows are used to fulfill the following roles for displaying, setting, and so forth of paper information. A: copy basic window, B: paper selection, C: manual insert sheet change reservation: select paper type, D: manual insert sheet change reservation: selection of paper type/simple setting, E: manual insert sheet change reservation: selection of paper type/detailed setting, F: detailed information, G: user mode selection window, H: ID input window, I: system management setting, J: media registration/edit window, K: name input window, L: error window, M: media registration/edit window (after copy), N: media setting, O: detail/edit: basis weight, P: detail/edit: surface nature, Q: detail/edit: adjustment of fixing temperature, R: media setting: paper information database, S: manual insert sheet change reservation: selection of paper type/detailed setting (after setting).

[Copy Basic Window]

The copy basic window will be described below using FIG. 10. Copy tabs 1001 are tab keys used to make a transition to an operation window of a copy operation, and two tabs, that is, a copy (simple) tab and copy (quick) tab, are prepared.

The copy (quick) tab displays an arrangement of many keys so that the skilled operator in the POD environment can quickly complete routine settings in a shallow layer. Conversely, the copy (simple) tab displays a key arrangement used in the normal office environment.

A send tab 1002 is a tab key used to make a transition to an operation window to give the instruction to send FAX or e-mail data. A box tab 1003 is a tab key used to make a transition to a window that allows the user to input/output jobs in a box (storage means for storing jobs for each user). An option tab 1004 is a tab key used to set expansion functions such as a scanner setting, and the like. A system monitor key 1005 is used to display the state and status of the MFP. By selecting respective tabs, corresponding operation modes can be selected.

A color selection setting key 1006 is used to select in advance a color copy mode, monochrome copy mode, or automatic selection mode. A scale setting key 1007 is used to make a transition to a window that allows the user to set scales such as an equal scale, enlarged scale, reduced scale, and the like. A post-processing setting key 1008 is used to make a transition to a window that allows the user to set the presence/absence, number, positions, and the like of stapling, punching, and the like. A double-sided setting key 1009 is used to make a transition to a window that allows the user to select a single- or double-sided print mode. A paper selection key 1010 is used to make a transition to a window that allows the user to select a paper source, paper size, and media type. An image mode setting key 1011 is used to select an image mode such as a text mode, picture mode, and the like suited to an original image. A density setting key 1012 is used to adjust the density of an output image to be higher or lower.

A status display area 1013 makes simple status display such as a standby state, warming up, jam, error, and the like. A scale display area 1014 displays a scale set by the scale setting key. A paper size display area 1015 displays the paper size and mode set by the paper selection key. A sheet count display area 1016 displays the number of sheets designated by the numeric keypad, and also what sheet number is being printed during operation.

Furthermore, an interrupt key 1017 is used to interrupt the current copy operation and to execute another job during interruption. An applied mode key 1018 is used to make a transition to a window that allows the user to set various image processes, layouts, and the like such as page continuous shot, cover/insert sheet setting, reduced-scale layout, image move, and the like.

[Paper Selection Setting Window]

Windows associated with the selection and setting of print sheets, that is, paper sheets in the print settings of the printing device will be described below using FIGS. 11 to 17. By clicking the paper selection key 1010 in FIG. 10, the current window transits to that shown in FIG. 11. FIG. 11 shows a paper selection main window.

An automatic paper selection button 1101 is designated when the user wants to print by automatically selecting an optimal paper size and type based on setting information associated with image formation other than paper sheets.

Paper source designation buttons 1102 correspond to respective paper sources. By operating one of these buttons, paper feeding of print sheets from that paper source is designated.

A manual insert button 1103 is used to designate paper feeding from a manual insert tray on the side surface of the main body.

Furthermore, as for a manual insert sheet change reservation button 1104, the manual insert tray is often used to use print sheets of an unordinary type since paper sheets on that tray can be easily switched. This manual insert sheet change reservation button 1104 is designated upon successively inputting print jobs, upon executing printing by changing manual insert sheets used in the current print job later, upon setting print sheets on the manual insert tray after the settings, and so forth.

Figure 11:
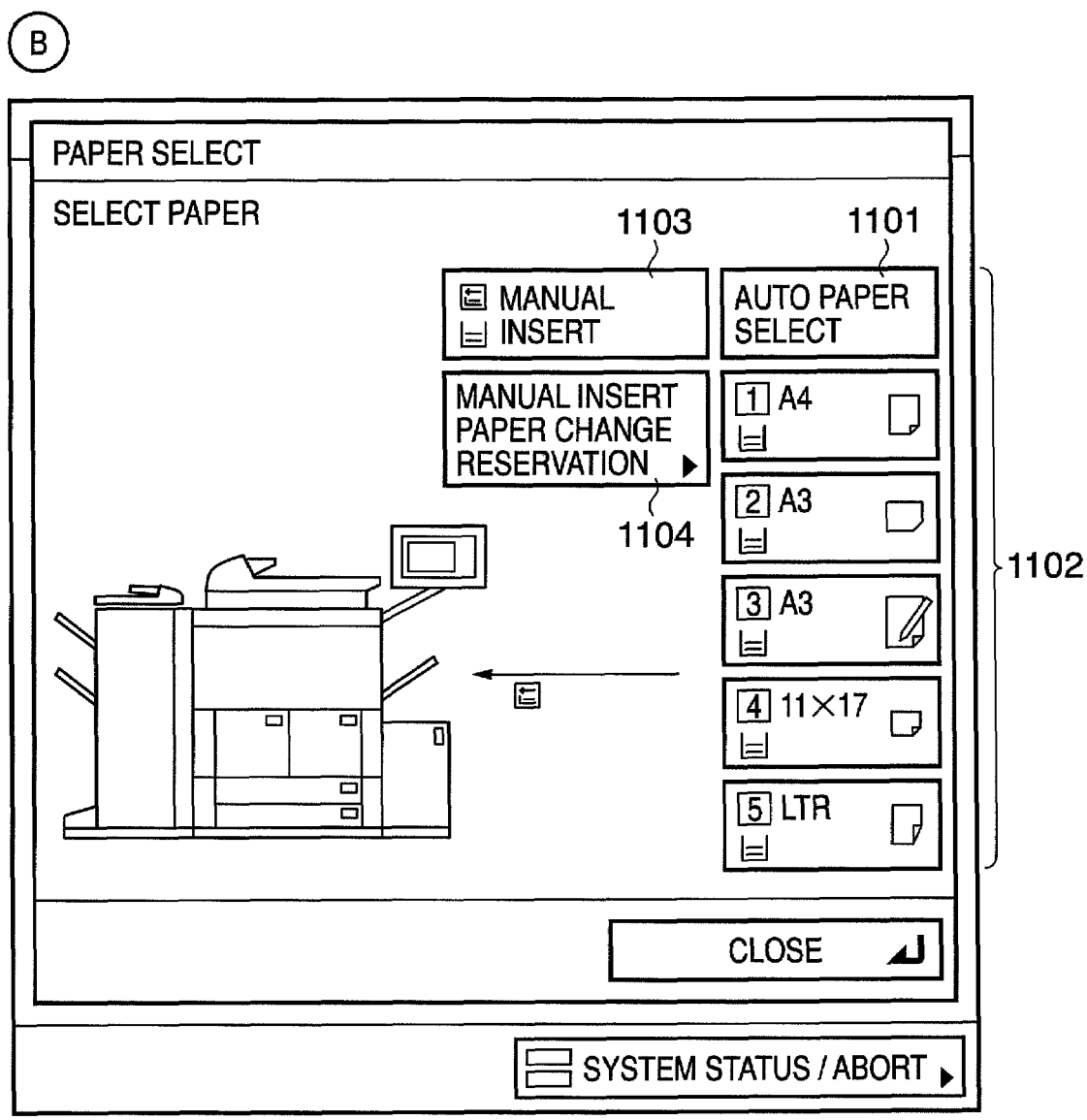
FIG. 11 is a view showing an example upon setting paper information from the touch panel unit in the control panel.
Figure 12:
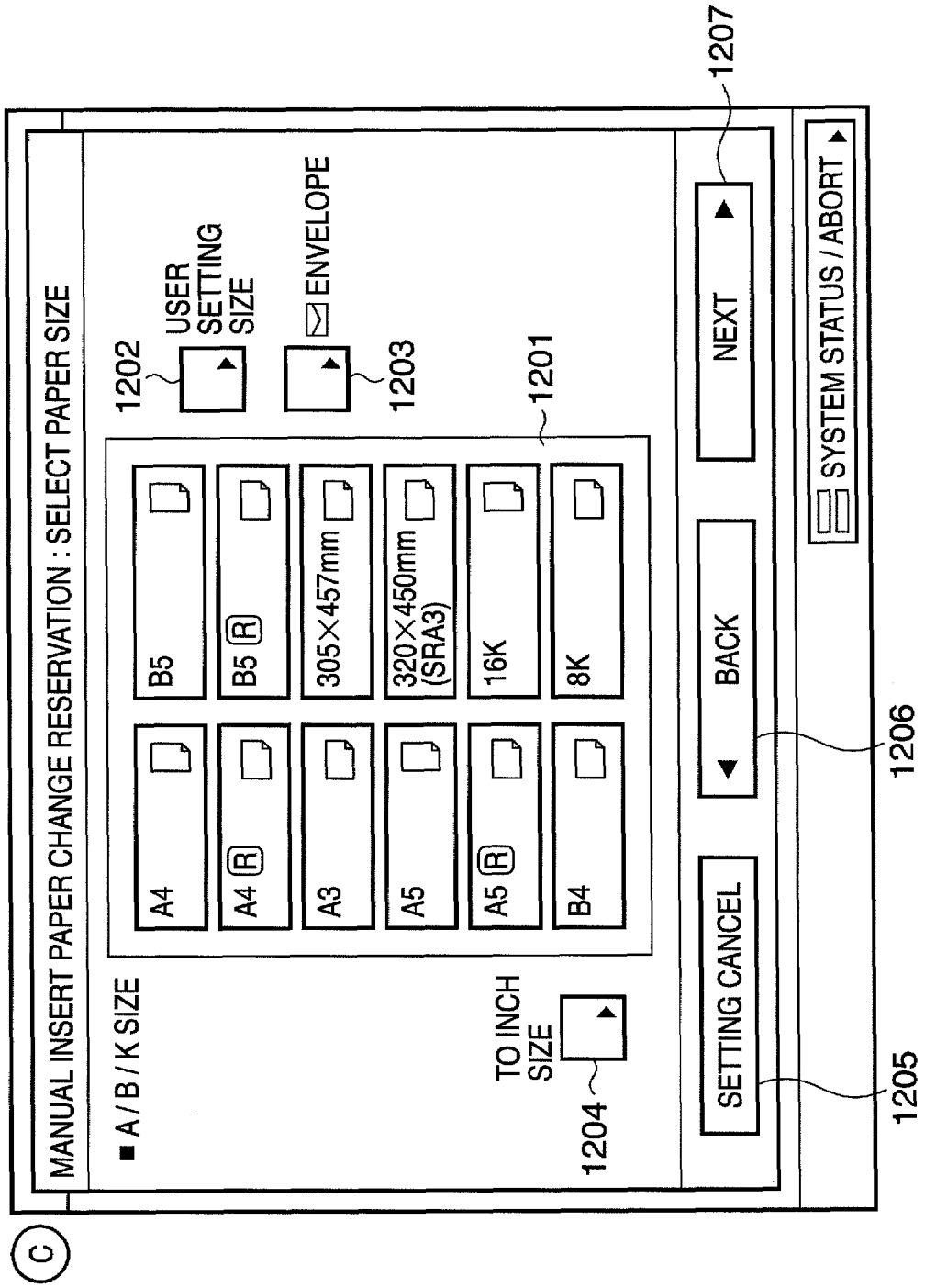
FIG. 12 is a view showing an example upon setting paper information from the touch panel unit in the control panel.

By designating the manual insert sheet change reservation button 1104 in FIG. 11, the current window transits to a manual insert sheet change reservation: selection of paper type window shown in FIG. 12.

The user sets, on this window, the paper size and paper type of print sheets which are to be set on the manual insert tray upon printing.

On this window, buttons 1201 used to designate paper sizes are arranged. Characters and icons indicating the paper sizes and directions are displayed on the buttons.

The user can select a desired paper size from these buttons.

Upon designating a special paper size, the user selects a user setting size button 1202 that allows him or her to designate a size in mm or inches in place of the prescribed sizes.

A key 1204 reading "to inch size" is a button used to switch designation of a paper size from the size indication of the A and B series specified by ISO to the inch-based size indication used in Britain, the U.S., and Europe. A setting cancel key 1205 is used to cancel the paper setting and to close the paper setting window. A back button 1206 is a button used to return to the paper selection window based on the paper sources shown in FIG. 11.

A next key 1207 is a button used to settle the setting of the paper size on this window and to transit to a setting window of a paper type to be set next. The user selects the paper size of print sheets to be set on the manual insert tray shown in FIG. 12, and then presses the next key. After that, the user selects the paper type.

FIG. 13 shows a window displayed upon operating the next button in FIG. 12.

On this window, buttons for Type 1 paper sheets such as "plain paper", "heavy paper 1", "recycled paper", "punched paper", "OHP", and the like are arranged. Characters indicating paper types are displayed on the buttons. The user can select a desired paper type from these buttons.

Since only a predetermined number of paper type selection buttons are displayed on this window, only paper types which are to be frequently used are normally displayed. However, since there are several hundreds to several thousands of paper types based on differences of their basis weights, gloss levels, surface finishing states, and the like, many paper types cannot be displayed on this window.

For this purpose, a detailed setting window button 1301 is prepared. Upon operating this button, a detailed list window in selection of paper types is displayed.

A setting cancel key 1302 is used to cancel the paper setting and to close the paper setting window as in the aforementioned key. A back key 1303 is a button used to return to the paper size selection window. A next key 1304 serves as an OK button used to settle the setting about the paper type, and to close this window.

Figure 14:
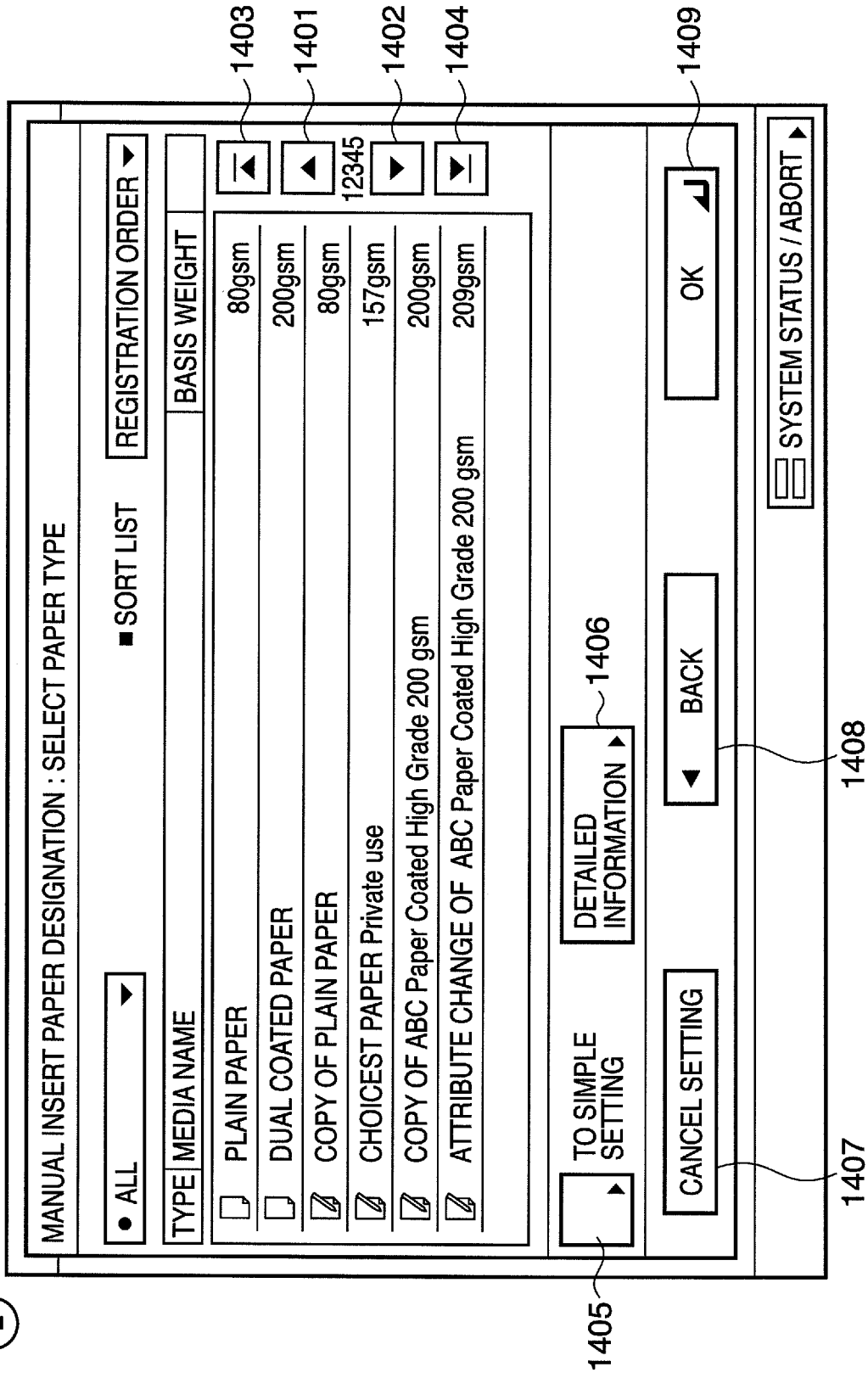
FIG. 14 is a view showing an example upon setting paper information from the touch panel unit in the control panel.

FIG. 14 shows a window displayed upon operating the detailed setting window button in FIG. 13. This window is used to select a paper type as in the window shown in FIG. 13.

The window shown in FIG. 13 displays the buttons used to select the paper type. However, the paper type selection window shown in FIG. 14 displays a list of paper types, and makes the user select a paper type from that list.

An up arrow key 1401 and down arrow key 1402 on the right side of FIG. 14 are page feed buttons of the paper type list. When paper types cannot be displayed within one page on the paper type list, these buttons are designated to display the previous or next page. In some cases, since paper types run to several hundreds to several thousands of types, the number of pages may become considerably large. In consideration of such case, a button 1403 used to display the first page of the paper type list and a button 1403 used to display the last page are also displayed.

To return to FIG. 13 again, a simple setting window button 1405 is used. In this way, the user can freely change whether to display the simple setting window that displays only designated paper types, or the list display window that can display all paper types.

Upon operating a detailed information key 1406, a window that displays detailed information of the currently selected paper type in the paper type list is displayed, as shown in FIG. 15. The information of the paper type displayed on the detailed information window includes the surface nature, shape, and the like in addition to the full text of the name and basis weight.

A setting cancel key 1407 is a button used to cancel the paper settings, and to close the paper setting window. A back key 1408 is a button used to return to the paper size selection window in FIG. 12. An OK key 1409 is a button used to settle the setting associated with the paper type, and to close this window.

FIG. 16 shows the same window as in FIG. 14, and also shows details of respective parts. When the user wants to sort the paper type list, he or she uses an upper right list sort designation key 1601. Upon designating this button, criteria used to re-sort the display order of paper types in the paper type list can be selected. By selecting one sort order from those displayed in this list, the display order of paper types in the paper type list shown in FIG. 14 is switched to the selected sort order. The sort orders displayed in the sort order selection list include a registration order, an order of the Japanese syllabary (or alphabetical order), a numeric value order of basis weights, and the like. The sort order selection list is automatically closed after the sort order is designated.

An upper left filter designation key 1602 is a filter designation button used to select the category or categories of paper types to be displayed. Upon operating this button, "Type" or "Types" of paper types can be designated. Hence, only paper types of the designated category or categories are displayed in the paper type list, and the user can select a desired paper type from that list. As the categories of paper types, paper types registered in the device in advance, paper types which are registered by the user himself or herself, and the like can be designated.

Furthermore, icons indicating the categories of paper types, the names of paper types, and basis weights are displayed on a selection candidate paper list 1603. The user designates a desired paper type from those displayed in this list. As shown in FIG. 16, the icons of paper types are classified based on Type 1, Type 2, or Type 3. However, only Type 1 or Type 2 may be displayed as this classification, and only data of Type 3 copied to Type 2 once may be displayed. In the following description, a case will be exemplified wherein only Type 1 and Type 2 are displayed.

[Structure of Paper Source Information]

The structure of paper source information will be described below using FIG. 17. The paper source information is paper information that links with paper sources prepared in the printing device, that is, cassettes, paper decks, a manual insert tray, and the like.

Figure 17:
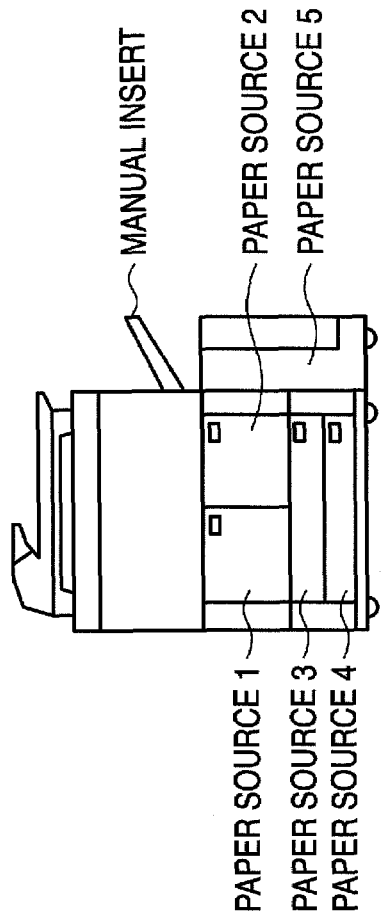
FIG. 17 is a view for explaining paper source information of a device.

As shown in the table of FIG. 17, respective paper sources are associated with paper sizes or paper types. The paper sizes and paper types are registered in advance from the control panel, and the paper types use information of the aforementioned paper information database.

As the paper source information to be handled here, for the paper sources selected in FIG. 11, the paper sizes are selected in FIG. 12, and are associated with the paper types in FIG. 13 or 14, thus obtaining the paper source information table shown in FIG. 17.

[Registration and Edit of Paper Information]

The procedures of registration and edit of paper information will be explained below using FIGS. 18 to 30. When the operator wants to register or edit paper information, he or she presses the user mode key 810 in operator presses a system management setting key 1801 on this window. At this time, the presence/absence of the authority of the system administrator (or operator) is confirmed for the operator. This is because paper parameters can be input to or edited in paper information in addition to the paper name. If the operator selects a paper type regardless of the print function settings and the paper types that can implement such functions, not only may printing itself be incorrectly done, but also deterioration of durability, damages, and the like of the device may occur. For this reason, whether or not the user has the system administrator authority is confirmed, as shown in FIG. 19. After that, the window in FIG. 19 transits to that shown in FIG. 20. On this window, the user presses a paper type management setting key of some system administrator authority keys.

Figure 22:
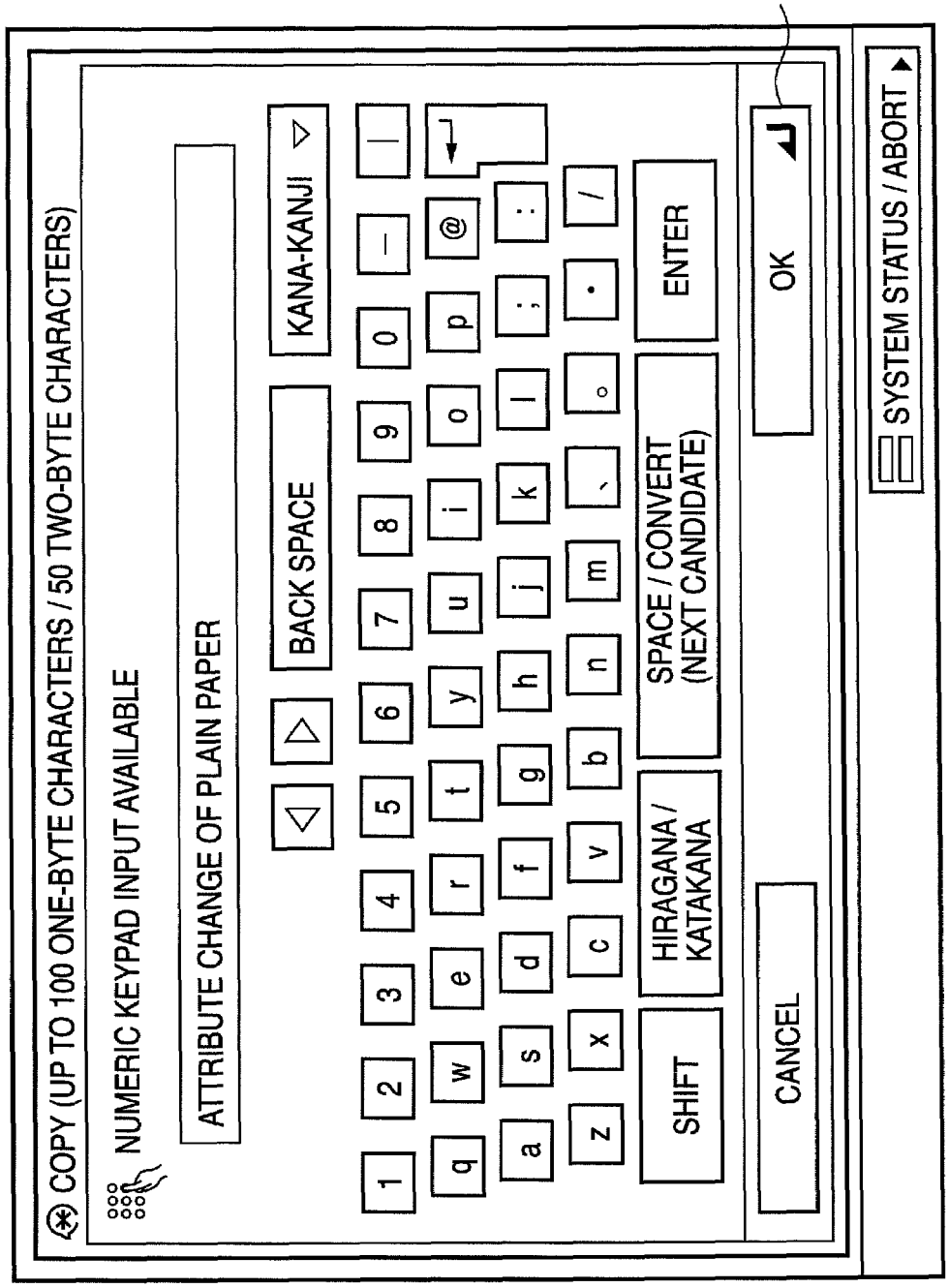
FIG. 22 is a view showing an example upon registering paper information from the touch panel unit in the control panel.
Figure 23:
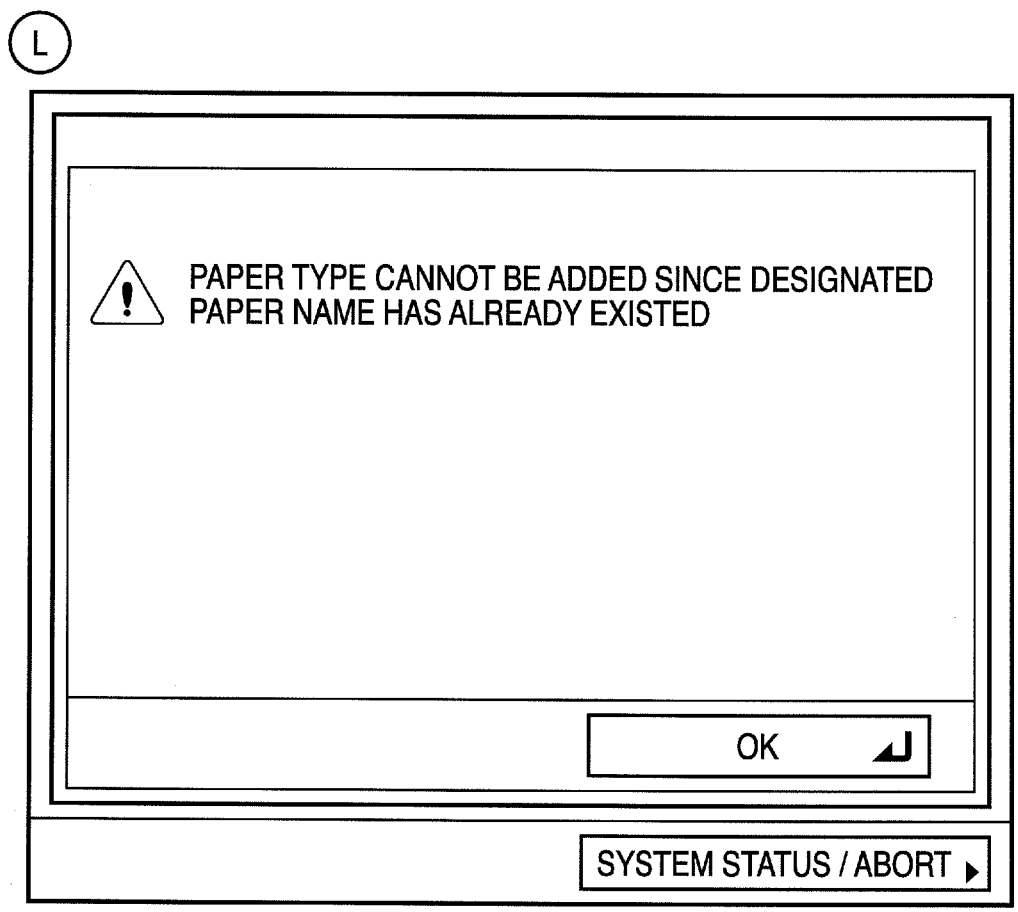
FIG. 23 is a view showing an example upon registering paper information from the touch panel unit in the control panel.

A window shown in FIG. 21 is the same as that in FIG. 14 as for the list display of paper information, the list filtering function, and the list sorting function, except for a lower key arrangement. Upon pressing a copy key 2101, a window shown in FIG. 22 appears to allow the user to input a paper name. FIG. 22 shows an example in which the user copies paper information "plain paper" to create paper information "attribute change of plain paper". At this time, the number of characters is limited to the predetermined number of characters.

Upon pressing an OK key 2201, the input operation of the paper name is complete, and new paper information "attribute change of plain paper" appears in a list display shown in FIG. 24. However, for example, if the operator inputs a paper name "copy of plain paper" which has already existed, and presses the OK key, a window shown in FIG. 23 appears, and he or she cannot register that name. For this reason, all Type 2 data on the database are registered to have different names, and the user can select a paper sheet without confusion.

This embodiment exemplifies a case wherein the same paper names of Type 2 data are exclusively denied. However, since the paper IDs have uniqueness, as described above, a system that allows registering the same names may be programmed. Conversely, when the user copies Type 3 data to Type 2 and registers new paper information, this embodiment permits setting the same names for Type 2 and Type 3. However, unique names may be given to be distinguished from each other throughout Type 1, Type 2, and Type 3.

Referring back to FIG. 24, an erase key is used to erase the registered Type 2 paper information from the database. Upon pressing of this key, the paper information "attribute change of plain paper" registered in FIG. 21 is deleted to revert to the original contents of FIG. 21.

Furthermore, a detail/edit key 2402 allows the user to set parameters of each paper information. Upon pressing this key, the current window transits to that shown in FIG. 25, and the user can change parameters such as the basis weight, surface nature, shape, color, adjustment of the fixing temperature, that of the secondary transfer voltage, that of the creep correction amount, and the like in addition to the paper name.

On this window, when the user presses a registration key 2501 or one of change keys 2502 on the right side in FIG. 25, he or she can set the paper name again or can change each parameter. For example, when the user presses the basis weight change key, a window shown in FIG. 26 appears. When the user presses the surface nature change key, a window shown in FIG. 27 appears. When the user presses the change key of adjustment of the fixing temperature, a window shown in FIG. 28 appears. The window in FIG. 26 displays the basis weight in gsm (gram/square meter), which can be changed from a predetermined lower limit value to an upper limit value using a plus (+) key and minus (−) key. The user can also input a change value using the numeric keypad shown in FIG. 8. After the change value is input, the user presses an OK key. If the user presses a cancel key, the window can return to that in FIG. 25 without any change.

Figure 27:
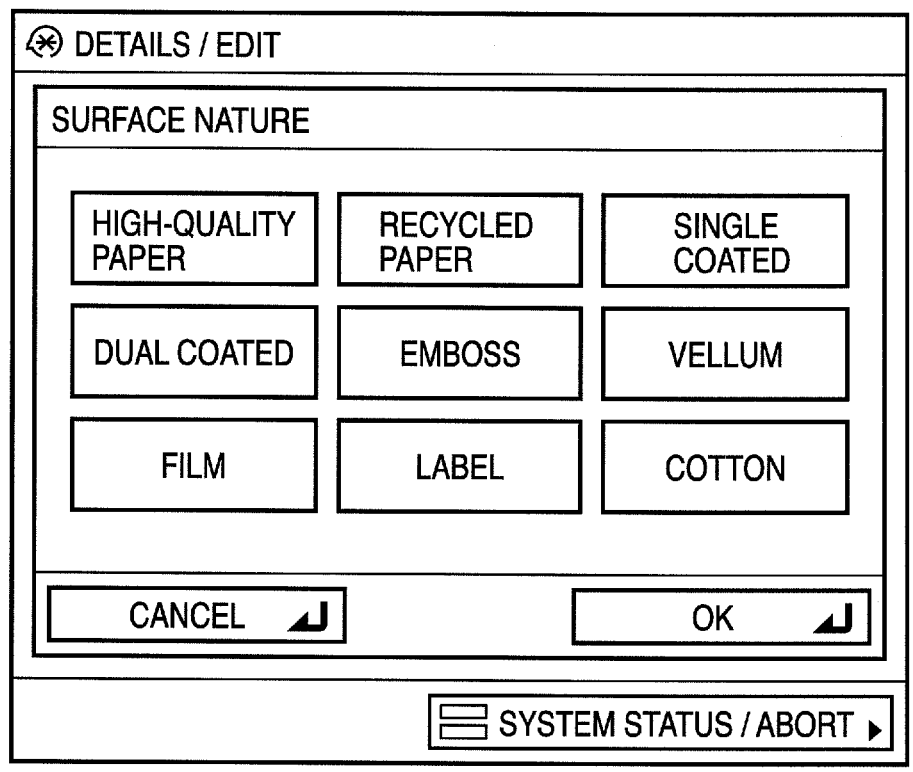
FIG. 27 is a view showing an example upon registering paper information from the touch panel unit in the control panel.

Likewise, upon changing the surface nature, the user can select a desired surface nature from surface nature (only those which can be supported by the printer are displayed) keys prepared in advance, as shown in FIG. 27. Furthermore, upon changing adjustment of the fixing temperature, the user can change it from a predetermined lower limit value to an upper limit value using a plus (+) key and minus (−) key. The setting values will be described later.

Referring back to FIG. 24, upon pressing a paper information DB (database) key 2403, the paper information database 301 registered in advance in this MFP can be called. FIG. 29 shows an example of the paper information database 301. A list 2901 that displays the contents of the paper information database 301 displays the paper IDs, paper names, and basis weights. That is, the control panel 207 displays several hundred to several thousand pieces of paper information included in the paper information database 301 in the form of a list. Up and down keys on the right side are used to scroll the list. A lower left paper ID input key is used to designate the paper ID using the numeric keypad in FIG. 8. By inputting the paper ID using the numeric keypad, the user can quickly find paper information with the known ID, or can make the displayed contents jump to the Type 3 database around the input paper ID. A right neighboring detailed information key is used to browse detailed information of the selected paper information, and the user can see the detailed information shown in FIG. 15. A cancel key is used to return to the window in FIG. 24. A registration key is used to register the selected Type 3 paper information as new Type 2 paper information. At this time, if the name of the selected Type 3 paper information is not registered in the Type 2 database, that information can be registered without changing its name.

If new paper information is registered, the window transits to that in FIG. 24. The user presses a close key on this window to temporarily end the management setting operation of paper types. When the window returns to the paper setting window in FIG. 14 again, new paper information "attribute change of plain paper" 3001 is added, as shown in FIG. 30. On this window, the user can select the newly generated paper information "attribute change of plain paper" 3001 to perform a copy operation and the like based on new paper attributes, that is, the information "attribute change of plain paper" 3001 by the same operation as that described above using FIG. 14. Furthermore, in this case, the new paper information "attribute change of plain paper" 3001 is added, as shown in FIG. 51 or 53 (to be described later), and printing is done according to its attribute information.

[Basic Parameter Range of Paper Sheet]

The range of paper information will be described below using FIG. 31. FIG. 31 is a table that summarizes basic parameters of paper sheets. Paper sheets to be handled by the MFP can be classified based on "basis weight", "surface nature", and "shape". The process conditions of the MFP are specified within the classified ranges to operate the MFP.

Conventionally, paper types are defined within only the predetermined range of a paper group such as "plain paper", "heavy paper 1", "recycled paper", "punched paper", "OHP", and the like, and the user selects a desired paper type within the given range. This range corresponds to that with the gray background in FIG. 31.

By contrast, by making operations using the aforementioned paper information setting means, paper types can be freely expressed as combinations of "basis weight", "surface nature", and "shape". For this reason, the setting range is not limited to the gray range in FIG. 31, and paper types can be selected from the ranges of "basis weight", "surface nature", and "shape" that the device allows. For this reason, the range of paper types that can be supported is greatly broadened.

Furthermore, the concept of the parameter ranges for the conventional Type 1 and Type 3 changes. That is, as shown in FIG. 32, the conventional Type 1 paper sheets have a range of sort of paper group having given widths, while Type 3 paper sheets themselves are individually registered. The basis weights of these paper sheets are inevitably expressed by pinpoint values of their basis weights. For this reason, Type 2 paper sheets are also inevitably expressed using pinpoint values. Even when a Type 2 paper sheet is formed by copying a Type 1 paper sheet, a parameter is set as the basis weight of the Type 2 paper sheet as a copy destination using the median value or representative value of the Type 1 paper sheet as a copy source.

[Detailed Parameter Range of Paper Sheet]

As for the range of detailed parameters, detailed parameters can be given to each range in FIG. 32, and the width of its optimization control is broadened greatly. A parameter change is expressed by:

$$\text{Parameter} = \text{default value} \pm \alpha \pm \beta \quad (1)$$

where the default value is an optimal value (or representative value) of the MFP itself, and $\alpha$ is an optimal value (or representative value) of a paper group. The paper group is uniquely determined by a combination of "basis weight", "surface nature", and "shape" in the table of FIG. 31, and one box of the table has one $\alpha$ value. Furthermore, $\beta$ is a value for fine adjustment of each paper sheet, and each paper information database can have an adequate value.

Figure 28:
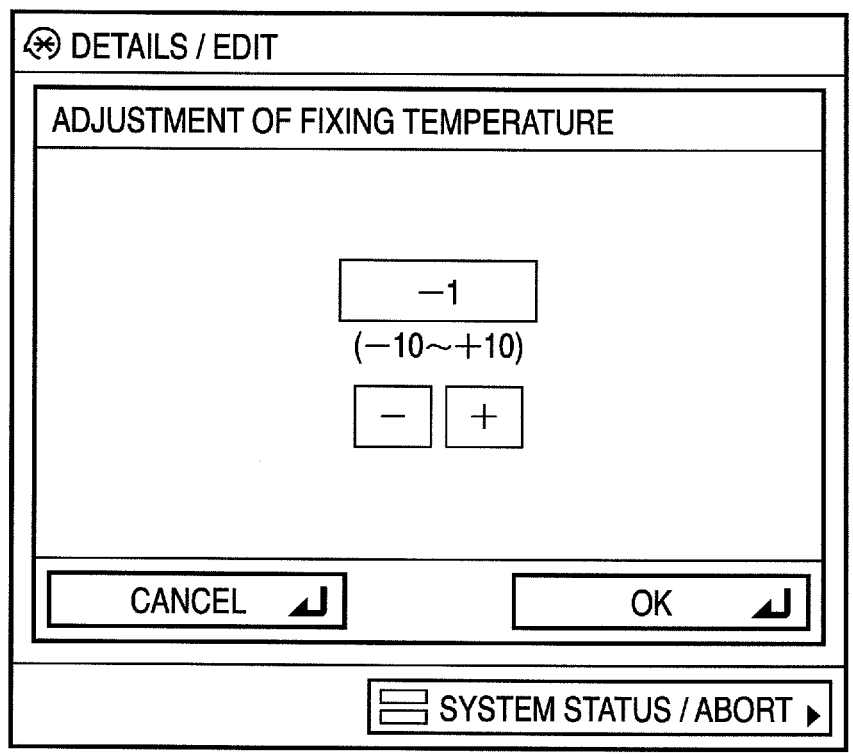
FIG. 28 is a view showing an example upon registering paper information from the touch panel unit in the control panel.

For example, adjustment of the fixing temperature will be taken as an example. The default value is set to be 180° C. The $\alpha$ values are set and held in the MFP such that −3° C. are set for "thin paper", 0° C. for "plain paper", 2° C. for "heavy paper 1", 4° C. for "heavy paper 2" and 5° C. for "heavy paper 3". Furthermore, $\beta$ is set, as shown in FIG. 28. However, since even the system administrator cannot recognize the effect of adjustment in a temperature description, he or she makes an input within a range from −10 to +10. When the lower limit value of $\beta$ is −2° C. and the upper limit value of $\beta$ is +2° C., the temperature can be set in increments of 0.20° C. In this way, the Type 2 paper sheets can store their unique optimal values for each paper information database.

Figure 26:
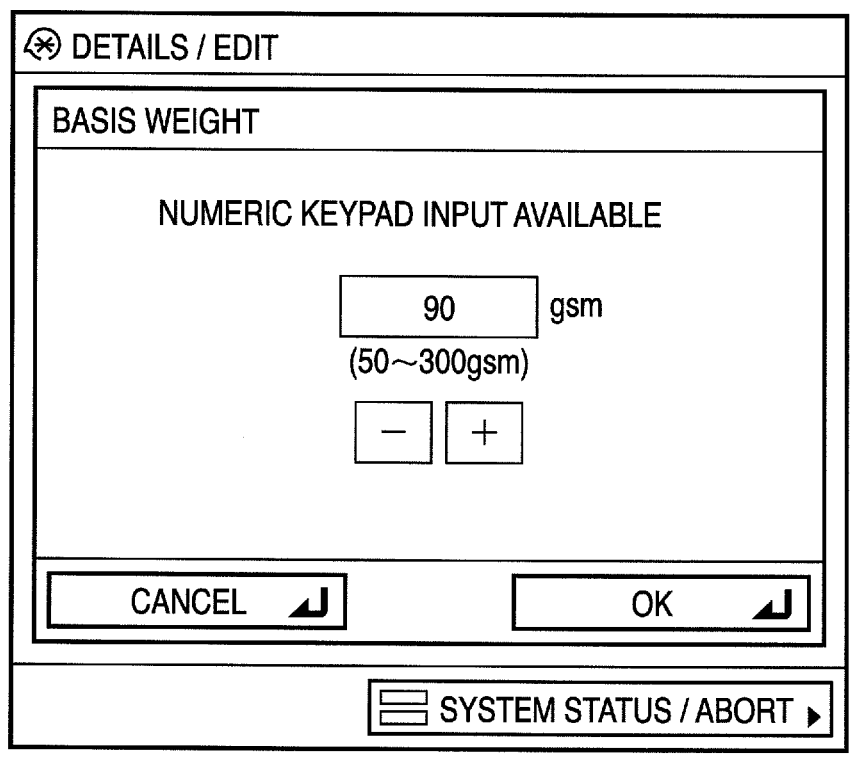
FIG. 26 is a view showing an example upon registering paper information from the touch panel unit in the control panel.

The reason why the two control values $\alpha$ and $\beta$ are separately used is to provide, to the user, optimal values on some level of even only the $\alpha$ values of the paper group determined by combinations of "basis weight", "surface nature", and "shape" of the table of FIG. 26. Furthermore, the user who wants further adjustment is allowed to make a detailed setting using the $\beta$ value. In this way, adjustment in two stages is provided.

Independently of the parameter value given by equation (1), the $\alpha$ and $\beta$ values are specified so as to prevent any jams and errors, or image deteriorations such as toner scattering, over the application amount limitation, or the like from being caused by the parameter in the MFP.

[Contents of Paper Information Database]

The contents of the paper information database 301 will be described below using FIGS. 50 to 53. FIG. 50 shows an example of the contents of the paper information database 301 for Type 1 paper sheets. FIG. 51 shows an example of the contents of the paper information database 301 for Type 2 paper sheets. FIG. 52 shows an example of the contents of the paper information database 301 for Type 3 paper sheets. FIG. 53 shows an example of the contents of the paper information database 301 for Type 1 and Type 2 paper sheets, displayed on the control panel.

For example, plain paper of Type 1 has a basis weight=80 to 105 gsm (or 80 gsm as a representative value), a surface nature=high-quality paper, a shape=standard, a color=white, a fixing temperature=180° C., a fixing rate=240 mm/sec, a secondary transfer voltage=1.0 kV, and a creep amount=0.10 mm.

The data of these tables are independently stored for Type 1, Type 2, and Type 3, and FIGS. 50 to 52 correspond to them.

FIG. 53 describes extraction of data displayed in the list of the control panel 207. As can be seen from FIG. 53, both Type 1 and Type 2 are mixed as paper types. The new paper information "attribute change of plain paper" which is not stored in the paper information database 301 at the time of FIG. 14 is added to the paper information database 301 when the state shown in FIG. 30 is reached.

The tables shown in FIGS. 50 to 53 are managed using parameter values after calculations given by equation (1), for the sake of simplicity. However, only control panel inputs ($\beta$ values) may be managed in the databases, and calculations may be sequentially made by calling predetermined default value tables or a value tables for respective paper sheets inside the MFP.

[Print Procedure]

Figure 33:
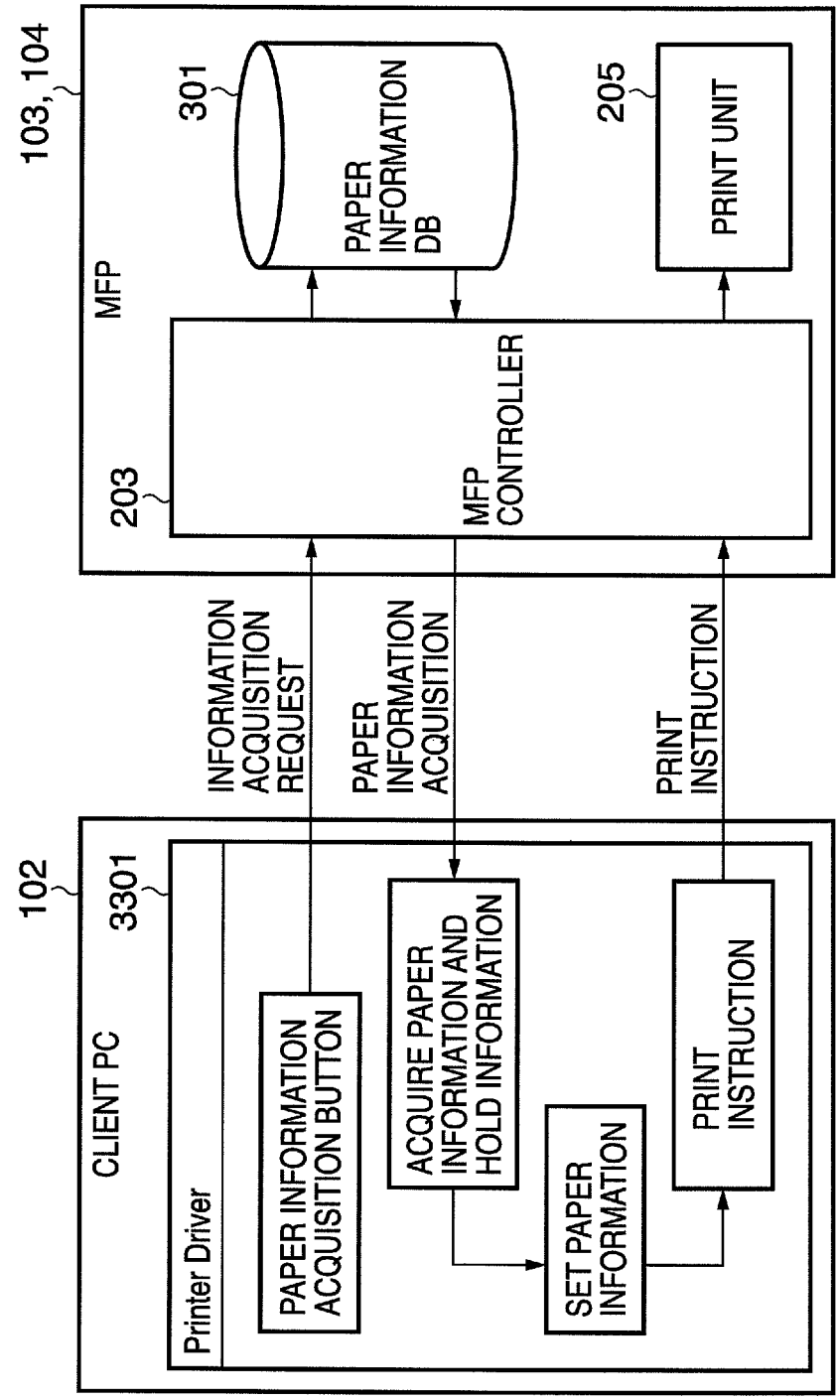
FIG. 33 is a chart showing the procedure upon using a printer driver.

The print procedure will be described below using FIG. 33. The left side corresponds to the client PC 102, and the right side corresponds to the MFP 103 or 104. A printer driver 3301 is installed on the client PC 102. The user launches application software, and then the printer driver 3301 from there. The user issues a print instruction after desired print settings. The print unit 205 starts printing in accordance with this instruction. This is the normal print procedure.

Upon issuing a print instruction using a conventional paper type (Type 1), the aforementioned method does not pose any problem. This is because the printer driver 3301 itself has all pieces of information of paper types (Type 1). However, the user wants to set a Type 2 paper sheet in this embodiment. For this purpose, the client PC 102 must download paper information set and registered on the MFP 103 or 104 side from the paper information database 301. Hence, the printer driver 3301 must have a paper information acquisition function 3302.

The paper information acquisition function 3302 may be either implemented by polling or event-driven. However, normally, a plurality of client PCs are prepared. Particularly, in an office environment, several hundreds of client PCs may often be connected to one MFP. If these client PCs are connected based on polling, the MFP side must respond to respective polling requests of these client PCs. Hence, this method is not appropriate in consideration of the whole system. For this reason, the event-driven system is used. Since paper information is not a function which is added or edited frequently, the paper information acquisition function can be sufficiently used if it is generally executed upon setup or update of the MFP or each client PC.

As paper types to be acquired by the paper information acquisition function 3302, all of Type 1, Type 2, and Type 3 can be technically acquired. Generally considered, the drive side must have Type 1 from the beginning. Since the paper information acquisition function 3302 is enabled only when it is connected to the MFP, if the driver displays no paper information from the beginning, the user's operability is poor. Since there are several hundreds to several thousands of Type 3 data, problems that downloading of the database takes a lot of time, and the display operation is troublesome and such large numbers of data cannot be displayed within a limited range even if the database is downloaded. Hence, downloading of Type 3 data is not appropriate, either. For this reason, it is wise enough to download only Type 2 information. The printer driver side saves the downloaded Type 2 paper information. This is to allow prompt use of information when the user opens the printer driver the next time, and to prevent the network load from increasing every time paper information is downloaded.

Then, the printer driver can display both Type 1 information and Type 2 information as paper information. In the subsequent procedure, the user selects desired paper information from the displayed information, and issues a print instruction.

In this embodiment, the example of the printer driver has been presented. If this scheme is applied, the present invention can also be applied to application software and utility software. More specifically, when the paper information acquisition function is embedded in the application software and utility software as a software module, the paper information can be acquired from the MFP side. By using this function, if the user uses the acquired paper information upon issuing a print instruction, he or she can designate desired paper information in the same manner as the printer driver. Also, the print instruction is not limited to protocols. If job ticket data like a JDF (Job Definition Format) file is sent to the MFP side together with image data, and the MFP side can interpret the JDF file, paper information can be reflected upon printing at the MFP.

[Setting Window of Printer Driver]

A UI (setting window) of the printer driver will be described below using FIG. 34. The setting window of the printer driver is displayed when the operator generally selects a print menu of a print application upon printing print data using the print device such as the MFP or the like.

The operator selects a print device to be used from a "printer name" pull-down list box 3401 on this setting window. Then, the status of the print device is displayed in a "status" field 3402, the type of the printer driver is displayed in a "type" field 3403, the setting place information of the print device is displayed in a "place" field 3404, and comment information from the print device administrator is displayed in a "comment" field 3405. When the operator wants to output print data to a file without actually printing it by the print device, he or she checks an "output to file" check box 3406.

In a "print range" area 3407, the operator selects one of radio buttons "all", "current page", "selection", and "pages" to designate a page or pages to be printed. If the operator selects the radio button "pages", he or she inputs a page number or page numbers to be printed in an edit box.

Furthermore, the operator selects an attribute of a document to be printed using a "print what" pull-down list box 3408, and designates using a "print" pull-down list box 3409 whether all pages or only odd or even pages are to be printed.

In a "copies" area 3410, the operator inputs the number of copies to be printed in a "number of copies" spin box, and checks a "collate" check box if he or she wants to print a plurality of copies not in a page unit but in a copy unit.

In a "zoom" area 3411, the operator designates an N-up print mode (a print mode for laying out a plurality of pages per print face) using a "pages per sheet" pull-down list box. Then, the operator selects a paper size with respect to a document size using a "scale to paper size" pull-down list box.

When the operator completes the settings on the setting window of the printer driver, he or she can print the print data by the print device such as the MFP or the like or can output it to a file by pressing an "OK" button 3412. When the operator wants to stop printing or file output, he or she can press a "cancel" button 3413.

At this time, when the operator presses a "property" button 3414, the window transits to that shown in FIG. 35 to allow the operator to set print attributes in more detail. On the upper left portion of FIG. 35, four tabs, that is, a page setup tab, finishing tab, paper source tab, and quality tab, are prepared, and the following description will be given using the paper source tab 3501 closely related to the paper information setting.

A "select by" area 3502 is assured on the upper right side, and when the operator selects "paper source", he or she sets the paper designation method using the position of the paper source such as cassette 3, deck 1, or the like. At this time, printing is done using paper sheets stocked in the designated paper source independently of the size or type of paper sheets to be fed. When the operator selects "paper type", he or she can select paper information of Type 1 and Type 2. The operator selects paper information via a paper setting dialog displayed upon pressing a "set" button 3503 of each page in a "paper selection" area. FIG. 36 shows an example of the paper setting dialog. This paper setting dialog displays a list of the attributes of Type 1 and Type 2 paper sheets as a type list 3601. Note that Type 1 paper sheets which are displayed as paper types and are selectable as print sheets are those which are selected from a paper type list box 3801 on a "paper source and paper assignment dialog" shown in FIG. 38. The user selects a paper sheet that he or she wants to use from the paper type list 3601 on the paper setting dialog. Incidentally, the user can also browse "attribute change of plain paper" registered on the MFP side here.

Items to be displayed on this paper setting dialog include the paper names, types, basis weights, paper colors, surface natures, and shapes. The paper names are prepared in advance for Type 1, and those which are registered on the MFP side are displayed for Type 2. The types include Type 1 or Type 2, and the basis weights are described in units of gsm. In case of Type 1, the basis weight range (X gsm to Y gsm) unique to the MFP may be described, or representative values may be described, as shown in FIG. 36. The paper colors are those which are registered on the MFP side such as red, blue, green, and the like. Likewise, the surface natures include high-quality paper, recycled paper, single coated, dual coated, emboss, vellum, film, label, and the like. The shapes include normal, tab paper, punched paper, and the like. All these items which are set and registered on the MFP side are displayed.

Upon clicking a lower right "paper information acquisition" button, the aforementioned paper information acquisition function runs. Information to be acquired includes the Type 2 paper information database, and the paper source table (paper information set in each paper source). This operation also starts at the timing when the user presses a "device information acquisition" button 3701 on a device setting sheet of a printer property in FIG. 37.

Furthermore, upon clicking a "paper source and paper assignment" key 3702 on the lower right side of FIG. 37, a "paper source and paper assignment" dialog in FIG. 38 opens. As for the relationship between the paper source information and paper type used in the printer driver, that selected on this "paper source and paper assignment" dialog is used. This dialog does not display any paper information acquired for Type 2.

Figure 39:
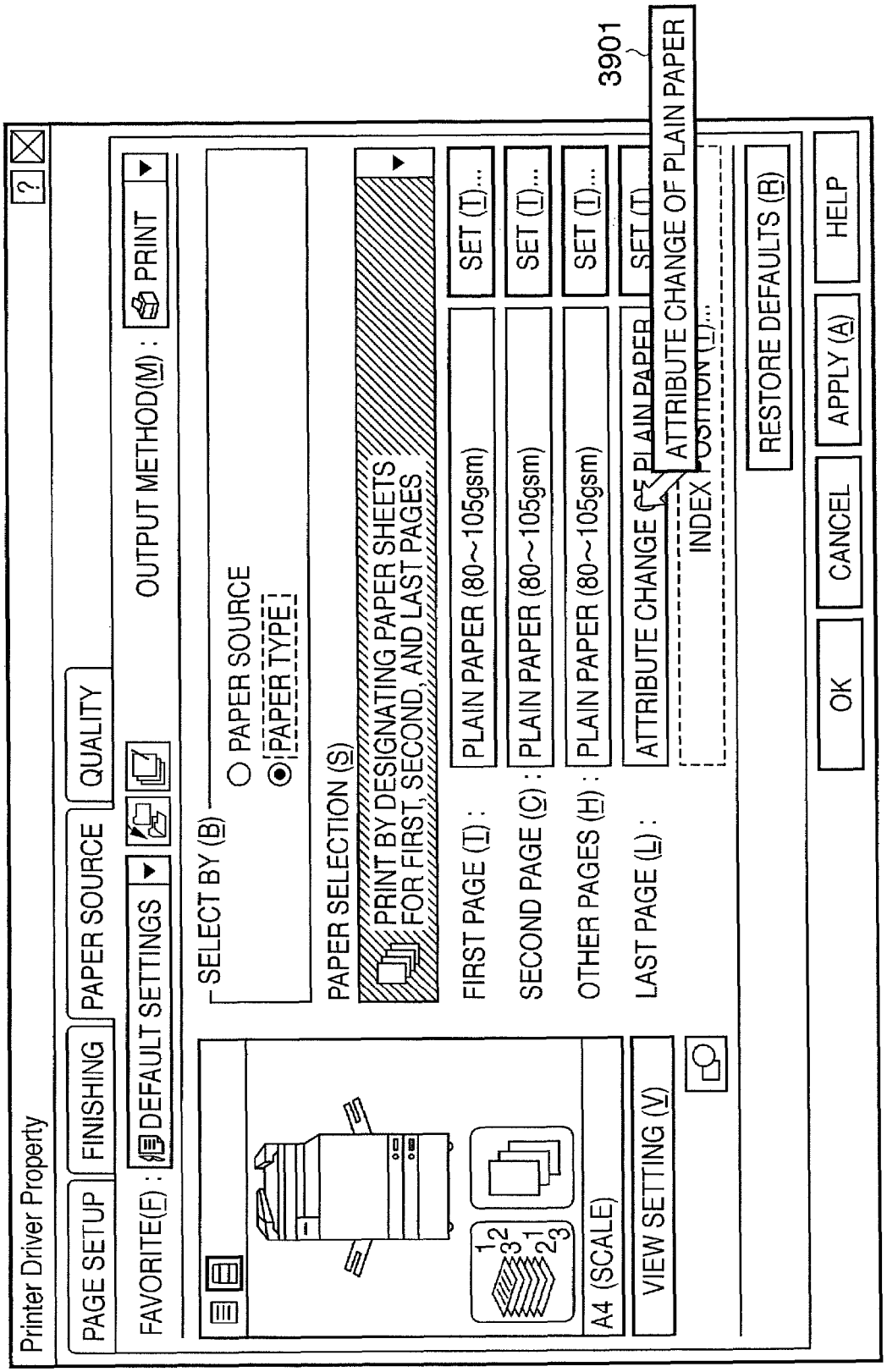
FIG. 39 is a view showing an example upon setting paper information from the printer driver.
Figure 40:
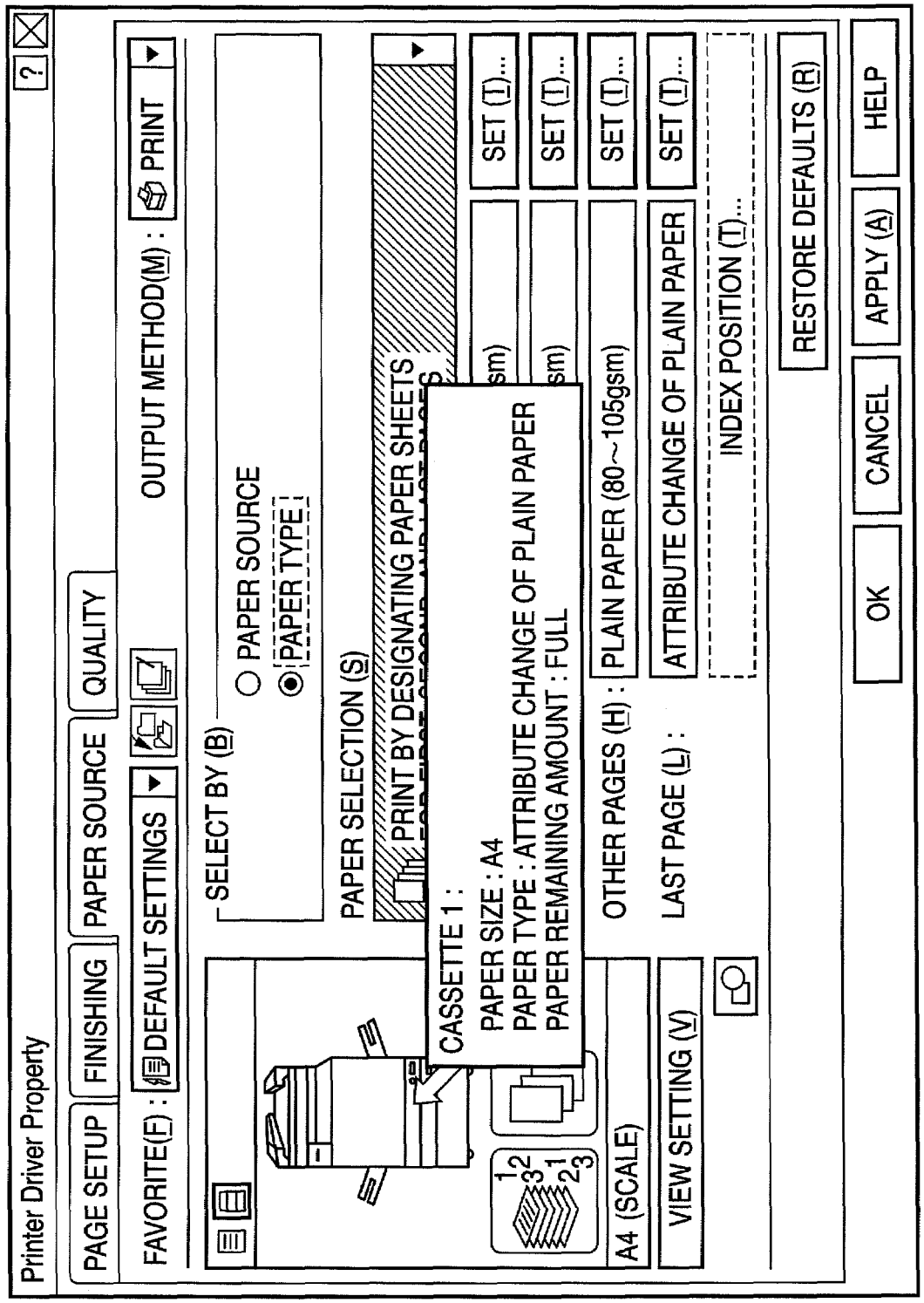
FIG. 40 is a view showing an example upon setting paper information from the printer driver.

Referring back to FIG. 35 again, a case will be examined wherein a Type 2 paper sheet is set for "last page" in the settings of respective pages of "Paper selection". If a paper sheet "attribute change of plain paper" is set as the setting of "last page", a description "attribute change of plain paper" 3901 appears on this window, as shown in FIG. 39. At this time, upon displaying the selected paper type name in a text box, when the maximum length of the name cannot be displayed, the full name is displayed using a tooltip when the user moves the mouse cursor on the text box. Also, as shown in FIG. 40, when the user moves the mouse cursor on the paper source of a device preview, the paper size, paper type, and amount of remaining paper are displayed.

[Arrangement of Print Unit]

The arrangement of the print unit of the MFP will be described below using FIG. 41. The MFP comprises a scanner unit, laser exposure unit, photosensitive drums, image forming unit 4101, fixing unit 4102, paper feed/convey unit, and printer controller (not shown) which controls these units.

The scanner unit optically scans a document image by irradiating a document placed on a document table with illumination, and generates image data by converting that image into an electric signal. The laser exposure unit emits light rays such as a laser beam modulated according to the image data to become incident on a rotary polygonal mirror (polygon mirror), which rotates at constant angular velocity, and irradiates the photosensitive drums with the light rays as reflected scanning light.

The image forming unit 4101 executes a series of electrophotography processes. That is, the image forming unit 4101 rotates the photosensitive drums, which are charged by chargers. The image forming unit 4101 visualizes latent images formed on the photosensitive drums by the laser exposure unit by toner, and transfers the toner images onto a print sheet.

The fixing unit 4102 comprises a combination of a roller and belt, and incorporates a heat source such as a halogen heater to melt and fix, by heat and pressure, the toner on the print sheet on which the toner images are transferred by the image forming unit.

The paper feed/convey unit has one or more print sheet storages represented by cassettes and paper decks, and picks up and feeds one sheet from a plurality of print sheets stored in each print sheet storage to the image forming unit and fixing unit in accordance with an instruction from the printer controller. Upon forming images on the two faces of a print sheet, the printer controller controls to make the print sheet which has passed through the fixing unit pass through a conveyance route that conveys the print sheet to the image forming unit again.

The printer controller communicates with an MFP controller which controls the whole MFP and executes control in accordance with its instruction. Also, the printer controller issues instructions so that all the units can smoothly operate to maintain a harmonious balance with each other, while managing the states of the scanner unit, laser exposure unit, image forming unit, fixing unit, and paper feed/convey unit.

[Operation of Printer Controller]

The printer controller will be described below. Upon power ON, the printer controller instructs the scanner unit, laser exposure unit, image forming unit, fixing unit, and paper feed/convey unit to start preparation operations, and waits for the start of a communication with the MFP controller which manages the entire MFP. When a communication with the MFP controller is established, the printer controller exchanges each other's device specifications with the MFP controller. After that, when the preparation operations of the respective units are complete, and the image forming operation is ready to be executed, the printer controller notifies the MFP controller of the operation ready state. The printer controller notifies the MFP controller of the device states of the respective units. For example, the printer controller detects the sizes of print sheets stored in the sheet storages, the remaining amount (stocked amount) of print sheets stored in the sheet storages, and the operation state (operative or in failure) of a drive unit of the paper feed/convey unit, and notifies the MFP controller of them. The printer controller notifies the MFP controller of the amounts of toners stored in toner containers of the image forming unit.

An overview of the operations of the respective unit from when the MFP controller 203 sends an operation instruction in the operation start ready state until a series of print operations are executed and completed will be described below. The MFP controller 203 sends an operation start command to the printer controller. Upon reception of the operation start command, the printer controller instructs the laser exposure unit, image forming unit, paper feed/convey unit, and fixing unit 4102 to start a print operation. The laser exposure unit starts rotation of a motor (polygon motor) which drives the polygon mirror. The image forming unit rotates and drives the photosensitive drums, and charges the photosensitive drums.

The fixing unit turns on a fixing heater to raise its temperature to that which allows the toner on a print sheet to be fixed onto the print sheet. The paper feed/convey unit sets drive means (motor) in a conveyable state. After the respective units of the device complete their preparation operations, the printer controller notifies the MFP controller of completion of preparation. Upon reception of the preparation completion message from the printer controller, the MFP controller 203 then gives the instruction to perform print operations for respective pages.

In the case of, for example, a print job including 10 pages for 20 copies, the MFP controller issues a print operation instruction for 200 pages. Upon reception of the print operation instruction, the printer controller issues a paper feed instruction to the paper feed/convey unit. If print sheets are ready to be fed, the paper feed/convey unit feeds and conveys one print sheet, and notifies the printer controller of arrival at a predetermined position when the print sheet has reached the predetermined position. If print sheets cannot be fed (e.g., when no print sheets are stored in the storage), the paper feed/convey unit notifies the printer controller of a paper feed error. The paper feed/convey unit often has a multi feed sensor which detects print sheets in an overlapping state (multi feed state) on the convey path, a thickness sensor which detects the thickness of a print sheet, and the like. When these sensors detect multi feeding or an abnormal state, the paper feed/convey unit interrupts the paper feed operation and conveyance operation, and notifies the printer controller of an abnormality. In this case, the printer controller notifies the MFP controller 203 of the reason for operation interruption, the position of the residual print sheet in the device, and the like. When a print sheet is normally conveyed and reaches the predetermined position, the printer controller instructs the image forming unit to start image formation in accordance with the predetermined position arrival message of the print sheet from the paper feed/convey unit. With this timing control, a toner image is transferred onto the print sheet.

The fixing unit 4102 monitors its temperature and controls to have an appropriate fixing temperature. However, when the amount of heat that the print sheet draws from the fixing unit 4102 is large, the temperature of the fixing unit may drop. In this case, the fixing unit 4102 notifies the printer controller of the temperature drop of the fixing unit. Upon reception of this notification, the printer controller spaces the conveyance timings of print sheets so as to prevent the temperature of the fixing unit from lowering any further. Even so, when the temperature of the fixing unit 4102 does not recover, the printer controller controls to temporarily interrupt the operation, and to restart the operation after the temperature recovers. Upon completion of discharge of all the print sheets, the printer controller instructs the respective units to stop the operation, and receives operation stop messages from the respective units. Then, the printer controller notifies the MFP controller of completion of the operations.

[Arrangement of Image Forming Unit]

FIG. 42 shows extraction of one station of the image forming unit 4101 of a 4-drum-based printing device. This station of the image forming unit is prepared for respective colors (Cyan, Magenta, Yellow, and Black). The photosensitive drum rotates clockwise in response to output instruction information. The following explanation will be given in turn from a cleaner unit.

The cleaner unit recovers residual toner on the photosensitive drum, and cleans the drum surface. A pre-exposure LED is used to erase a residual charge on the photosensitive drum. A primary charger has a discharge device called a grid, and charges a drum surface potential to a prescribed state. A potential sensor measures the surface potentials of a part (Vl) irradiated with a laser, and a non-exposed primary charge potential (Vd). After power ON, the potential sensor measures the surface potentials at a timing after, for example, a predetermined number of sheets are output, and changes the amount of light of the laser, charge bias, developing bias, and the like as needed. The developer forms a toner image in the latent image portion. After that, a print sheet is fed and conveyed at a predetermined timing, and a transfer charger electrostatically transfers a toner image onto the print sheet. Then, the print sheet advances to the next color (the fixing device in case of the station for the last color). A transfer sheet on which four color images have been transferred is conveyed to a fixing device (not shown) and undergoes application of pressure and heat to fix the toner images. After that, the transfer sheet is discharged outside the main body.

A voltage to be supplied to a secondary transfer charger is controlled in accordance with the value of "adjustment of secondary transfer voltage" in the paper information databases shown in FIGS. 50 to 53. By adjusting the transfer voltage of the secondary transfer charger, the application amount of toner can be controlled, thus suppressing crush in shadows, highlight saturation, or fog of colors, and toner scattering in accordance with the basis weights and surface natures of paper sheets.

[Arrangement of Fixing Unit]

Figure 43:
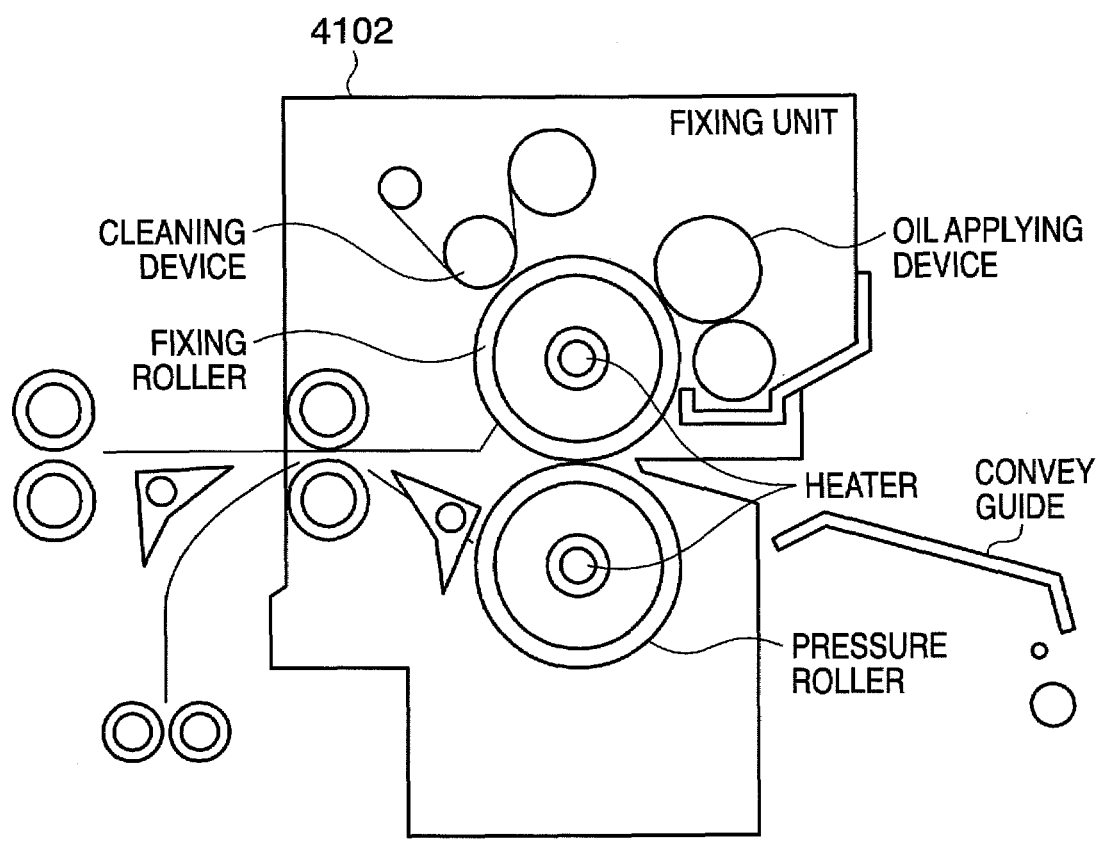
FIG. 43 is a sectional view of a fixing unit in the printer.

FIG. 43 is a schematic view showing the arrangement of the fixing unit 4102 of the color device. A print medium that has passed through a conveyance guide is conveyed to the fixing unit. The fixing unit fixes a toner image on the print medium by applying heat and pressure. As the arrangement of the fixing unit, the fixing unit comprises a rotatable fixing roller, a pressure roller which rotates while being in pressure contact with the fixing roller, an oil applying device, and a cleaning device. Inside the fixing roller and pressure roller, heaters such as halogen lamps or the like are arranged. The cleaning device cleans toner or the like offset on the fixing roller, and the oil applying device applies silicon oil or the like as a mold lubricant to the fixing roller. The oil applying device facilitates separation of the print medium from the fixing roller, and the cleaning device prevents offset of toner.

Figure 44:
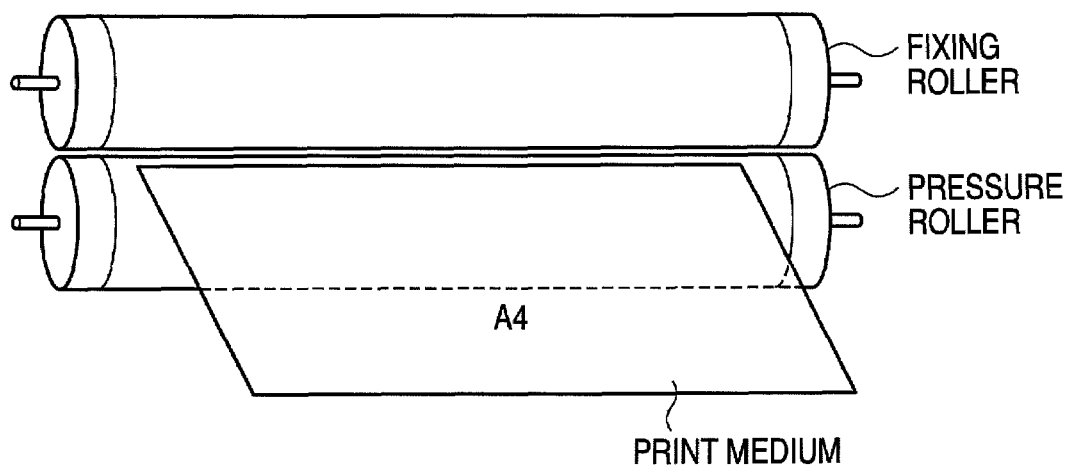
FIG. 44 is a view showing the fixing unit in the printer.

FIG. 44 shows a state wherein the print medium passes through the fixing unit. The fixing unit fixes a toner image on the print medium by applying heat and pressure by the rotatable rollers, that is, the fixing roller on the upper side and the pressure roller on the lower side. The print medium passes through the vicinity of the center between the rollers.

Figure 45:
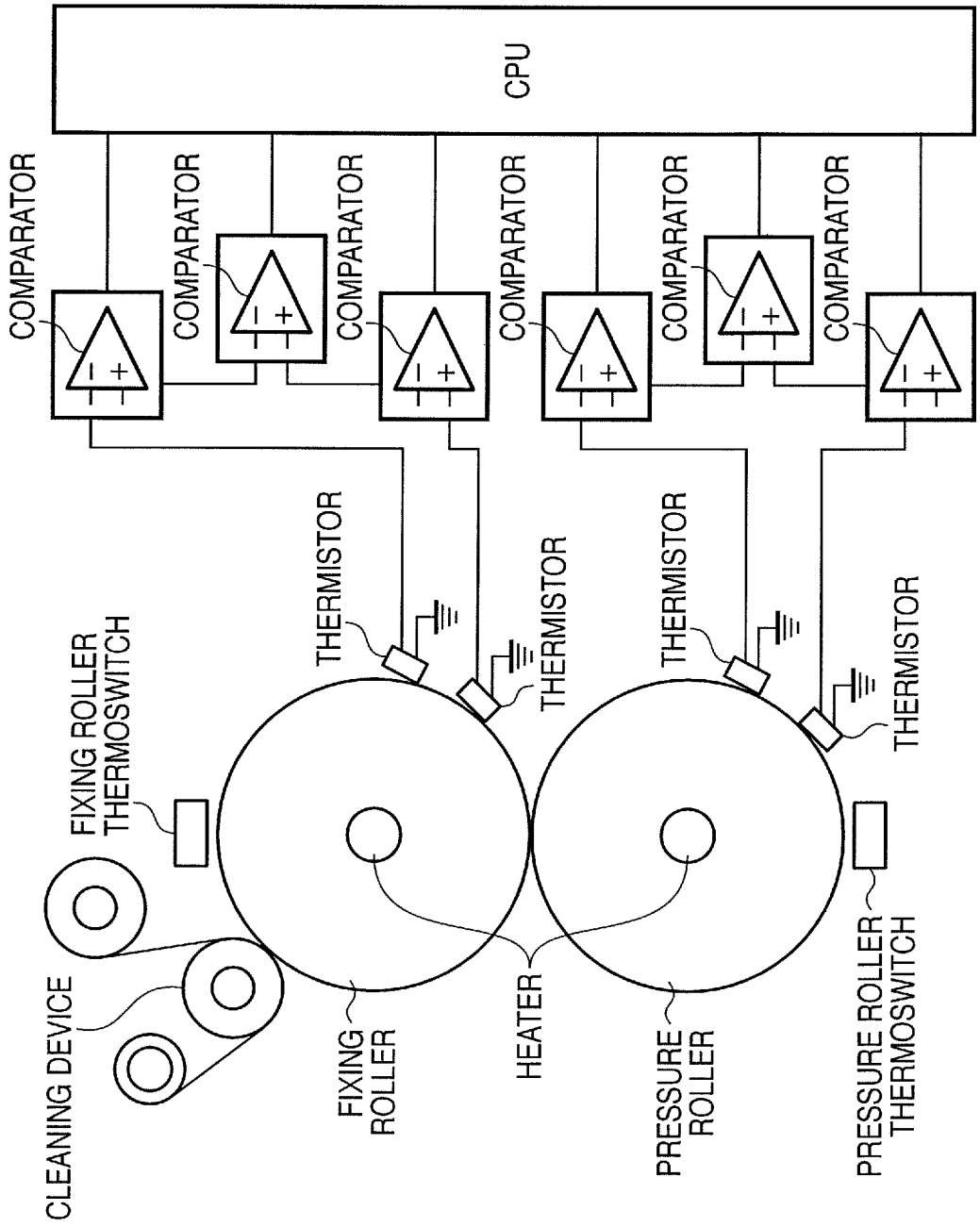
FIG. 45 is a diagram showing the control of the fixing unit in the printer.

FIG. 45 is a circuit diagram showing the arrangement of a fail-safe device of the fixing unit. The fixing unit comprises the fixing roller and pressure roller, which fix a toner image on a print medium by applying heat and pressure, and the cleaning device which cleans offset toner or the like. Each roller includes a heater such as a halogen lamp or the like.

In the arrangement inside the fail-safe device, thermistors which contact the center and edge portion of each roller, and non-contact type thermoswitches are arranged. Comparators have an arrangement that allows comparisons of edge portions alone, centers alone, and center and edge portions, and notify a CPU of the comparison results. The CPU uses the outputs from the comparators in control of heater ON conditions, error detection such as an edge portion temperature rise or the like, down-sequence rush timing control, and the like. Each thermoswitch is a hardware switch independent of the CPU, and shuts down a power supply when the corresponding roller temperature rises beyond the prescribed temperature.

Note that "adjustment of fixing temperature" input for each paper sheet by the control panel is used to control the temperature to be given to the fixing unit. In practice, using variable resistance characteristics according to the temperature of each thermistor, the fixing temperature is predicted based on a digital voltage value obtained by A/D-converting the voltage value of the thermistor, and the halogen lamp is turned on/off, thereby attaining control for making the fixing temperature be closer to a desired temperature.

At this time, by adjusting the temperature in accordance with the value of "adjustment of fixing temperature" in the paper information databases shown in FIGS. 50 to 53, gloss adjustment of finishing can be made. That is, glossy (shiny) finish or matt (muted) finish can be attained.

The speed of the print medium upon passing between the rollers is similarly controlled in accordance with the value of "adjustment of fixing temperature" in the paper information databases shown in FIGS. 50 to 53. For example, in case of plain paper, if paper sheets are fed at 240 mm/sec, that is, if A4 (length in the sheet feed direction=210 mm) sheets are fed to have a sheet interval=30 mm, since 60 sheets flow per minute, the sheets are output at a speed of 60 ppm (Prints Per Minute) or its equivalent. In case of dual coated paper, if sheets are fed at 180 mm/sec, they are similarly output at 45 ppm or its equivalent. In case of the dual coated paper, since it readily draws the amount of heat, a high-quality output is obtained if it is fixed at a lower speed.

[Arrangement of Saddle Stitching Unit]

Figure 46:
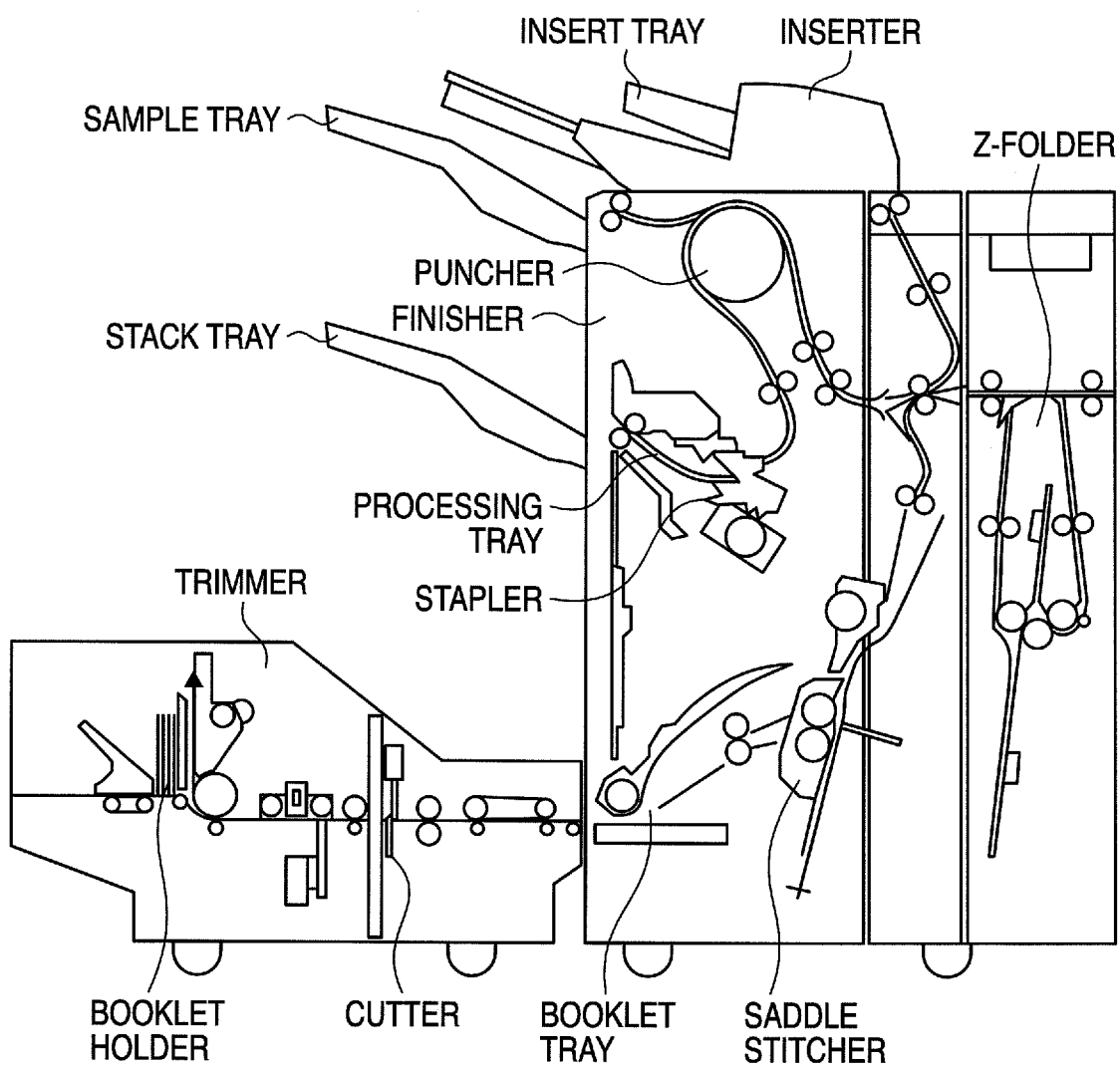
FIG. 46 is a sectional view of a saddle stitching unit.

FIG. 46 is a sectional view showing the arrangement of a saddle stitching unit. The saddle stitching unit has a sample tray, stack tray, and booklet tray, which are switched depending on the job type and the number of print sheets to be discharged.

When a staple mode is set for the job to be output, the printer controller controls to output print sheets onto the stack tray. In this case, print sheets are sequentially stored on a processing tray inside the saddle stitching unit for each job and are bound by a stapler on the processing tray before they are discharged onto the stack tray. Then, the bundle of print sheets are discharged onto the stack tray.

In addition, a Z-folder for folding a sheet in a Z shape, and a puncher for punching two (or three) holes for a file are equipped, and execute respective processes according to the job types. For example, when the user sets Z-folding processing via the control panel as a setting about print sheet processing for the job to be output, the printer controller controls the Z-folder to execute folding processing for print sheets of that job. After that, the printer controller controls to make the print sheets pass through the unit and discharge them onto the discharge tray such as the stack tray, sample tray, or the like. Also, for example, when the user sets punch processing via the control panel as a setting about print sheet processing for the job to be output, the printer controller controls the puncher to execute punch processing for print sheets of that job. After that, the printer controller controls to make the print sheets pass through the unit and discharge them onto the discharge tray such as the stack tray, sample tray, or the like.

Furthermore, a saddle stitcher executes saddle stitching processing which folds print sheets into two by binding two central portions of print sheets, and making rollers bite the central portion of the print sheets, so as to form a booklet such as a brochure or the like. The print sheets bound up by the saddle stitcher are discharged onto the booklet tray. Whether or not the print sheet processing such as booklet processing or the like by the saddle stitcher is executed is based on the print sheet processing setting made by the user for the job to be output, as described above.

An inserter is used to feed print sheets set on an insert tray to one of the discharge trays such as the stack tray, sample tray, and the like without going through the printer. In this way, print sheets set on the inserter can be inserted between neighboring print sheets (which have been printed by the print unit) which are fed into the saddle stitching unit. The user sets print sheets facing up on the insert tray of the inserter, and a pickup roller feeds the set print sheets in turn from the uppermost one.

Therefore, each print sheet from the inserter is conveyed intact to the stack tray or sample tray, and is discharged facing down. Upon feeding that sheet into the saddle stitcher, it is temporarily fed into the puncher side, and is switched back to adjust the face direction. Note that whether or not the print sheet processing such as the print sheet insert processing or the like by the inserter is based on the print sheet processing setting made by the user for the job to be output, as described above.

[Arrangement of Trimmer]

The arrangement of a trimmer will be described below also using FIG. 46. The output formed as a booklet (saddle-stitched booklet) by the saddle stitching unit enters this trimmer. The booklet output is fed by rollers by a predetermined length, and is cut by a cutter by a predetermined length, so that the discrete edge portions among a plurality of pages in the booklet are uniformly trimmed. Then, the booklet is stored in a booklet holder. Note that whether to perform the print sheet processing such as the trimming processing or the like by the trimmer is based on the print sheet processing setting made by the user for the job to be output, as described above.

[Adjustment of Gutter Shift and Creep Amount]

Figure 47:
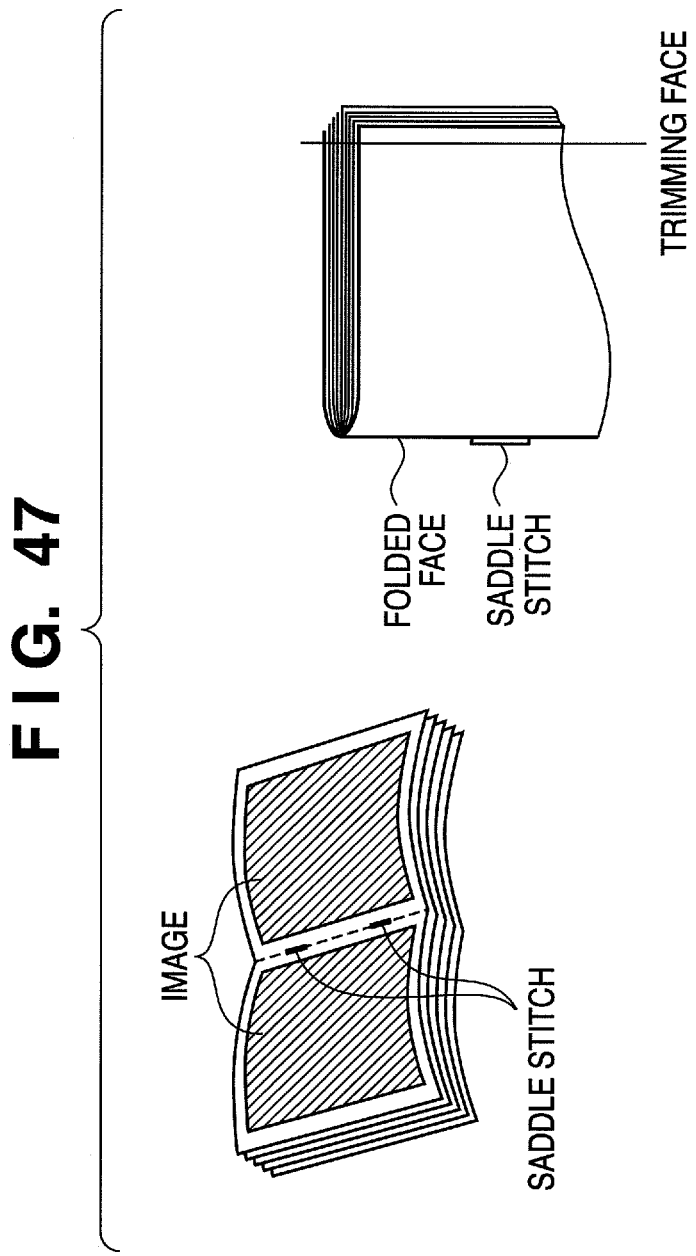
FIG. 47 shows the finish of saddle stitching.

Adjustment of a gutter shift and creep amount will be described below using FIG. 47. Upon execution of saddle stitching, inner and outer paper sheets have different gutter amounts on the edge side. This phenomenon appears prominently when the number of pages is large and when thick paper sheets are used. When a face to be trimmed is set closer to the saddle side, images may be cut upon trimming. To prevent this, an operation for gradually shifting the positional relationship between paper sheets and images on the inner and outer paper sheets is called a gutter shift. In this gutter shift, a deviation amount of each page is a creep amount. Since this creep amount has a strong correlation with the thicknesses (or basis weights) of paper sheets, it is convenient to set the creep amounts for respective types of paper sheets. On an outermost paper sheet, an image is printed at a predetermined image position. With reference to this position, the positional relationship between paper sheets and images is gradually shifted toward the saddle side by a predetermined creep amount which is adjusted to be larger for inner pages by the adjustment value (which can be input in increments of 0.01 mm) of the creep amount input from the control panel.

In this case as well, trimming is made according to the value of "adjustment of creep amount" in the paper information databases shown in FIGS. 50 to 53. However, the adjustment value of the creep amount changes like $\alpha=0.10$ mm for plain paper, $\alpha=0.20$ mm for heavy paper 1, $\alpha=0.30$ mm for heavy paper 2, and so forth according to equation (1) In this case, if $\beta=-0.01$ mm is set for a paper sheet "attribute change of plain paper", the adjustment value of the creep amount is given by the adjustment value of the creep amount=default value (0.00 mm)+$\alpha$ (0.10 mm)+$\beta$ (-0.01 mm) according to equation (1). For this reason, the Type 2 table describes "0.09 mm", and the trimming amount is set according to this numerical value.

[Auto Cassette Change]

Auto cassette change is a function of detecting by the printer side during printing upon paper feed from a given cassette of the printer if the amount of remaining sheets becomes equal to or smaller than a predetermined value, and automatically changing a paper source (cassette) so as to continue printing. The cassette which is to undergo the auto cassette change function is selected under the following conditions. *Paper sheets stored in the cassette to be selected have the same size as the paper size to be output. (However, even when auto rotation is ON, the rotated paper size is not selected.) *The user makes mode settings in advance to set that cassette as that to undergo the auto cassette change function. *The user makes mode settings in advance to select the cassette as follows in the auto cassette change settings.

Figure 18:
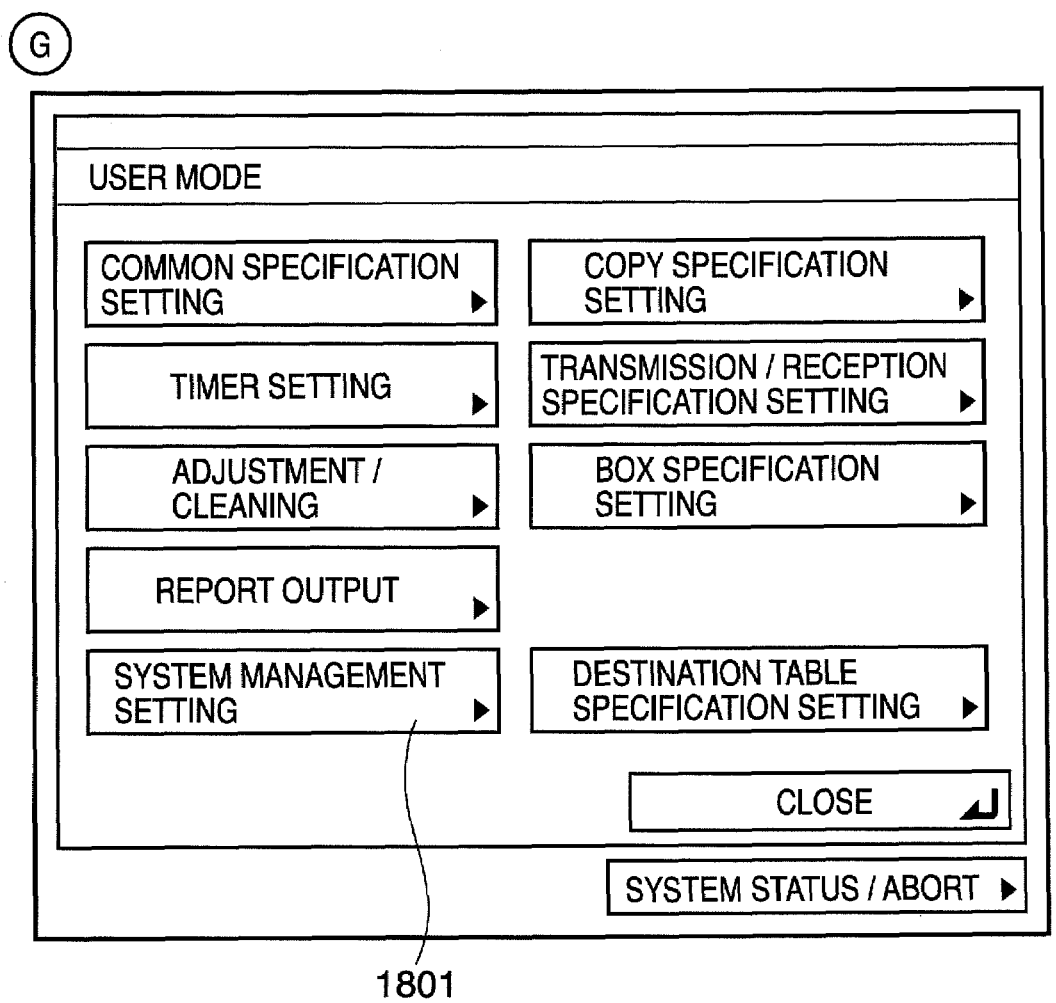
FIG. 18 is a view showing an example upon registering paper information from the touch panel unit in the control panel.
Figure 19:
FIG. 19 is a view showing an example upon registering paper information from the touch panel unit in the control panel.
Figure 48:
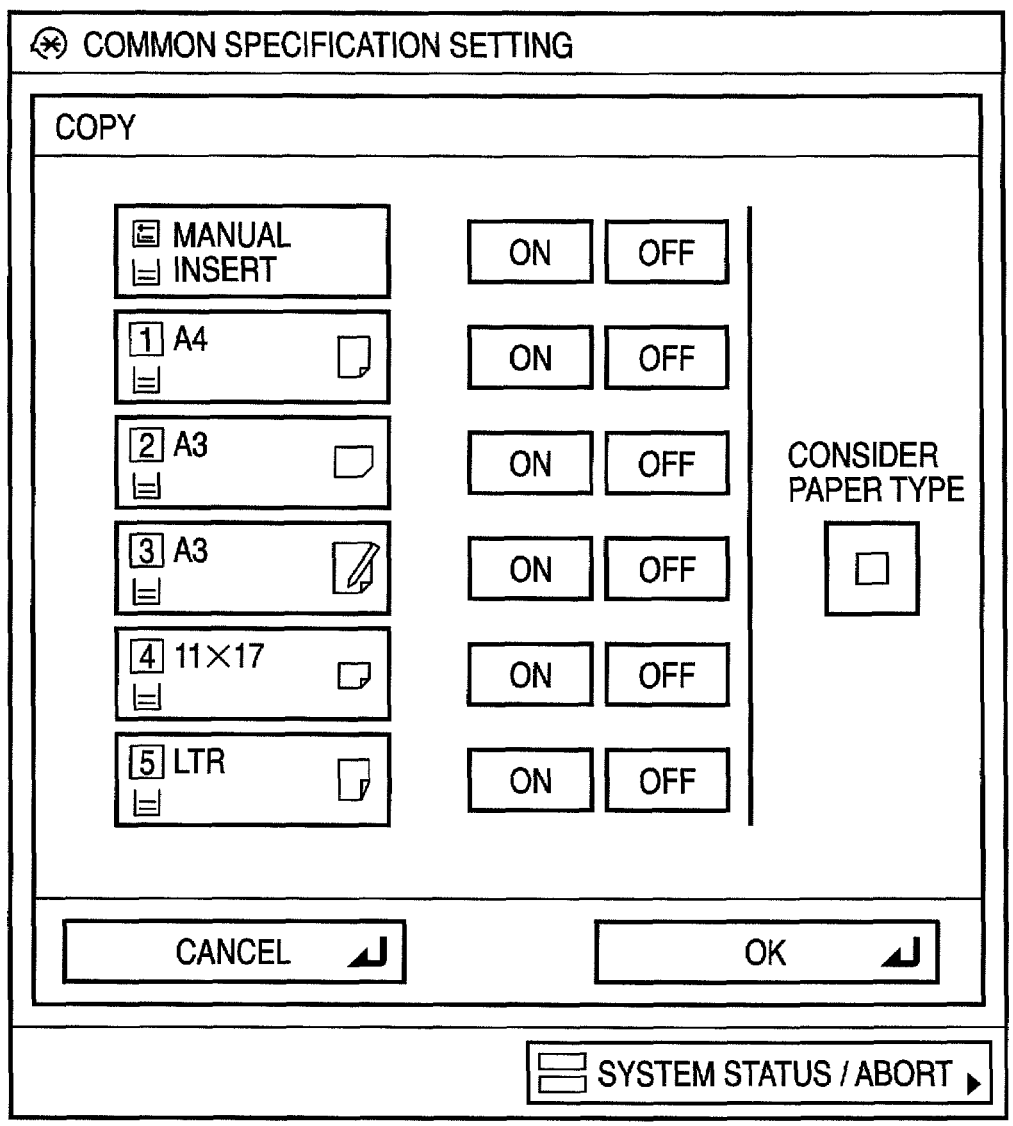
FIG. 48 is a view showing an example of the operation that considers the types of paper sheets in case of automatic paper source settings from the touch panel unit in the control panel.

At this time, when the user enters common specification settings from the user mode in FIG. 18, and selects ON/OFF (not shown) of auto cassette change, he or she can set ON/OFF of the auto cassette change function for respective functions (copy, print, and the like) of the MFP. FIG. 48 shows an example upon selection of ON/OFF of the auto cassette change function in the copy function. At this time, by selecting respective cassettes to switch ON/OFF, the auto cassette change function is selectively enabled or disabled. A key "consider paper type" on the right side allows setting of whether or not automatic switching is made for other paper types. By setting this, the auto cassette change function of paper sheets is enabled irrespective of the Type 1, Type 2, or Type 3 paper type.

[Auto Paper Select]

Figure 10:
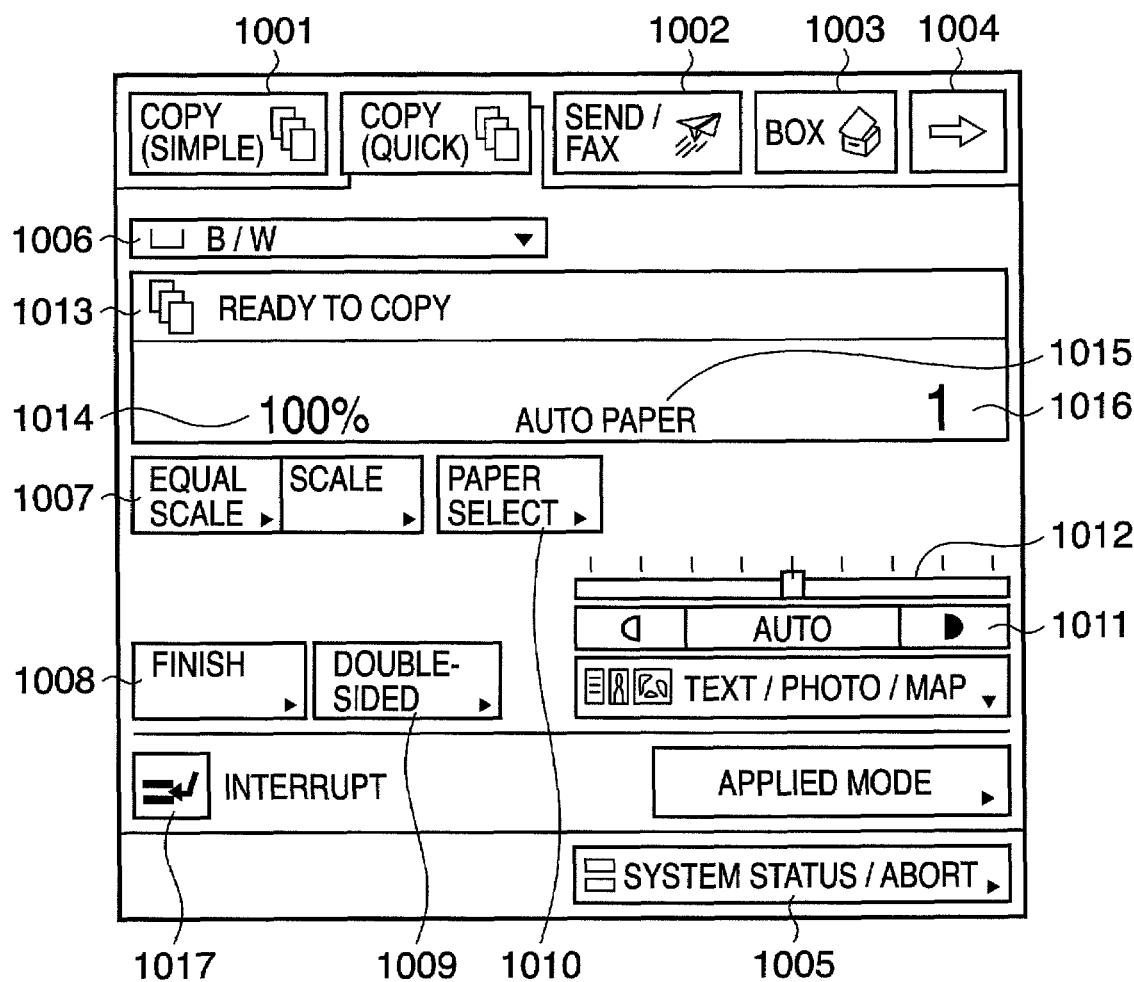
FIG. 10 is a view showing an example of the arrangement of the touch panel unit in the control panel.

Auto paper select is a function of automatically selecting optimal paper sheets (or optimal paper source or cassette) depending on the set document size and selected scale when "auto paper" is selected on the paper size display, as shown in FIG. 10. "Optimal" means a minimum standard size which is larger than (document size×scale). Also, this function automatically selects optimal paper sheets from the paper sources of the printer when the printer driver outputs a job including the output paper size=auto.

At this time, this function basically works according to the setting of the key "consider paper type" as in the auto cassette change function. However, as shown in FIG. 49, the auto paper select function may be executed for plain paper and recycled paper irrespective of ON/OFF of the key "consider paper type", but it may often be inhibited for heavy paper or OHP. Therefore, the auto paper select function is done according to this table.

Furthermore, in case of Type 2 paper sheets, classifications shown in FIG. 31 are derived based on their values of the basis weights, surface natures, and shapes, and the auto paper select function is implemented according to their ○ or x of the corresponding paper types.

OTHER EXAMPLES

Figure 54:
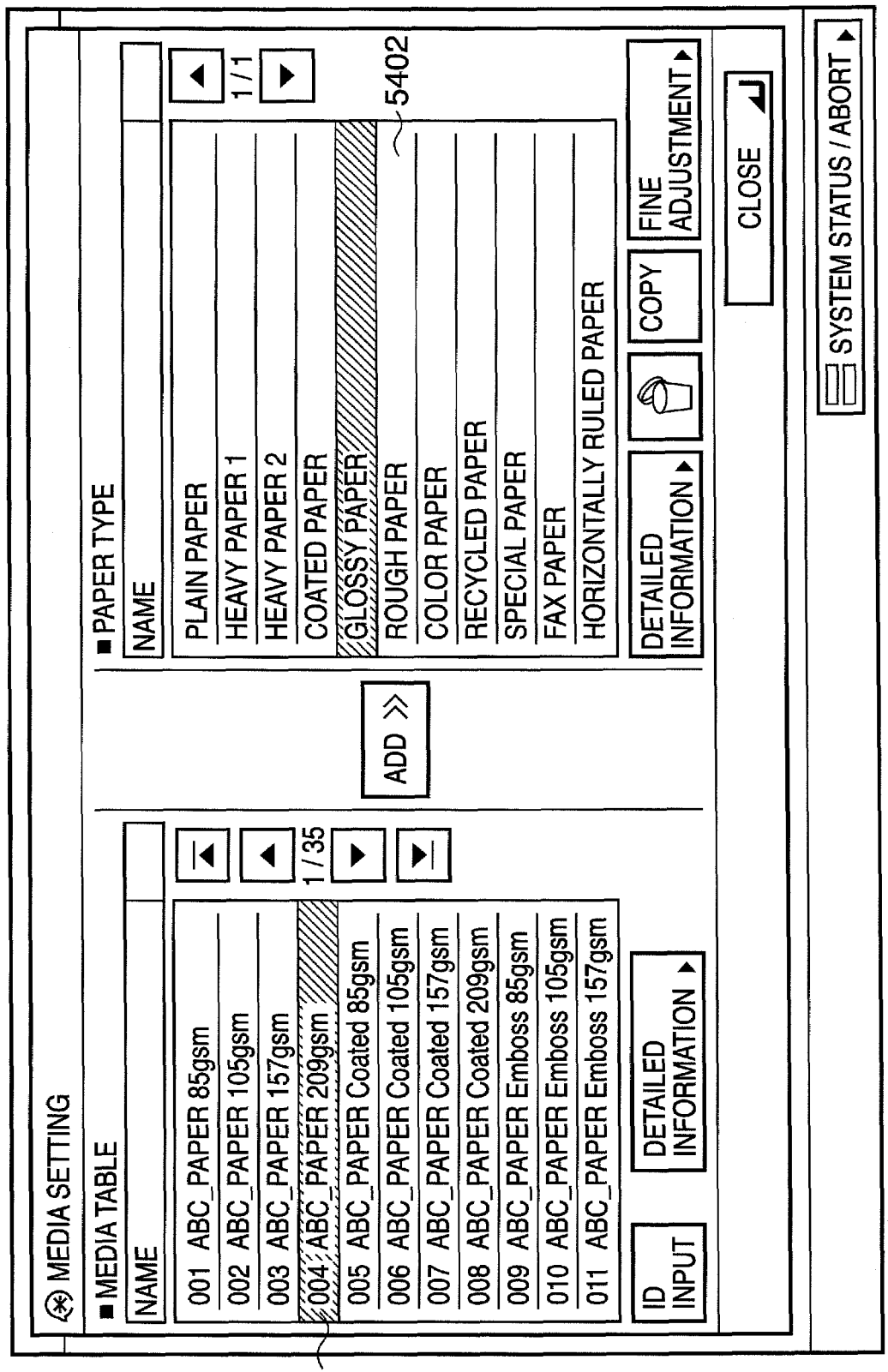
FIG. 54 is a view showing an example upon registering paper information from the touch panel unit in the control panel.

Modifications of dialogs and the like in the embodiment described above will be described below. FIG. 54 shows another example of FIG. 29. A paper information list "media table" 5401 on the left side of FIG. 54 represents Type 3. On the other hand, a paper information list "paper type" 5402 on the right side represents Type 2. Furthermore, arbitrary paper information (allows multiple selections) can be selected from the "media table" 5401 on the left side and can be added to the "paper type" 5402 on the right side using an add key at the center of FIG. 54.

FIG. 55 shows another example of icons displayed in the select candidate paper list 1603 on the paper setting dialog shown in FIG. 16.

Creation sources of Type 2 may be classified in more detail. Creation sources may be classified like "copy from Type 1", "attribute change from Type 1", "copy from Type 2", "attribute change from Type 2", "copy from Type 3", and "attribute change from Type 3", upon registration, and may be described in parameters. According to such classifications, display icons may be changed and displayed. Also, by adding filters for displaying items in the pull-down button in FIG. 16 according to these classifications, paper types can be clearly discriminated.

At this time, the contents of the paper information database are managed, as shown in FIG. 56. That is, a parameter "copy source" is added to the Type 2 table shown in FIG. 51, thus providing a scheme that allows the user to determine the paper type as a copy source. FIG. 57 shows a further derivative system of FIG. 55.

The method of using the MFP by managing the IDs and passwords to identify who uses the MFP is generally known. Such method is implemented using the window shown in FIG. 19. In this case, not only the system administrator but also general operators have their individual IDs, and they individually log in to the system using their IDs. There may be two cases, that is, a case wherein each individual operator uses Type 2 paper sheets that he or she created, and a case wherein all the operators commonly use Type 2 paper sheets that they created. For this purpose, a parameter may store a creator of a Type 2 paper sheet in advance, and Type 2 paper sheets are distinguished from each other accordingly by forming icons shown in FIG. 57. Likewise, filters for displaying items in the pull-down button are enabled to selectively display paper sheets that the user himself or herself registered or those to be commonly used, thus further improving the operability.

At this time, the contents of the paper information database are managed, as shown in FIG. 58. That is, a parameter "copy user" is added to the Type 2 table shown in FIG. 51, thus providing a scheme that allows identification of who created paper information.

An overview of the printing system according to the aforementioned embodiment is summarized as follows. In the MFP 103 as the printing device, the memory unit 209 as storage means pre-stores attribute information of paper sheets. The MFP 103 comprises the control panel 207 as operation control means, and the control panel 207 allows the user to copy or change the attribute information of paper sheets. The user copies or changes the information via the key input unit 701 or touch panel unit 702 or the display, keyboard, mouse, and the like of the client PC as user interface means.

The MFP 103 has the MFP controller 203 as control means. The MFP controller 203 controls the print unit 205 to operate under print processing conditions based on the attribute information of a given type of paper sheets upon executing the print processing using that type of paper sheets whose attribute information is pre-stored in the memory unit 209 by the print unit 205. That is, when the user inputs a print instruction designated with a type of paper sheet, the MFP controller 203 checks if the attribute information of the designated type of paper sheet is stored in the memory unit 209. If the attribute information is stored, the MFP controller 203 controls the print unit 205 to execute print processing using that attribute information. The control panel 207 allows the user to select paper sheets whose attribute information has already been registered by him or her upon selecting paper sheets used in printing by the MFP 103.

Some practical examples of the operation for the printing system according to the aforementioned embodiment will be described hereinafter. In practical examples 1 and 2 to be described hereinafter, the print execution request and various print processing conditions of a print job to be processed are accepted from the operator via the control panel 207 of the printing device of this embodiment. Therefore, the controller included in the printing device itself obviously executes all control processes associated with the arrangements and operations to be explained in practical examples 1 and 2.

On the other hand, in practical examples 3 and 4 to be described hereinafter, the print execution request and various print processing conditions of a print job to be processed are accepted from the operator via a UI unit of a remote host computer which can make data communications with the printing device of this embodiment. Therefore, a controller of the host computer which comprises a display unit that displays various UI windows to be exemplified below executes, as a main body, control processes associated with the arrangements and operations to be explained in practical examples 3 and 4. However, of course, the controller included in the printing device of this embodiment executes the control processes in practical examples 3 and 4 to be described hereinafter in cooperation with that of the host computer. For example, the printing device side executes various operations (operations to be executed upon reception of returned data or a print request later) in accordance with requests from the host. The main body of the control of the operations in this case is the controller of the printing device in place of that of the host.

Four practical examples of characteristic features of this embodiment will be described hereinafter in consideration of the above description.

Practical Example 1

A case will be explained wherein the operator performs a copy operation from the manual insert tray using paper sheets which have undergone paper registration. The operator presses the paper select key from the operation window in FIG. 10. Then, the window transits to that in FIG. 11. The operator selects "manual insert" on this window. The window transits to that in FIG. 12, and the operator selects, for example, "A4" as the paper size and then presses the "next" button. At this time, the window transits to that in FIG. 13. Furthermore, when the operator clicks the "to detailed setting" key, the window transits to that in FIG. 14. On this window, the operator selects a paper sheet "copy of plain paper" which is registered in advance.

Note that the paper sheet "copy of plain paper" is a Type 2 or equivalent paper sheet, and is registered by copying a paper sheet "plain paper" as Type 1 using the "copy" key in FIG. 21, and changing its name on FIG. 22.

Referring back to FIG. 14, after the operator selects the paper sheet "copy of plain paper", he or she presses the "OK" key. Then, the window returns to that in FIG. 11 again. When the operator presses the "close" key, the window further returns to that in FIG. 10.

Figure 59:
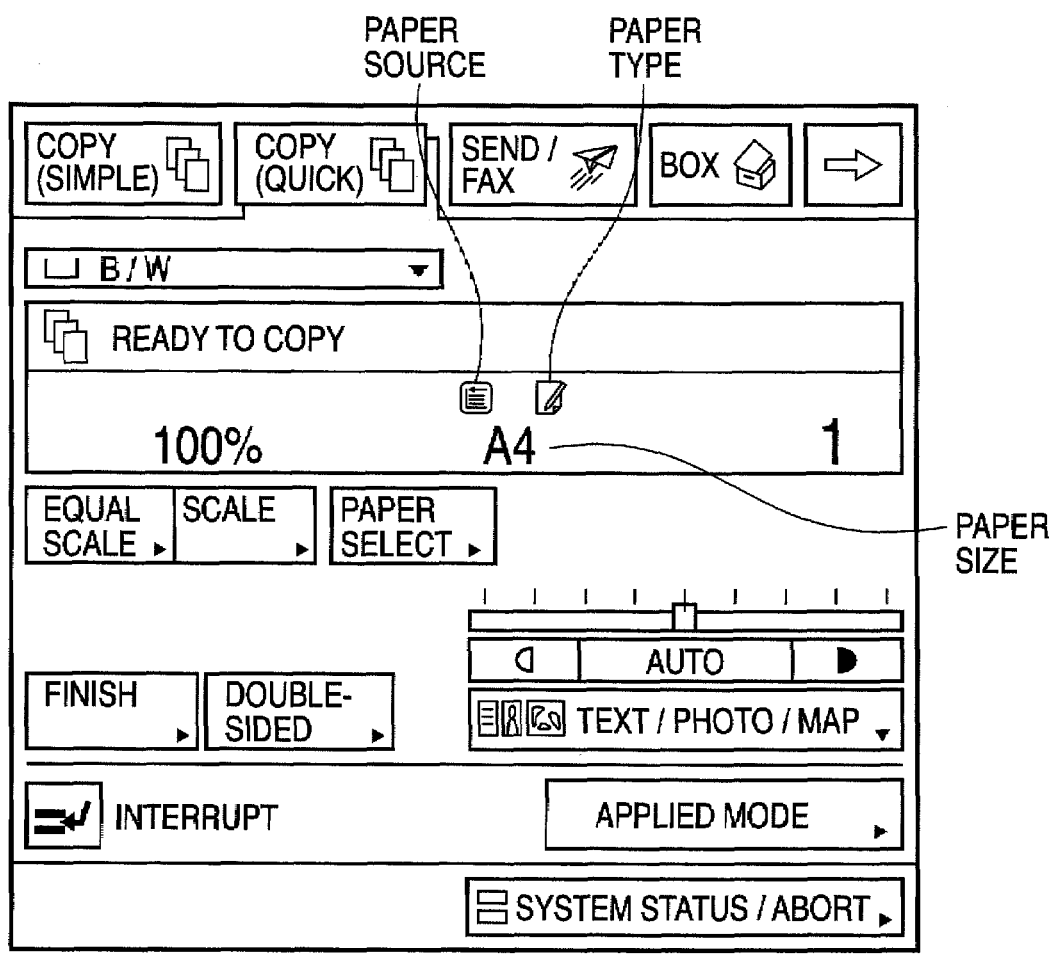
FIG. 59 is a view showing an example of the arrangement of the touch panel unit in the control panel.

At this time, text "auto paper" described at the central portion is rewritten by a "manual insert" paper source icon, a paper type icon, and an expression "A4" of the paper size, as shown in FIG. 59.

Figure 41:
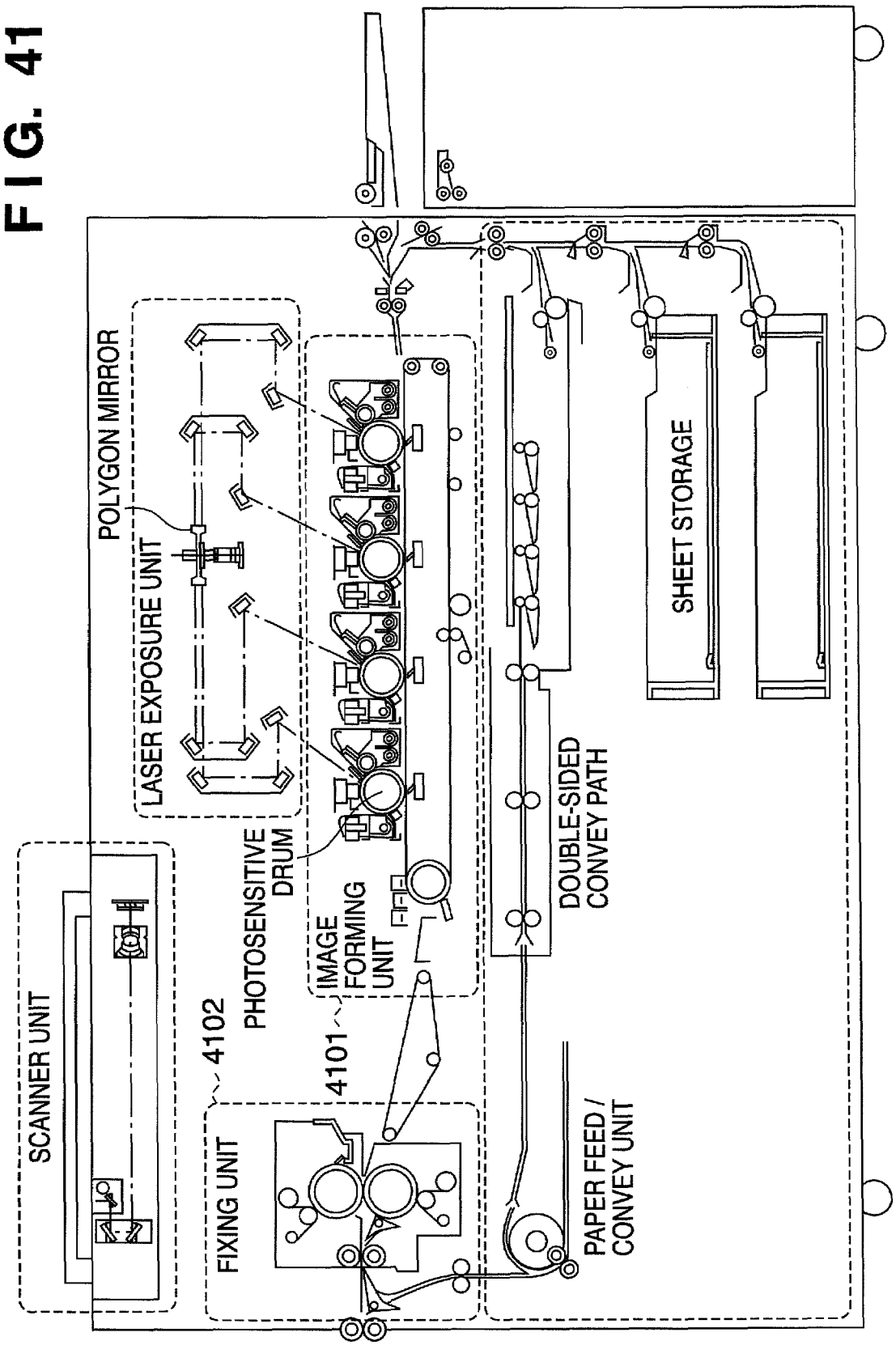
FIG. 41 is a sectional view of a print unit.

When the operator sets a document on the document table of the scanner unit in FIG. 41 and presses the start key in FIG. 8, the copy operation starts. The copy operation is executed by feeding paper sheets from the designated "manual insert" tray.

Upon copying, printouts are obtained by reflecting the adjustment of the fixing temperature, that of the fixing speed, that of the secondary transfer voltage, and that of the creep amount, or various other setting conditions, and the like with reference to the items of the paper sheet "copy of plain paper" in the table shown in FIG. 53.

Note that the paper sheet "copy of plain paper" is obtained by directly copying various setting conditions of "plain paper", and the copy operation is done under the same print conditions as those when it is done using Type 1 "plain paper"

More specifically, the adjustment value of the fixing temperature is controlled so that the temperature when a paper sheet passes through the fixing device becomes 180° C. by turning ON/OFF the halogen lamps using the thermistors. Furthermore, the conveyance speed is controlled so that the fixing speed when the paper sheet passes through the fixing device becomes 240 mm/sec. Furthermore, the adjustment value of the voltage of the secondary transfer unit is controlled so that the voltage value can give 1.00 kV. The adjustment value of the creep amount is set so that the trimming amount of the trimmer becomes 0.10 mm.

When plain paper sheets or paper sheets to be handled as plain paper are stacked on the manual insert tray in practice, they are fed to output the paper sheets "copy of plain paper" with quality equivalent to that upon copying on plain paper.

Practical Example 2

As described above, in the procedures in FIGS. 18 to 30, the operator changes attributes of "plain paper" and registers a new paper sheet "attribute change of plain paper" in advance. Upon registration, the operator changes not only the name but also parameters.

A case will be examined below wherein the operator associates a given paper source other than the manual insert tray with this paper sheet "attribute change of plain paper", and executes a copy operation by selecting that paper source.

Figure 60:
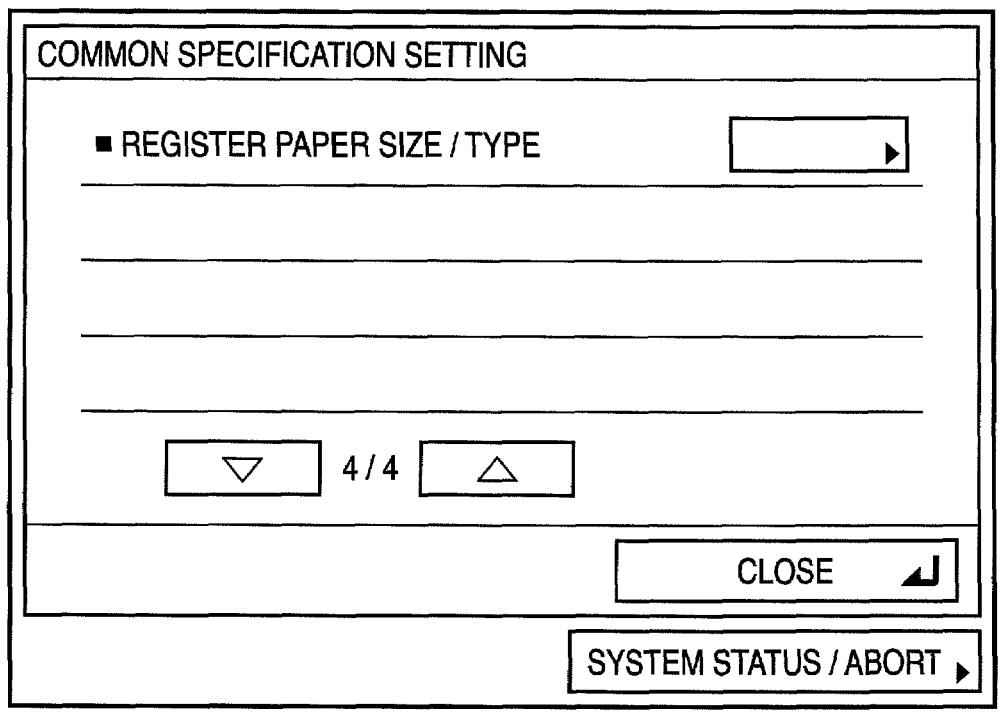
FIG. 60 is a view showing an example of common specification settings of a user mode.
Figure 61:
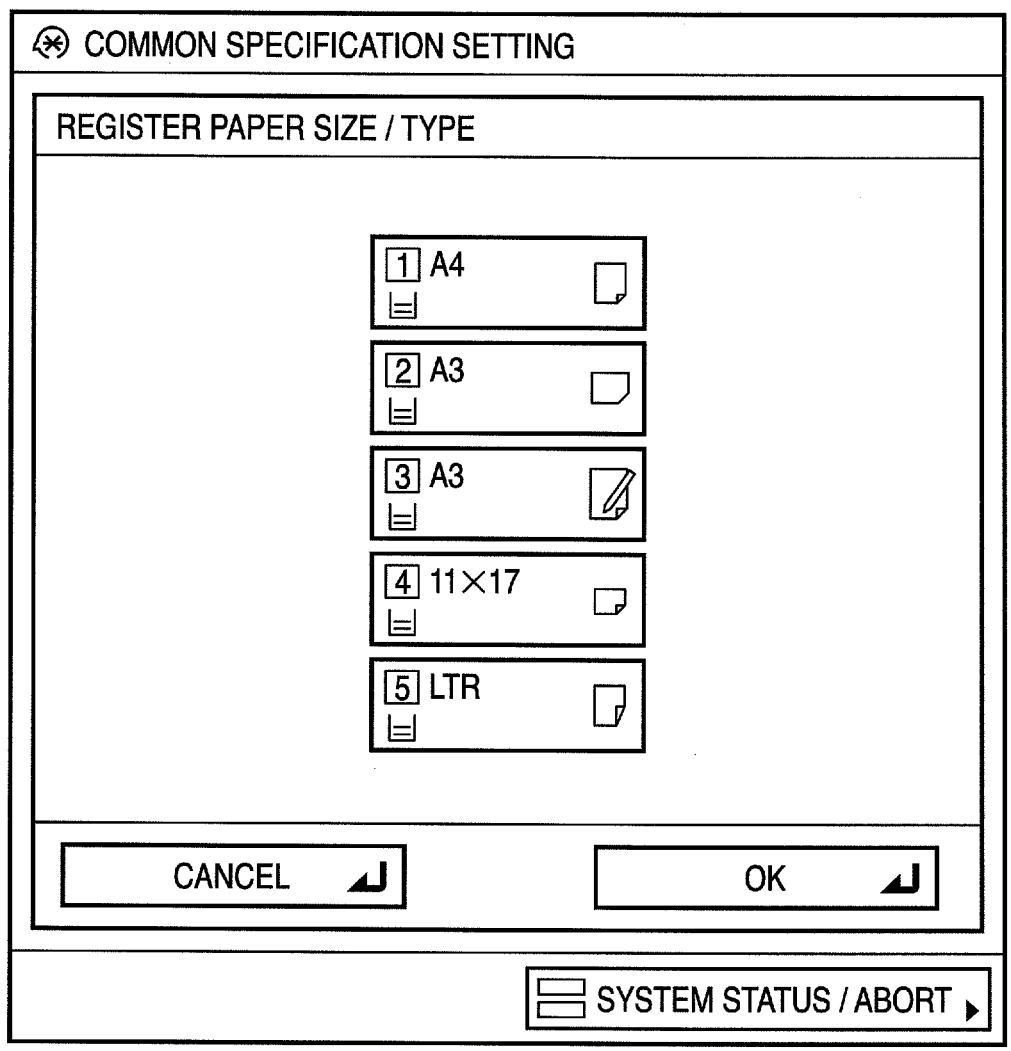
FIG. 61 is a view showing an example of common specification settings of a user mode.
Figure 62:
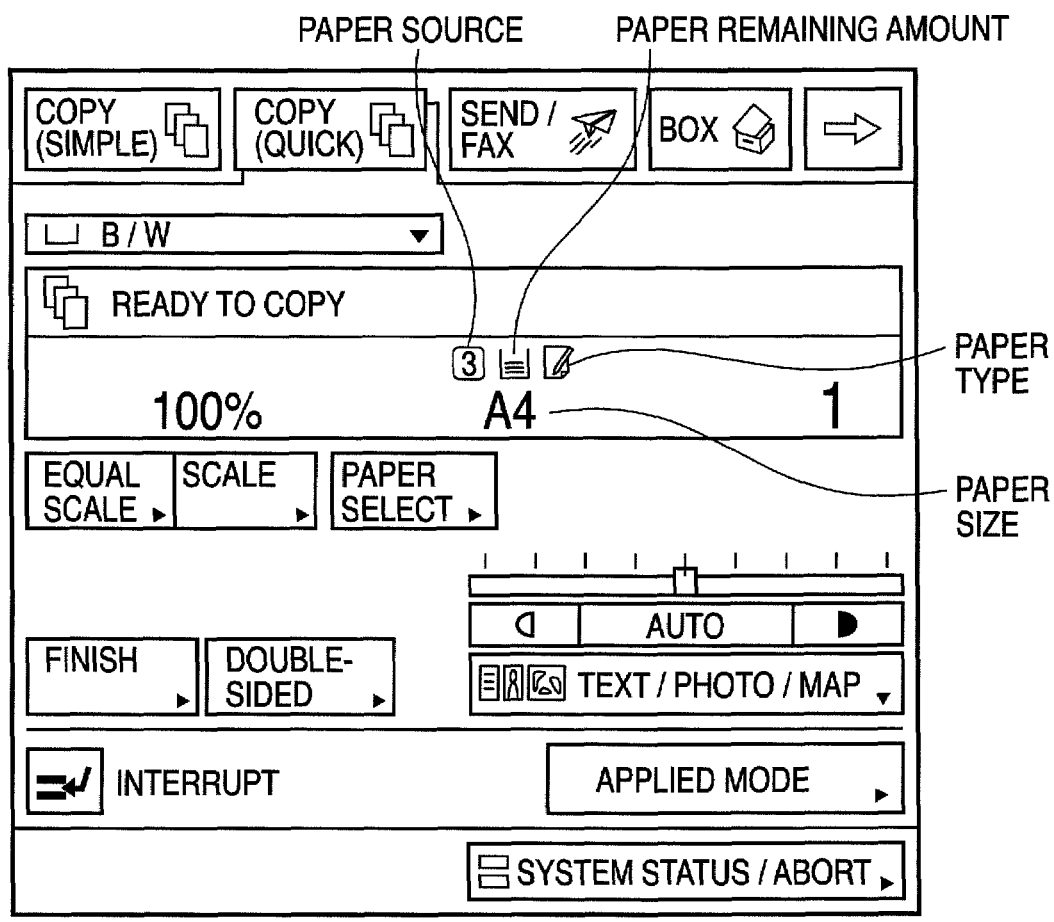
FIG. 62 is a view showing an example of the arrangement of the touch panel unit in the control panel.

The operator presses the "user mode key" in FIG. 8 to enter the user mode window in FIG. 18. The operator presses the "common specification setting" key on this window, and then presses a "register paper size/type" key on the common specification setting window in FIG. 60. The window transits to that in FIG. 61. When the operator selects a paper source to be registered, that is, "paper source 3", the window transmits to that in FIG. 12, and the operator selects a desired paper size, for example, "A3". Upon pressing of the "next" key, the window transits to that in FIG. 13. When the operator clicks the "to detailed setting" key, the window transits to that in FIG. 30. The operator selects the paper sheet "attribute change of plain paper" which is registered in advance, on this window.

Upon clicking "OK" key, the window returns to that in FIG. 11 again. Upon pressing the "close" key on this window, the window further returns to that in FIG. 10. At this time, text "auto paper" described at the central portion is rewritten by an icon corresponding to "paper source 3", an icon indicating the amount of remaining sheets, a paper type icon, and an expression "A3" of the paper size.

When the operator sets a document on the document table of the scanner unit in FIG. 41 and presses the start key in FIG. 8, the copy operation starts. The copy operation is executed by feeding paper sheets from the designated "paper source 3".

Upon copying, printouts are obtained by reflecting the adjustment of the fixing temperature, that of the fixing speed, that of the secondary transfer voltage, and that of the creep amount, or various other setting conditions, and the like with reference to the items of the paper sheet "attribute change of plain paper" in the table shown in FIG. 53.

More specifically, in case of the paper sheet "attribute change of plain paper", the adjustment value of the fixing temperature is controlled so that the temperature when a paper sheet passes through the fixing device becomes 179° C. by turning ON/OFF the halogen lamps using the thermistors. In general, since thicker paper draws a higher temperature, the fixing device is to be controlled to set a higher temperature for thicker paper or to set a lower temperature for thinner paper. Furthermore, for coated paper and special paper, individual settings are required according to their characteristics. Note that plain paper is expressed by a group of plain paper by generically naming the basis weight range from 80 to 105 gsm. At this time, the actual temperature of the fixing device need be expressed using that average value (or representative value or median value). For example, the temperature of the fixing device is defined to assume 92.5 gsm using the average value. By contrast, since the paper sheet "attribute change of plain paper" has an actual basis weight value of 90 gsm relatively thinner than 92.5 gsm (average value of plain paper), the fixing temperature is defined as a more appropriate one if it is set to be slightly lower. For example, when a paper sheet with 80 gsm has an optimal temperature=176° C. and that with 105 gsm has an optimal temperature=184° C., an optimal temperature=180° C. is set under the assumption of a paper sheet with 92.5 gsm as an average. Contrary to this, since Type 2 or Type 3 paper sheets allow paper settings using a pinpoint value=90 gsm, a temperature setting using a pinpoint value=179° C. can be made. Hence, an optimal fixing state can be given to that paper sheet.

Moreover, the conveyance speed is controlled so that the fixing conveyance speed when the paper sheet passes through the fixing device becomes 235 mm/sec. In general, when the fixing conveyance speed is lower, glossy (gloss) finish is attained, and when it is higher, muted (matt) finish is attained. For this reason, even for the same plain paper, a different finish state can be set by adjusting the fixing speed. Hence, when the paper sheet is conveyed at 235 mm/sec although the plain paper is conveyed at 240 mm/sec, it is output to have a rather glossy finish. This control uses the fact that when a larger heat amount is applied to toner, the finish state has higher glossiness since the toner melts well. As a means for applying a larger heat amount, control may be made by changing the fixing temperature or the number of times of fixing in addition to the fixing conveyance speed difference.

Next, the adjustment value of the voltage of the secondary transfer unit is controlled so that the voltage value can give 0.95 kV. The transfer voltage is used as the strength of the force for attracting toner so as to transfer the toner from each photosensitive drum in FIG. 42 onto a print sheet or from the photosensitive drum to a print sheet to have an intermediate transfer member or the like as a medium. For this reason, if this value is large, toner is attracted beyond necessity, resulting in toner fog and scattering. On the other hand, if this value is small, since transfer is not sufficiently done, a transfer omission phenomenon such as highlight saturation or inversion of the density may occur although the density remains the same. The strength of this transfer voltage also influences the thickness of paper, and a sufficient transfer operation cannot be attained unless a higher voltage is applied to thicker paper. For this reason, since the basis weight of the paper sheet "attribute change of plain paper" is 90 gsm with respect to the plain paper (the average value of the basis weight: 92.5 gsm), an image with an appropriate transfer state can be obtained when the voltage of the secondary transfer unit is set to be 0.95 kV slightly lower than 1.00 kV for the plain paper.

The adjustment value of the creep amount is designed to set the trimming amount of the trimmer to be 0.09 mm. In general, when the thickness of paper increases, the gutter shift amount upon saddle stitching increases, and a larger trimming amount is required accordingly. However, as a bad effect, if the same image position is set for paper sheets, images on inner paper sheets may also be trimmed upon trimming. For this reason, the imposition positions on inner paper sheets must be laid out while being gradually shifted inwardly with reference to the outermost paper sheet. That shift amount is the creep value, and its adjustment amount is 0.09 mm. With respect to the adjustment value=0.10 mm of the creep value for the plain paper the average basis weight=92.5 gsm, that for the paper sheet "attribute change of plain paper" with 90 gsm slightly thinner than the plain paper is defined to be 0.09 mm to gradually perform image shift. Thus, an appropriate finish state upon saddle stitching can be obtained.

Practical Example 3

On the other hand, as for the print operation, the operator sets paper sheets corresponding to "copy of plain paper" on the manual insert tray of the MFP after he or she registers the paper sheet "copy of plain paper", and also performs paper source registration for the manual insert tray, that is, associates the manual insert tray with the paper sheets "copy of plain paper".

Figure 64:
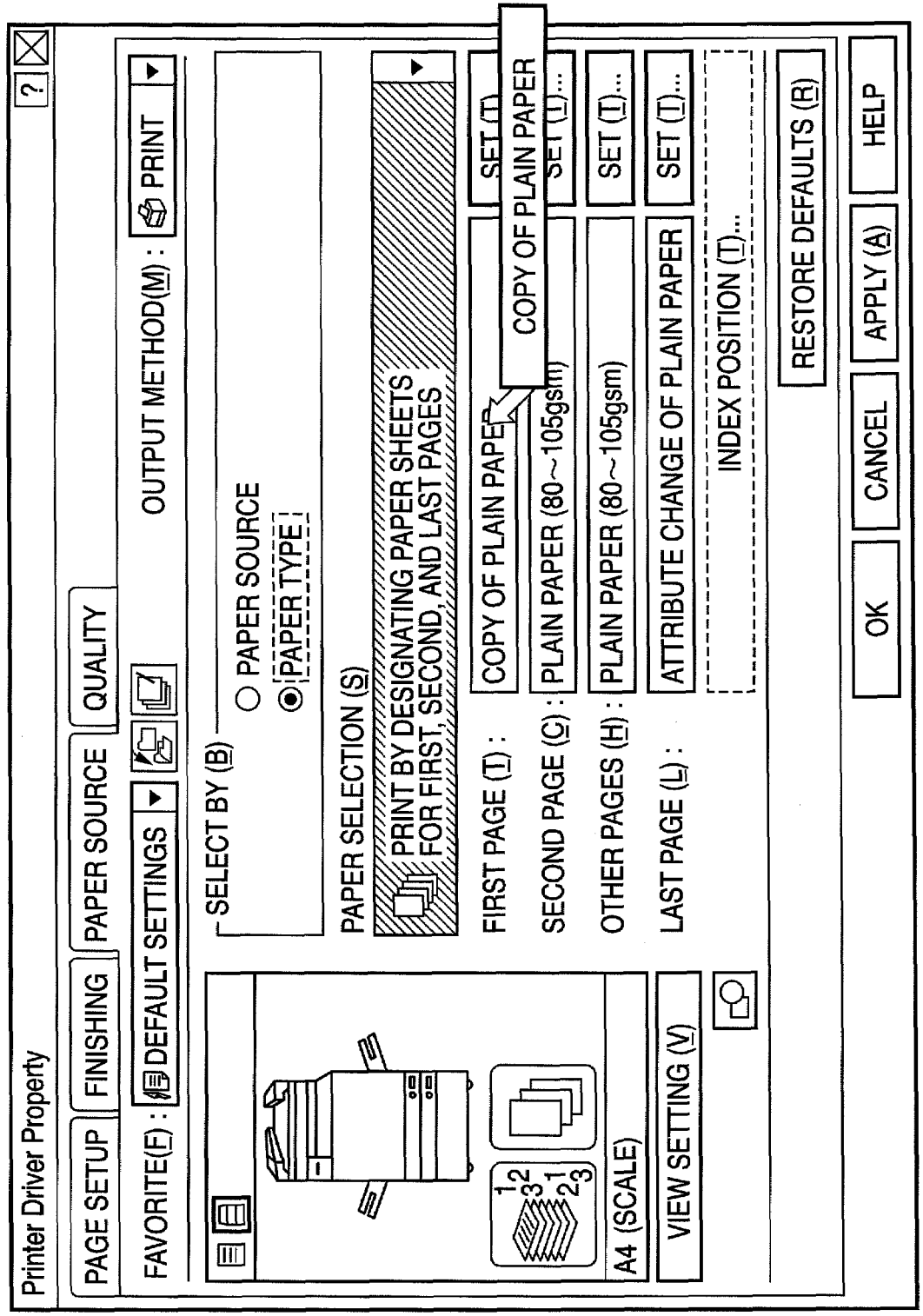
FIG. 64 is a view showing an example upon setting paper information from the printer driver.

The operator calls the printer driver (FIG. 34) via menus [file]→[print} from an application on the client PC, and then clicks the property key. On the window in FIG. 35 that appears after clicking, the operator selects "paper type" in the "select by" area. Next, on the "paper source" area, the operator changes under the assumption that a paper sheet "copy of plain paper" is fed for the first page. That is, the operator clicks the setting button on the right side of the first page to call a window in FIG. 63, and selects "copy of plain paper". Then, a window shown in FIG. 64 appears, and the operator clicks the OK key on this window. Then, image data on the application and desired setting information set by the printer driver are sent to the MFP. Upon reception of the image data and the setting information, the MFP decodes the paper type "copy of plain paper" based on the paper ID or paper name, and reads out its paper information with reference to the table in FIG. 53. As a result, the adjustment of the fixing temperature, that of the fixing speed, that of the secondary transfer voltage, and that of the creep amount, or various other setting conditions, and the like are reflected as in the copy operation. Then, the paper sheets corresponding to "copy of plain paper" which are set in advance on the manual insert tray are fed to obtain appropriate printouts.

Practical Example 4

A case will be examined below wherein the operator registers a new paper sheet "attribute change of plain paper" after execution of [Practical Example 3]. However, even when the operator registers the paper sheet "attribute change of plain paper" using the control panel on the MFP side, such registration is not immediately reflected in the printer driver.

In order to reflect the registered paper sheet on the printer driver side, the operator must execute "paper information acquisition" on the printer driver side. That is, the operator must call the device setting sheet (FIG. 37) on the property window of the printer driver, and must click the "device information acquisition" key on the lower side to load at least the paper sheet "attribute change of plain paper" into the printer driver on the client PC. This operation is required every time he or she registers a new paper sheet or edits the existing paper sheet on the MFP side, and wants to use the newly registered (or edited) paper sheet on the printer driver.

The operator calls the printer driver (FIG. 34) via menus [file]→[print] from an application on the client PC, and then clicks the property key. On the window in FIG. 35 that appears after clicking, the operator selects "paper type" in the "select by" area. Next, when the operator clicks the setting key for a desired page on the "paper source" area to call the window in FIG. 36, he or she recognizes that "attribute change of plain paper" is newly added. Upon selection of this paper sheet, the window shown in FIG. 39 appears. When the operator clicks the OK key on this window, the window returns to that FIG. 34 again. When the operator further clicks the OK key, image data on the application and desired setting information set using the printer driver are sent to the MFP.

At this time, the operator sets paper sheets "attribute change of plain paper" in an arbitrary paper source on the MFP side. In this case, assume that the paper sheets "attribute change of plain paper" are set in "paper source 3" as in [Practical Example 2].

A job issued from the printer driver is executed for the paper sheets "attribute change of plain paper" fed from "paper source 3" (also including those other than "paper source 3" in case of a job using a plurality of paper sources). Then, based on the table in FIG. 53, the adjustment of the fixing temperature, that of the fixing speed, that of the secondary transfer voltage, and that of the creep amount, or various other setting conditions, and the like for the paper sheets "attribute change of plain paper" are reflected in the printer engine. Since the parameter values are the same as those in [Practical Example 2], their details will be omitted. The same settings are made in the printer engine, finisher, and the like and are reflected in the print job, thus obtaining appropriate printouts.

Note that items common to all the practical examples will be added below.

The controller of the printing device (e.g., the MFP controller in the MFP) executes various kinds of aforementioned display control for the UI unit provided by the printing system of this embodiment. Also, the controller of the printing device (e.g., the MFP controller in the MFP) mainly executes the operation control such as the print processing in the printing system, finishing by the finisher, and the like. However, the present invention is not limited to such specific arrangement. For example, some kinds of control may be executed by a controller of another device, or these controllers may implement the prerequisites of various embodiments described above in cooperation with each other.

Also, the host computer (e.g., the computer exemplified in FIG. 1) may implement the illustrated functions in this embodiment based on externally installed programs. In this case, data required to display the same operation windows as those described in this embodiment, which include the respective operation windows, are externally installed, so as to allow providing various user interface windows on the display unit of the host computer. For example, this embodiment has explained this by means of the configuration of various UI windows exemplified in FIGS. 34 to 40, FIG. 54, FIG. 63, and FIG. 64 to be displayed on the display unit of the computer. The controller of the computer which downloads the control programs executes the display control of the UI windows to be displayed on the display unit of the computer, issuance of execution requests of various operations for the printing device (e.g., a print execution request for a print job to be transmitted from the computer, and the like), and so forth. The programs required for this configuration are stored in a storage medium such as a CD-ROM, flash memory, FD, or the like to be set in the computer. Alternatively, an information group including the programs is directly downloaded from an external storage medium (external server) via the network, and is stored in an internal program memory of the computer. After that, the controller of the computer reads out and executes the stored programs to execute control of various embodiments described above. The present invention can also be applied to such configuration.

As described above, the objects of the invention are also achieved by supplying a storage medium which records a software program that implements the functions of the aforementioned embodiments to a system or apparatus, and reading out and executing the supplied program code stored in the storage medium by a computer (or a CPU or MPU) of that system or apparatus.

In this case, the program code itself read out from the storage medium implements the novel functions of the present invention, and the storage medium which stores the program code constitutes the present invention.

Therefore, the form of program is not particularly limited, and an object code, a program to be executed by an interpreter, script data to be supplied to an OS, and the like may be used as long as they have the program function. As a storage medium for supplying the program, for example, a flexible disk, hard disk, optical disk, magneto-optical disk, MO, CD-ROM, CD-R, CD-RW, magnetic tape, nonvolatile memory card, ROM, DVD, and the like may be used. In this case, the program code itself read out from the storage medium implements the functions of the above-mentioned embodiments, and the storage medium which stores the program code constitutes the present invention.

In addition, the scope of the present invention includes an embodiment that establishes connection to a home page on the Internet using a browser on a client computer, and downloads the computer program itself of the present invention. The same applies to an embodiment that downloads a compressed file containing an automatic installation function onto a recording medium such as a hard disk or the like. Also, the program code that forms the program of the present invention may be segmented into a plurality of files, which may be downloaded from different home pages. That is, the appended claims of the present invention include a WWW server, ftp server, and the like, which make a plurality of users download a program file required to implement the functional processing of the present invention by the computer.

A storage medium such as a CD-ROM or the like, which stores the encrypted program of the present invention, may be delivered to the user, the user who has cleared a predetermined condition may be allowed to download key information that is used to decrypt the program from a home page via the Internet. The encrypted program may be executed using that key information to be installed on a computer, thus implementing the present invention.

Also, the present invention includes a case wherein an OS (operating system) running on a computer executes some or all of actual processing operations based on an instruction of the program code to implement the aforementioned functions.

Furthermore, the program code read out from the storage medium may be written in a memory equipped on a function expansion card or function expansion unit which is inserted into or connected to the computer. Then, a CPU or the like equipped on the function expansion card or unit may execute some or all of actual processing operations.

The present invention can be applied to either a system consisting of a plurality of device or an apparatus including a single device. The present invention can also be applied when the invention is achieved by supplying a program to such system or apparatus. In this case, the system or apparatus can enjoy the effects of the present invention by reading out a storage medium that stores a program expressed by software used to achieve the present invention by the system or apparatus.

The present invention is not limited to the above embodiments, and various modifications (including organic combinations of respective embodiments) are available based on the spirit of the present invention and are not excluded from the scope of the present invention. For example, the controller 203 in the printing device serves as the main body of the various kinds of control. Alternatively, an external controller or the like in a housing independent from the printing device may implement some or all of the various kinds of control.

Various examples and embodiments of the present invention have been explained, and the spirit and scope of the present invention are not limited to the specific description in this specification, as can be understood by those who are skilled in the art.

According to the embodiment of the present invention, a convenient print environment which can solve the problems assumed in the paragraphs of the description of the related art, and can be applied not only to an office environment but also to a POD environment can be built. Also, a print environment which can support a large number of types of paper sheets so as to cope with various requirements about paper sheets required in printing in consideration of the POD environment and the like can be built. Furthermore, for example, the operator can set and register control parameters of the printing device associated with print processes, and can control the printing device in the print processes suited to the natures of paper sheets used in the printing device under the assumption of support of a very larger number of types of paper sheets. Moreover, a print environment that can bring about such effects and can suppress deterioration of the operability for the operator as much as possible can be built. Particularly, for example, in a print environment such as the POD environment or the like, the operator can quickly select paper sheets required in printing from a very large number of paper types, thus improving the user's convenience and operation efficiency. As described above, a scheme that can flexibly meet various needs from various users as much as possible under the assumption of various situations and use environments can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-134450 filed on May 12, 2006, which is hereby incorporated by reference herein in its entirety.

What is claimed is:

1. A printing system comprising:
a storage unit configured to store a plurality of first type of paper information, the first type of paper information not being changeable;
a first receiving unit configured to receive a first user instruction for displaying the plurality of first type of paper information;
a first display unit configured, when the first receiving unit receives the first user instruction, to display the plurality of first type of paper information stored in the storage task unit;
a second receiving unit configured to receive a second user instruction for designating a first type of paper information from among the plurality of first type of paper information displayed by the first display unit;

a registration unit configured to register a second type of paper information by copying the first type of paper information designated by the second user instruction while retaining the first type of paper information designated by the second user instruction, the second type of paper information being changeable;

a third receiving unit configured to receive a third user instruction for displaying a plurality of second type of paper information;

a second display unit configured, when the third receiving unit receives the third user instruction, to display the plurality of second type of paper information without displaying the plurality of the first type of paper information; and a setting unit configured to set, as a mode when the second display unit displays the second type of paper information, a mode from a plurality of modes including a first mode which displays the first type of paper information and a second mode which does not display the first type of paper information, wherein the second display unit displays the first type of paper information when the setting unit sets the first mode, and does not display the first type of paper information when the setting unit sets the second mode, and wherein at least one of the storage unit, first receiving unit, first display unit, second receiving unit, registration unit, third receiving unit and second display unit is implemented, at least in part, by a hardware processor and memory.

2. The system according to claim 1, further comprising a changing unit configured to change the second type of paper information.

3. The system according to claim 1, wherein the paper information includes at least one of information associated with a transfer voltage when a developer image is transferred on a paper, information associated with a fixing temperature when the developer image is fixed on the paper, and information associated with a paper convey speed of the paper when the developer image is fixed on the paper.

4. The system according to claim 1, wherein the second display unit displays a change log of the paper information with the paper information.

5. The system according to claim 1, wherein the second display unit displays information for specifying a user who instructed the system to generate the paper information, with the paper information.

6. The system according to claim 1, further comprising:
a plurality of feeding units;
wherein the printing unit performs a printing process using a feeding unit associated with the paper information designated by the user instruction.

7. The system according to claim 1, wherein the second display unit displays third type of paper information different from the first type of paper information and the second type of paper information, with the second type of paper information.

8. An information processing apparatus which communicates with a printing apparatus, comprising:
a storage unit configured to store a plurality of first type of paper information, the first type of paper information not being changeable;

a first receiving unit configured to receive a first user instruction far displaying the plurality of first type of paper information;

a first display unit configured, when the first receiving unit receives the first user information, to display the plurality of first type of paper information stored in the storage unit;

a second receiving unit configured to receive a second user instruction for designating a first type of paper information from among the plurality of first type of paper information displayed by the first display unit;

a registration unit configured to register a second type of paper information by copying the first type of paper information designated by the second user instruction while retaining the first type of paper information designated by the second user instruction, the second type of paper information being changeable;

a third receiving unit configured to receive a third user instruction for displaying a plurality of second type of paper information;

a second display unit configured, when the third receiving unit receives the third user instruction, to display the plurality of second type of paper information without displaying the plurality of the first type of paper information; and a setting unit configured to set, as a mode when the second display unit displays the second type of paper information, a mode from a plurality of modes including a first mode which displays the first type of paper information and a second mode which does not display the first type of paper information, wherein the second display unit displays the first type of paper information when the setting unit sets the first mode, and does not display the first type of paper information when the setting unit sets the second mode, and wherein at least one of the storage unit, first receiving unit, display unit, second receiving unit, registration unit, third receiving unit and second display unit is implemented, at least in part, by a hardware processor and memory.

9. A method of printing, by a printing system, the method comprising:
a storage step of storing a plurality of first type of paper information, the first type of paper information not being changeable;

a first receiving step of receiving a first user instruction for displaying the plurality of first type of paper information;

a first display step of, when the first user instruction is received in the first receiving step, displaying the plurality of first type of paper information stored in the storage step;

a second receiving step of receiving a second user instruction for designating a first type of paper information from among the plurality of first type of paper information displayed in the first display step;

a registration step of registering a second type of paper information by copying the first type of paper information designated by the second user instruction while retaining the first type of paper information designated by the second user instruction, the second type of paper information being changeable;

a third receiving step of receiving a third user instruction for displaying a plurality of second type of paper information;

a second display step of, when the third user instruction is received in the third receiving step, displaying the plurality of second type of paper information without displaying the plurality of the first type of paper information; and a setting step of setting, as a mode when the second display step displays the second type of paper information, a mode from a plurality of modes including a first mode which displays the first type of paper information and a second mode which does not display the first type of paper information, wherein the second display step displays the first type of paper information when the setting step sets the first mode, and does not display the first type of paper information when the setting step sets the second mode.

10. A non transitory computer readable storage medium storing a program that, when executed by a computer, causes the computer to perform a method of printing, by a printing system, the method comprising:

- a storage step of storing a plurality of first type of paper information, the first type of paper information not being changeable;
- a first receiving step of receiving a first user instruction for displaying the plurality of first type of paper information;
- a first display step of, when the first user instruction is received in the first receiving step, displaying the plurality of first type of paper information stored in the storage step;
- a second receiving step of receiving a second user instruction for designating a first type of paper information from among the plurality of first type of paper information displayed in the first display step;
- a registration step of registering a second type of paper information by copying the first type of paper information designated by the second user instruction while retaining the first type of paper information designated by the second user instruction, the second type of paper information being changeable;
- a third receiving step of receiving a third user instruction for displaying a plurality of second type of paper information;
- a second display step of, when the third user instruction is received in the third receiving step, displaying the plurality of second type of paper information without displaying the plurality of the first type of paper information; and
- a setting step of setting, as a mode when the second display step displays the second type of paper information, a mode from a plurality of modes including a first mode which displays the first type of paper information and a second mode which does not display the first type of paper information, wherein the second display step displays the first type of paper information when the setting step sets the first mode, and does not display the first type of paper information when the setting step sets the second mode.

\* \* \* \* \*